(12) United States Patent
Tsui

(10) Patent No.: US 11,843,480 B2
(45) Date of Patent: Dec. 12, 2023

(54) METHOD AND SYSTEM FOR MAXIMIZING COVERAGE BASED ON COHERENCE BLOCKS

(71) Applicant: AT&T Intellectual Property I, L.P., Atlanta, GA (US)

(72) Inventor: Ernest Tsui, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 176 days.

(21) Appl. No.: 17/376,770

(22) Filed: Jul. 15, 2021

(65) Prior Publication Data
US 2022/0278793 A1    Sep. 1, 2022

Related U.S. Application Data

(60) Provisional application No. 63/193,175, filed on May 26, 2021, provisional application No. 63/155,257, filed on Mar. 1, 2021.

(51) Int. Cl.
*H04L 25/02* (2006.01)
*H04L 5/14* (2006.01)
(Continued)

(52) U.S. Cl.
CPC ......... *H04L 25/0222* (2013.01); *G06N 20/00* (2019.01); *H01Q 3/267* (2013.01); *H01Q 3/2617* (2013.01); *H01Q 3/2694* (2013.01); *H04B 7/043* (2013.01); *H04B 7/0417* (2013.01); *H04B 7/0426* (2013.01);
(Continued)

(58) Field of Classification Search
CPC ... H04L 25/0222; H04B 17/12; H04B 17/309; H04B 17/318; H04B 17/336; G06N 20/00
See application file for complete search history.

(56) References Cited

U.S. PATENT DOCUMENTS

| 9,450,695 B2 * | 9/2016 | Zhu ...................... H04J 11/0093 |
| 2005/0001784 A1 * | 1/2005 | Oliver .................... H01Q 21/22 343/895 |

(Continued)

FOREIGN PATENT DOCUMENTS

| CN | 105656539 A | * | 6/2016 | ........... H04B 7/0802 |
| CN | 109565370 B | * | 6/2021 | ........... H04B 7/0482 |

OTHER PUBLICATIONS

Wei et al. "Performance of MIMO with Frequency Domain Packet Scheduling in UTRAN LTE downlink" 2007 IEEE 65th Vehicular Technology Conference—VTC2007—Spring, Dublin, Ireland, 2007, pp. 1177-1181, doi: 10.1109/VETECS.2007.249. (Year: 2007).*

Primary Examiner — Abdullahi Ahmed
(74) Attorney, Agent, or Firm — GUNTIN & GUST, PLC; Mark Wilinski

(57) ABSTRACT

Aspects of the subject disclosure may include, for example, identifying a coherence time for a user equipment (UE), identifying a coherence bandwidth for the UE, determining a coherence block based on the coherence time and the coherence bandwidth, and, based on a first determination that the coherence block satisfies a threshold, permitting the UE to transmit sounding reference signal (SRS) data over a smaller SRS bandwidth that is smaller than a default SRS bandwidth, at a lower periodicity that is lower than a default periodicity, or a combination thereof, thereby conserving power resources of the UE. Other embodiments are disclosed.

20 Claims, 37 Drawing Sheets

(51) Int. Cl.

| | | |
|---|---|---|
| H04B 7/06 | (2006.01) | |
| H04B 17/318 | (2015.01) | |
| H04B 17/336 | (2015.01) | |
| H04B 7/0452 | (2017.01) | |
| G06N 20/00 | (2019.01) | |
| H04B 7/0426 | (2017.01) | |
| H04B 7/0456 | (2017.01) | |
| H04W 24/02 | (2009.01) | |
| H04W 72/044 | (2023.01) | |
| H04W 84/04 | (2009.01) | |
| H04L 5/00 | (2006.01) | |
| H04B 7/08 | (2006.01) | |
| H01Q 3/26 | (2006.01) | |
| H04B 7/0417 | (2017.01) | |
| H04B 17/309 | (2015.01) | |
| H04L 43/0888 | (2022.01) | |
| H04L 43/06 | (2022.01) | |
| H04W 52/14 | (2009.01) | |
| H04W 52/26 | (2009.01) | |
| H04W 16/28 | (2009.01) | |
| H04W 24/08 | (2009.01) | |
| H04B 17/12 | (2015.01) | |
| H04W 72/12 | (2023.01) | |
| H04W 72/23 | (2023.01) | |
| H04W 72/51 | (2023.01) | |
| H04W 72/541 | (2023.01) | |
| H04W 72/566 | (2023.01) | |
| H04J 11/00 | (2006.01) | |

(52) U.S. Cl.
CPC ......... *H04B 7/0452* (2013.01); *H04B 7/0456* (2013.01); *H04B 7/0469* (2013.01); *H04B 7/0473* (2013.01); *H04B 7/0617* (2013.01); *H04B 7/0632* (2013.01); *H04B 7/0634* (2013.01); *H04B 7/0639* (2013.01); *H04B 7/0645* (2013.01); *H04B 7/0695* (2013.01); *H04B 7/088* (2013.01); *H04B 17/12* (2015.01); *H04B 17/309* (2015.01); *H04B 17/318* (2015.01); *H04B 17/336* (2015.01); *H04L 5/0023* (2013.01); *H04L 5/0048* (2013.01); *H04L 5/0051* (2013.01); *H04L 5/0073* (2013.01); *H04L 5/14* (2013.01); *H04L 5/1461* (2013.01); *H04L 5/1469* (2013.01); *H04L 25/0202* (2013.01); *H04L 25/0226* (2013.01); *H04L 43/06* (2013.01); *H04L 43/0888* (2013.01); *H04W 16/28* (2013.01); *H04W 24/02* (2013.01); *H04W 24/08* (2013.01); *H04W 52/143* (2013.01); *H04W 52/267* (2013.01); *H04W 72/0473* (2013.01); *H04W 72/12* (2013.01); *H04W 72/23* (2023.01); *H04W 72/51* (2023.01); *H04W 72/541* (2023.01); *H04W 72/569* (2023.01); *H04W 84/04* (2013.01); *H04J 11/0023* (2013.01)

(56) References Cited

U.S. PATENT DOCUMENTS

| | | | |
|---|---|---|---|
| 2016/0135066 A1* | 5/2016 | Xu | H04B 17/345 370/252 |
| 2018/0352461 A1* | 12/2018 | Guirguis | H04B 7/0695 |
| 2019/0182888 A1* | 6/2019 | Ahn | H04W 24/02 |
| 2019/0215215 A1* | 7/2019 | Maltsev | H04W 72/0453 |
| 2019/0253966 A1* | 8/2019 | Park | H04L 5/0091 |
| 2020/0221413 A1* | 7/2020 | Jones | G01S 1/14 |
| 2020/0244362 A1* | 7/2020 | Ashrafi | H04L 27/3405 |
| 2020/0259683 A1* | 8/2020 | Manolakos | G01S 13/878 |
| 2020/0260463 A1* | 8/2020 | Lovlekar | H04W 24/10 |
| 2021/0126738 A1* | 4/2021 | Vankayala | H04W 88/08 |
| 2023/0033619 A1* | 2/2023 | Lovlekar | H04W 88/06 |

\* cited by examiner

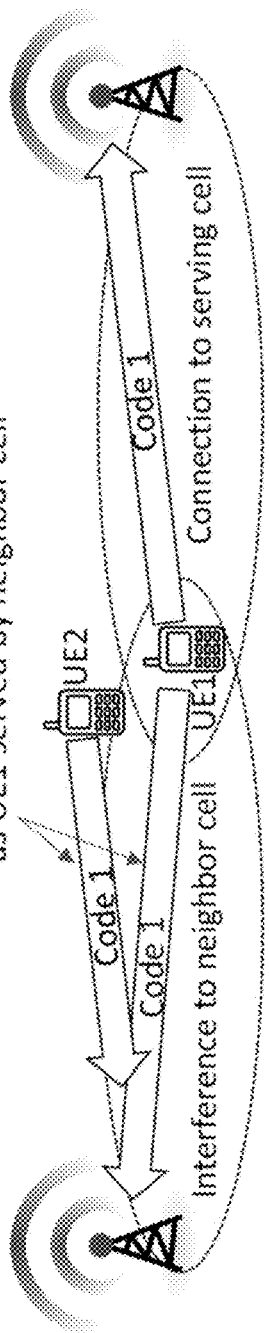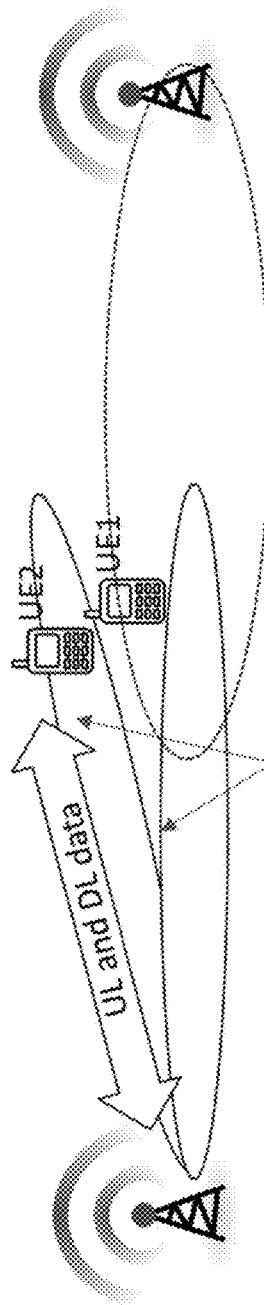
FIG. 4B

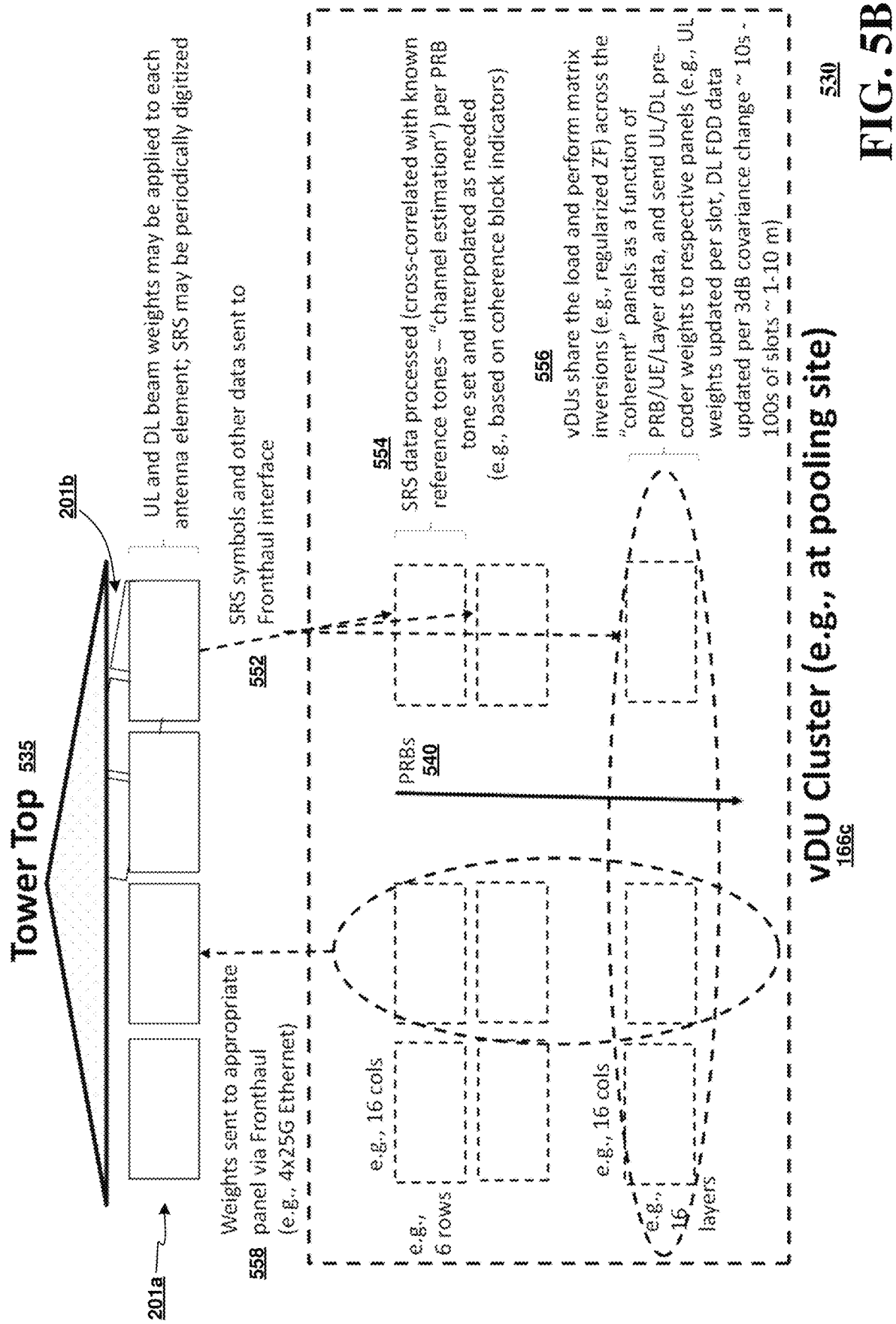

$$W = ((\sigma^2/p)\, I_M + H\, H^*)^{-1} H \quad \text{—620}$$

$$R_k = E\{h_k\, h_k^*\} \quad \text{—630}$$

$$W = ((\sigma^2/p)\, I_M + Q)^{-1} V_i \quad \text{—640}$$

$$Q = \sum_{k=1}^{K} R_k \quad \text{—650}$$

FIG. 6

| Input Interference | Environment | Channel Estimation | Precoding/Combining |
|---|---|---|---|
| Neighbor Mobile UEs | Channel h changes ~ ms | TDD: Can use EQ 1 for R, e.g., initially assumed to be diagonal until a suitable h is obtained and average of ψ over a single coherence block | TDD: Can use ψ (EQ 2) measured over a single coherence block instead of $(I + hh^*)$ |
| | R $(=\{hh^*\})$ averaged ~ multiple (e.g., tens of) ms | FDD: ψ can be averaged ~ multiple (e.g., tens of) coherence blocks | FDD: ψ averaged over multiple (e.g., tens of) coherence blocks instead of $(I + hh^*)$ |
| | Serving cell coherence block may be assumed to be larger than mobile UE coherence block | | |
| Fixed UEs | Channel h changes ~ multiple (e.g., hundreds of) ms | FDD: ψ averaged ~ multiple (e.g., hundreds of) ms | "" |
| External Active TX | Static sources or Re-use of pilots | Response shows up in ψ | "" |
| External passive RX | Known geolocation avoid out-of-band emissions or in-band emissions | May need to be known a-priori and artificial R' developed to add into ψ | $\psi' = \psi + R'$ |
| PIM Source | Static – near field | With proper DL beam, the UL response can be measured and included in an artificial R' and added into ψ | $\psi' = R' + \psi$ |

720

$H_{li} = \text{SQRT}(p_{li}) R_{li} \psi_{li}^{-1} y_{li}$ jth serving cell (EQ 1)
$\psi_{li} = E\{y_{li} y_{li}^*\}$ (EQ 2)

$R_{li} = E\{h_{li} h_{li}^*\}$ initial estimate may be used as diagonal until the next estimate, which starts to mitigate interference into the h and thus the R estimate $p = \text{UE TX power}$
$R = E\{HH^*\}$ Artificial R may be developed with H = steering vector towards interference source
p = parameter with desired potential null depth

- Calculate the H from the ith UE in the lth cell to the jth serving cell
- Obtain the UE TX power pli and the ith (lth cell) UE Pilot signal y cross correlation output
- Nulling from $\psi^{-1}$
- End result may be that the interference is mitigated when estimating the channel of the ith UE in cell l
- With ψ known, the UL combining can be done for the kth serving UE with the channel estimate Hjk, Qj, and allocated UL TX power pjk
- $V_{jk} = p_{jk} Q_j^{-1} H_{jk}$
- The DL precoding can use the same vector with the DL allocated TX power p

FIG. 7A

| Example Key Sub-systems | Description | Example Latency Ranges | Example Operator Use Case |
|---|---|---|---|
| Scheduled UEs | Scheduled UEs (and QCI) with associated priorities, angle of arrival (2D beam#), TA, DRB Tput, and SINR | 1 minute histogram for each item per UE and a histogram of the K (K=0-16 layers) histogram | Scheduler Capacity optimization |
| UE Spatial Separability | UE Channel Cross Correlation Matrix (pairwise for all simultaneously scheduled UEs), E{hi*hj} | 1 minute (KxK) matrices of histogram), K = the number of parallel UEs | Scheduler Capacity optimization |
| Coherence Bandwidth | Estimated frequencies for which the channel is constant per UE | 1 minute average and std dev. for all UEs scheduled | Coverage & Capacity optimization |
| Coherence Time | Estimated time for which the channel is constant per UE | 1 minute average and std dev. for all UEs scheduled | Coverage & Capacity optimization |
| Indication of MIMO type | % Mu-MIMO (K=0,...,16) with Su-MIMO rank = 1,...,8 | 1 minute histogram | Capacity optimization |
| Downlink CQI | Downlink CQI and PMI reported by UE | 1 min. average histogram over entire CQI and PMI range for all UEs | User DL Quality optimization |
| Uplink SINR and EVM | Uplink SINR measured in PRB bandwidth | 1 min. average histogram per SINR bin (2 dB resolution) also for EVM | User UL Quality optimization |
| Frequency Reuse factor for the Pilots | Pilot reuse factor over Nreuse sites | static | Capacity optimization |
| Uplink Covariance | The uplink Covariance matrix of the received signal after removal of pilots | Average over 10 second intervals | Capacity optimization via Interference mitigation |
| Pilot and Coherence Block | The Pilot signal length and the Coherence block size (in symbols) shall be made available in near real time | 1 minute intervals | Capacity optimization via Interference mitigation |
| Condition Number | The condition number shall be computed and averaged per UE | 1 min. conditional number histograms (1 dB resolution) as a function of K | Capacity optimization |

800 FIG. 8A

| Example Key Sub-systems | Description | Example Latency Ranges | Example Operator Use Case |
|---|---|---|---|
| Uplink UE Transmit Power Control | Requires real-time Uplink UE SINR internal measurement and policy to increase TX power up to designated minimum SINR level (To be specified by the operator) | Operator min SINR level set at arbitrary time after a scheduling interval | UL User Quality Optimization |
| Downlink Transmit Power Allocation | Requires real-time Downlink UE internal SINR estimate and policy to increase the TX power to any UE whose SINR falls below the minimum required SINR (To be specified by the operator) | Operator min. SINR threshold set at arbitrary time after a scheduling interval | DL User Quality Optimization |
| Parallel Scheduling Control | The operator shall be able to control the capacity (the 1 min. average number K parallel scheduled UEs) by specifying the required UE separability threshold) - Uplink and Downlink thresholds to be specified | Operator separability threshold set at arbitrary time after a scheduling interval | Scheduler Capacity Optimization |
| Pilot Sequence | The Pilot sequence lengths (and numbers) shall be set by the operator to ensure overhead is minimized while avoiding pilot contamination | Operator length set at arbitrary time after a scheduling interval | User Quality Optimization |
| Pilot Sequence distribution | The pilot sequences shall be partitioned and automatically distributed to $N_{cause}$ surrounding cells | Operator set | Capacity Optimization |
| Ability to set MIMO modes | The operator shall be able to set any UE to either Su-MIMO only, Mu-MIMO only, or both or by QCI | Operator set statically | User Quality Optimization |
| Insert Quiescent Antenna Weights | The operator shall be able to set arbitrary quiescent (static) antenna weights that shall be convolved or more efficiently multiplied in the beam space with system calculated weights for either Uplink or Downlink | Operator set statically | User Quality & Capacity Optimization |
| Set SuMIMO Rank | The condition number shall be calculated internally in real time and allow the operator to set a threshold on condition number that is used to take the UE reported Su-MIMO rank and convert to a base station transmitted rank | Operator set statically | Capacity Optimization |

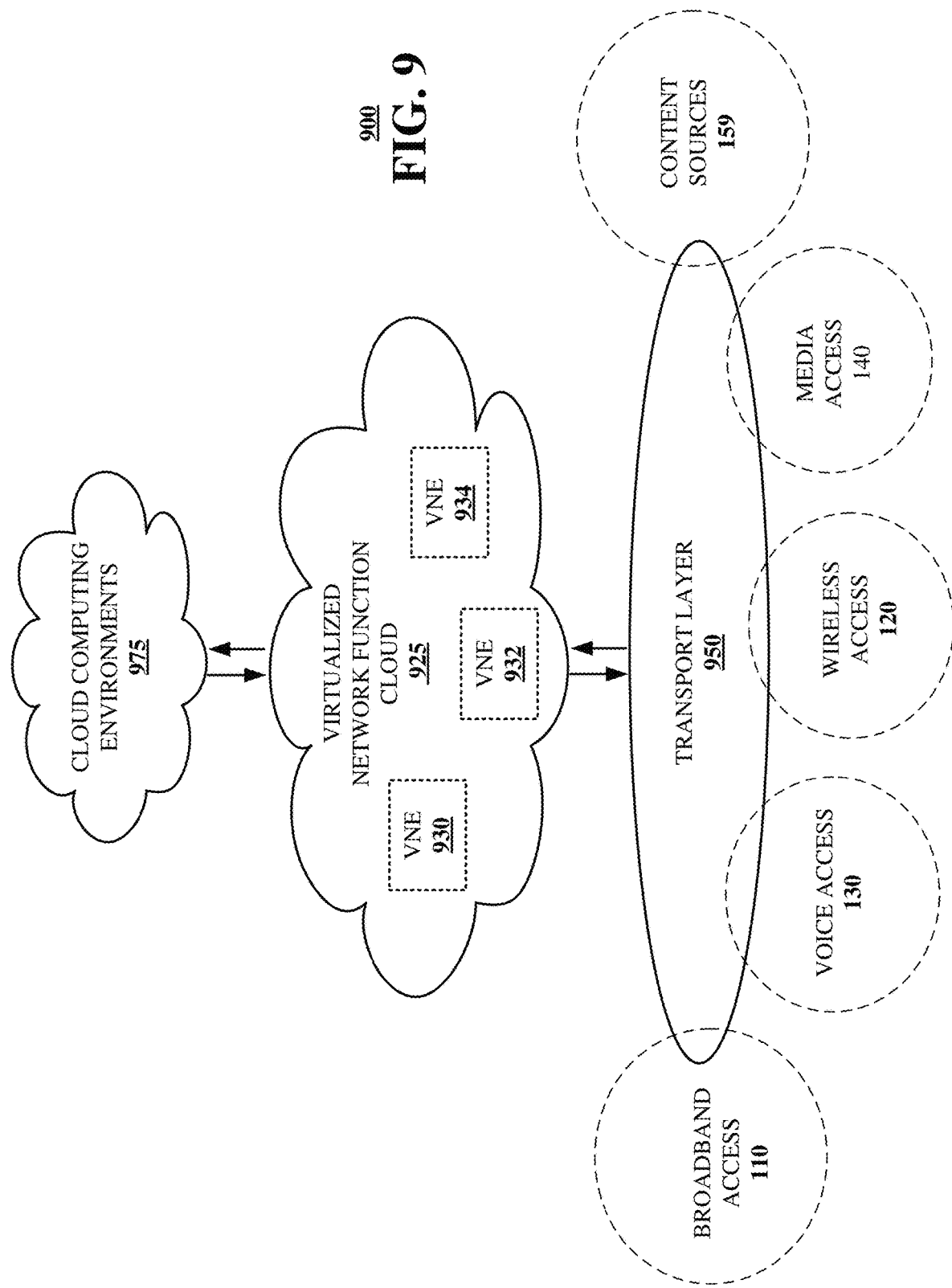

METHOD AND SYSTEM FOR MAXIMIZING COVERAGE BASED ON COHERENCE BLOCKS

CROSS-REFERENCE TO RELATED APPLICATION(S)

This application claims priority to U.S. Provisional Ser. No. 63/155,257, filed Mar. 1, 2021, and U.S. Provisional Ser. No. 63/193,175, filed May 26, 2021. The contents of each of the foregoing are hereby incorporated by reference into this application as if set forth herein in full.

FIELD OF THE DISCLOSURE

The subject disclosure relates to maximizing coverage based on coherence blocks. The subject disclosure also relates to optimizing or improving spectral efficiency using massive multiple-input-multiple-output (MIMO), including single-user (Su)- and/or multi-user (Mu)-MIMO, with aggregated modular adaptive antenna arrays/panels.

BACKGROUND

As the number of mobile users and wireless applications continues to grow at a rapid rate, efficient use and management of wireless frequency spectrum becomes increasingly important, especially in cases where spectrum is limited or deficient.

BRIEF DESCRIPTION OF THE DRAWINGS

Reference will now be made to the accompanying drawings, which are not necessarily drawn to scale, and wherein:

FIG. 4B is a diagram illustrating the benefits of using orthogonal pilot sequences in accordance with various aspects described herein.

FIG. 5B depicts an exemplary, non-limiting example of a scalable architecture of aggregated (coherent) modular antenna arrays and clustered processing units in accordance with various aspects described herein.

FIG. 6 shows exemplary, non-limiting equations that can be applied to implement FDD Mu-MIMO in accordance with various aspects described herein.

FIG. 7A depicts a table and example equations that can be applied to mitigate various types of input interference in accordance with various aspects described herein.

FIG. 8A depicts a table identifying monitorable parameters for facilitating MIMO networking in accordance with various aspects described herein.

FIG. 8B depicts a table identifying controllable parameters for facilitating MIMO networking in accordance with various aspects described herein.

FIG. 9 is a block diagram illustrating an example, non-limiting embodiment of a virtualized communications network in accordance with various aspects described herein.

DETAILED DESCRIPTION

Figure 1A:
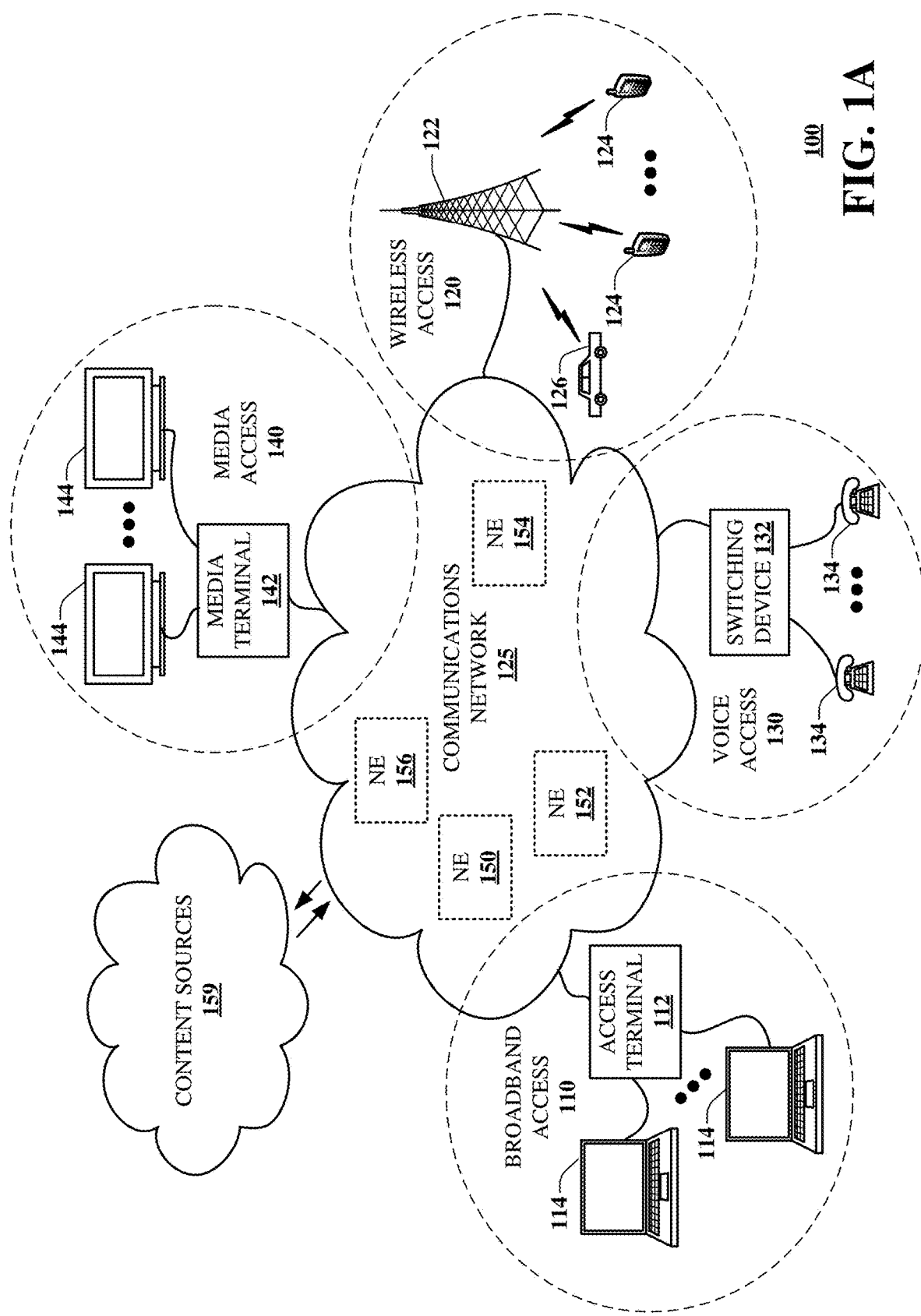
FIG. 1A is a block diagram illustrating an exemplary, non-limiting embodiment of a communications network in accordance with various aspects described herein.

Having access to a larger wireless frequency spectrum provides a mobile network operator with improved network coverage and speed as well as increased capacity to serve more users. In cases where spectrum is limited or deficient, however, it can be difficult to efficiently service growing user bases without overloading the network. For example, in some instances, a mobile network operator may only have access to limited portions of one or more frequency bands—e.g., from about 1.7 gigahertz (GHz) to about 2.5 GHz in the Mid-band and from about 3.7 GHz to about 4.2 GHz in the C-band—for carrying all of the user traffic on the operator's mobile network. Expanding the capacity of such a network may require creative and efficient use and management of the limited spectrum. In the example above, one solution for addressing poor UL coverage in the C-band (which may have adequate capacity and sufficient DL coverage) might be to utilize the Mid-band for most of the UL operations, at least for UEs that are beyond the UL coverage area in the C-band. While such an implementation may supplement UL coverage of the C-band, it can be a zero sum solution, since the Mid-band would be burdened with nearly all of the UL traffic (particularly in areas farther away from a base station or tower) and thus experience a reduction in UL capacity.

The subject disclosure describes, among other things, illustrative embodiments of a network implementation that is capable of extending the capacity of an available band of spectrum (e.g., in frequency division duplex (FDD) and/or time division duplex (TDD)) using Mu-MIMO. In various embodiments, this may be augmented by leveraging aggregated or combined modular adaptive/active/advanced antenna systems (AAS) or arrays. In exemplary embodiments, Mu-MIMO, for example, may be employed in a lower frequency band, such as the Mid-band or the like, which can enable improved UL signaling for UEs since lower frequencies can carry signals for longer physical distances and thus allow for increased coverage. In a case where a mobile network employs portions of multiple bands for network operations, such as, for example, the C-band and the Mid-band, and where the UL of the lower band (e.g., the Mid-band) is used not only for its own UL traffic but also the UL traffic associated with the higher band (e.g., the C-band), leveraging Mu-MIMO in the lower band can improve the capacity of its UL, and can thus restore UL capacity to the higher band. In one or more embodiments, the network implementation enables harnessing or "slicing" of an available band of spectrum (e.g., in FDD and/or TDD) to serve/accommodate certain select users or user equipment (UEs), such as stationary (or near stationary), line of sight (LOS) (or near LOS), or fixed wireless UEs/customer premises equipment (CPEs) that have projected data rate requirements. For example, in certain embodiments, a dedicated channel (e.g., a 20 MHz channel or the like) may be assigned to support such UEs/CPEs in Mu-MIMO mode.

In exemplary embodiments, the network implementation, equipped with combined modular antenna arrays that include antenna elements having larger apertures, is capable of selectively applying Mu-MIMO for UEs associated with large coherence blocks (e.g., coherence blocks that exceed a threshold). These may include, for example, stationary (or near stationary) UEs, UEs with LOS (or near LOS), or fixed wireless UEs or CPEs, where associated buffers may be continuously (or near continuously) full or near full. In various embodiments, coherence blocks may be exploited, as described herein, to control inter-cell interference (e.g., via pilot signal distribution/control) and to maximize UL coverage for sounding reference signal (SRS) purposes (e.g., by averaging SRS over large coherence blocks). In various embodiments, UEs with smaller coherence blocks (e.g., non-stationary UEs or UEs with non-line of sight (NLOS)) may be configured for Su-MIMO, where the various UEs in Su- and Mu-MIMO modes may be supported via appropriate scheduling of time slots.

In exemplary embodiments, an aggregation or combination of modular adaptive arrays (e.g., a radio unit (RU)) may include multiple antenna panels that, as a group, function as a "coherent" antenna system. In various embodiments, an antenna panel may have columns and rows (e.g., 16 columns and 6 rows or the like) of antenna elements (which may also be referred to herein as a T/R or T/R element, individually, or as T/Rs or T/R elements, in the plural) that may, for example, be dual-polarized (e.g., at +45 degrees and −45 degrees or the like). Each antenna element may be weightable/weighted with amplitude and phase, where the antenna elements, as a group, may be capable of supporting numerous layers (e.g., simultaneous data streams for multiple UEs) in the UL (e.g., 8 layers or more) and the DL (e.g., 16 layers or more). In exemplary embodiments, modular antenna panels can have a larger aperture relative to conventional antennas, which may enable sharper beamforming. In various embodiments, an antenna panel may employ advanced semiconductor technologies (e.g., radio frequency (RF) complementary metal-oxide-semiconductor (CMOS) technology), which can reduce base station power and costs. Additionally, an antenna panel may also be configured to provide higher radiated power from each antenna element (e.g., higher Effective, or Equivalent, Isotropically Radiated Power (EIRP)) than conventional antennas, and can do so at lower power consumption than conventional antennas, which eliminates a need for extra tower power cabling.

Aggregating or combining active antenna panels provides for wider antenna configurations, which enables flexible beam formation with increased resolution. This expands capacity across (e.g., all existing) locations or positions of antenna systems or tower tops of a mobile network, since beams can be formed for, and directed/steered to, even those UEs that, from the perspective of the combined modular antenna array, are separated only by a small distance (e.g., less than about 5, 7, 10, or 15 degrees apart or the like), and signals exchanged with such UEs can all be transmitted at the same frequency and time using MIMO techniques. In exemplary embodiments, modular antenna arrays may be stackable or arrangeable in different orientations to attain narrower beams in desired directions. For example, arranging modular antenna arrays horizontally allows for narrower beams in an azimuth direction, and arranging them vertically allows for narrower beams in an elevation direction.

As more unmanned aerial vehicles (UAVs), such as drones, become deployed for extended network coverage, their activities can interfere with operations of cell towers depending on their locations relative to the towers. It may thus be crucial for a tower or base station to identify/track UAV locations to determine appropriate null patterns and beam directions. Conventional active antennas employ components that have extensive power requirements, and rely on sub-arrays, where only a subset of available antenna elements is programmable. This limits the ability of the system to adapt phase/amplitude of the antennas and restricts scanning in the elevation direction, which may be needed to track UAVs. Exemplary embodiments of the modular antenna array are capable of steering beams in both the azimuth and elevation directions. In various embodiments, the modular antenna array may include a respective programmable device for each antenna element of the array, which allows for wide elevation scanning (e.g., −20 degrees to 50 degrees or the like). Coupled with advanced semiconductor (e.g., RF CMOS) technology, for example, the modular antenna array can enable improved nulling (e.g., nulling out of signals to/from drones) and minimization of grating lobes.

Embodiments, described herein, also enable the aggregation of modular antenna arrays (which are high transmit/receive (T/R)) to transparently serve some UEs in Su-MIMO mode and other UEs in Mu-MIMO mode. In various embodiments, reciprocity-based channel estimation may be employed, and aggregations of modular antenna arrays may be logically configured/controlled such that DL channel state information (CSI)-reference signal (RS) overhead is reduced for UEs in Su-MIMO mode, which enables such UEs to operate unaware of the large quantities of available antenna elements that are employed to service UEs in both Su- and Mu-MIMO modes. The added capability to support multiple UEs simultaneously in Mu-MIMO mode (i.e., multiple parallel transmissions), and not just a single UE at a time, can dramatically improve capacity.

Various embodiments, described herein, also provide for calibration of aggregated or combined antenna panels, which enables all or selected groups of the panels to function as a coherent antenna system for sharp beamforming and steering. Exemplary processes for determining weights for antenna elements (e.g., based on SRS or other channel information) are also described herein for FDD and TDD, including algorithms that exploit the spatial scenario of mobile UEs to extract a spatial channel (e.g., without complications of a microscopic fading channel) for the DL in FDD based on FDD UL estimates performed for a different FDD frequency. Various embodiments for addressing interference are also described herein.

Augmenting a mobile network system with the addition of aggregated or combined antenna panels (with larger antenna element apertures), and leveraging such panels to harness an available band of spectrum (e.g., in FDD and/or TDD and for Su- and/or Mu-MIMO), as described herein, reduces or eliminates a need for a mobile network operator to obtain or acquire additional spectrum, which can provide significant cost savings (e.g., hundreds of millions of dollars or more per MHz).

In various embodiments, the network implementation may operate in accordance with open standards, such as Open Radio Access Network (O-RAN) standards, which obviates equipment incompatibilities and conflicts between equipment vendors.

One or more aspects of the subject disclosure include a device, comprising a processing system including a processor, and a memory that stores executable instructions that, when executed by the processing system, facilitate performance of operations. The operations can include identifying a coherence time for a user equipment (UE), wherein the processing system is associated with a radio access network (RAN) that includes multiple adaptive antenna arrays that operate as a coherent antenna system. Further, the operations can include identifying a coherence bandwidth for the UE. Further, the operations can include determining a coherence block based on the coherence time and the coherence bandwidth. Further, the operations can include, based on a first determination that the coherence block satisfies a threshold, permitting the UE to transmit sounding reference signal (SRS) data over a smaller SRS bandwidth that is smaller than a default SRS bandwidth, at a lower periodicity that is lower than a default periodicity, or a combination thereof, thereby conserving power resources of the UE.

One or more aspects of the subject disclosure include a non-transitory machine-readable medium, comprising executable instructions that, when executed by a processing system communicatively coupled with a combination of modular antenna panels and including a processor, facilitate performance of operations. The operations can include tracking a coherence block for a user equipment (UE) based on information obtained from a RAN interface. Further, the operations can include identifying, based on the tracking, that the coherence block does not satisfy a threshold. Further, the operations can include, based on the identifying that the coherence block does not satisfy the threshold, instructing the UE to transmit sounding reference signals (SRS) over a larger SRS bandwidth that is larger than a default SRS bandwidth, at a higher periodicity that is higher than a default periodicity, or a combination thereof, and determining that the UE is not eligible for multi-user (Mu)-multiple-input-multiple-output (MIMO).

One or more aspects of the subject disclosure include a method. The method can include identifying, by a processing system including a processor, a coherence time and a coherence bandwidth for a user equipment (UE), wherein the UE is located at or within a threshold distance from a cell edge. Further, the method can include determining, by the processing system, a coherence block based on the coherence time and the coherence bandwidth. Further, the method can include, based on a determination that the coherence block satisfies a threshold, exploiting, by the processing system, the coherence block by determining an average across the coherence block to obtain an uplink (UL) channel estimate for the UE, thereby maintaining UL coverage for the UE and enabling multi-user (Mu)-multiple-input-multiple-output (MIMO).

Other embodiments are described in the subject disclosure.

Referring now to FIG. 1A, a block diagram is shown illustrating an example, non-limiting embodiment of a system/communications network 100 in accordance with various aspects described herein. For example, system 100 can, in whole or in part, facilitate optimization or improvement of service quality and/or capacity in a MIMO network supported by aggregations of modular antenna arrays and/or facilitate maximizing of coverage based on coherence blocks. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 159 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 159. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 159 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
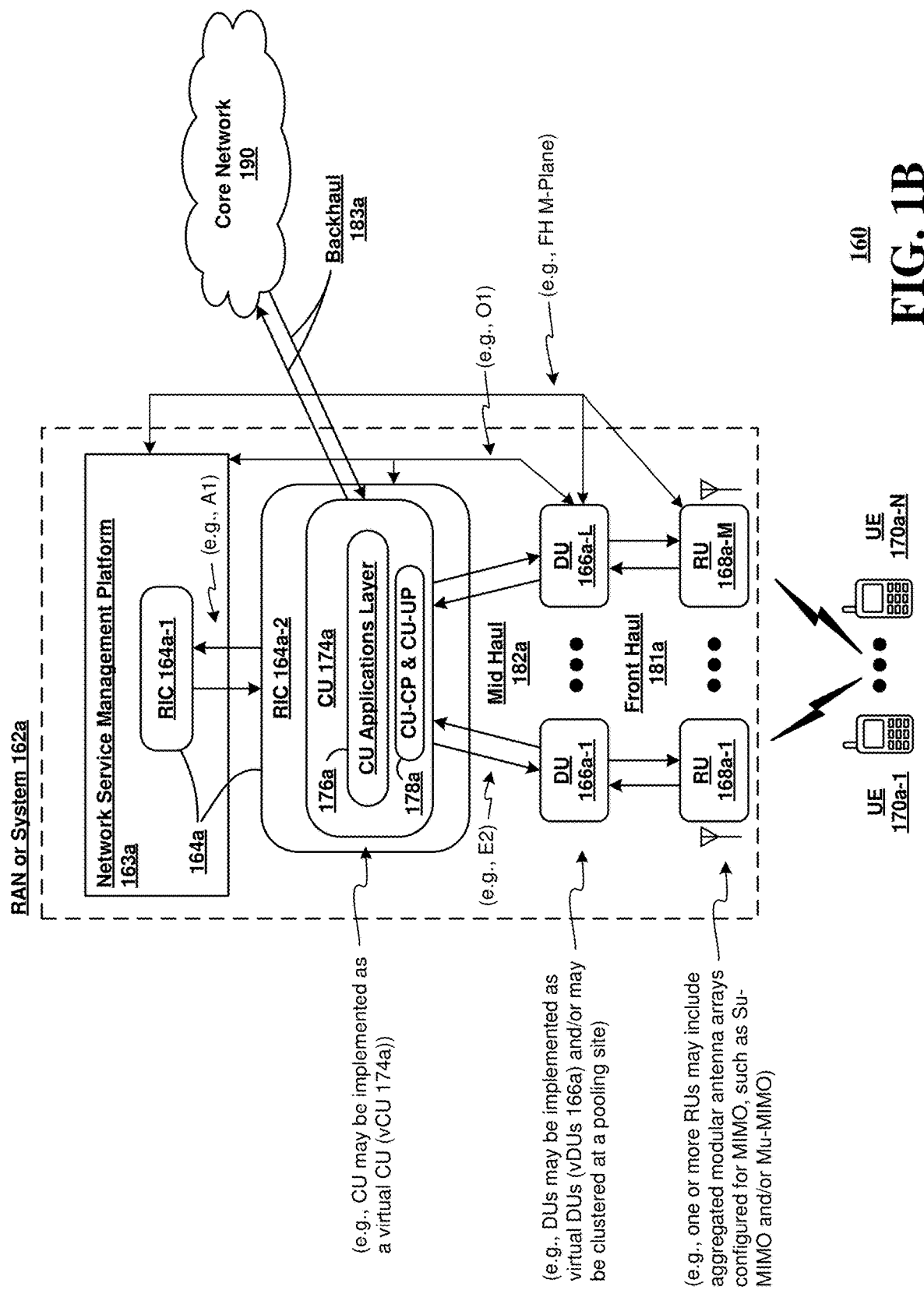
FIG. 1B is a block diagram illustrating an exemplary, non-limiting embodiment of a system functioning within, or operatively overlaid upon, the communications network of FIG. 1A in accordance with various aspects described herein.

FIG. 1B is a block diagram illustrating an example, non-limiting embodiment of a system 160 functioning within, or operatively overlaid upon, the communications network 100 of FIG. 1A in accordance with various aspects described herein. For example, system 160 can, in whole or in part, facilitate optimization or improvement of service quality and/or capacity in a MIMO network supported by aggregations of modular antenna arrays and/or facilitate maximizing of coverage based on coherence blocks. In some embodiments, the system 160 may correspond to, or include, one or more networks (e.g., a communications network, a data network, etc.).

As shown in FIG. 1B, the system 160 may include a RAN 162a communicatively coupled to a core network 190. The core network 190 can include a 5G network, an evolved packet core (EPC) network, a higher generation network, or any combination thereof. In various embodiments, the RAN 162a may be, or may include, a vRAN (e.g., in an Open RAN (O-RAN) implementation), in which software is decoupled from hardware, and implementation thereof is in accordance with principles of network function virtualization (NFV), where the control plane is separated from the data plane. The vRAN may include a centralized set of baseband units located remotely from antennas and remote radio units, and may be configured to share signaling amongst cells. In various embodiments, the vRAN may provide control and service delivery optimization functions as well as SRS and pilot signals to ensure orthogonality across different cells/sites to prevent pilot contamination and subsequent inter-cell interference.

As shown in FIG. 1B, the RAN 162a may include a network service management platform 163a and a RAN intelligent controller (RIC) 164a. The RIC 164a may include a RIC portion 164a-1 implemented, or otherwise incorporated, in the network service management platform 163a. The RIC 164a may include a RIC portion 164a-2 having a control or centralized unit (CU) 174a (e.g., a base station CU, such as a gNodeB (gNB) CU or the like) that provides a CU applications layer 176a as well as a CU control plane CU-CP and a CU user plane CU-UP (e.g., represented as CU-CP & CU-UP 178a). In various embodiments, the RIC portion 164a-1 may be configured to operate in non-real-time, and the RIC portion 164a-2 may be configured to operate in near real-time. The particular functions performed by the RIC portions 164a-1, 2 can vary based on various criteria, including implementing changing parameters or requirements for the network, and can also include redundancy and/or dynamic switching of functions (including functions described herein) between the RIC portions 164a-1, 2.

As shown in FIG. 1B, the RAN 162a may include distributed units (DUs) 166a-1 through 166a-L (L≥1) (hereinafter referred to collectively as "DUs 166a," and individually as "DU 166a"). In various embodiments, the DUs 166a may include baseband units (e.g., base station DUs, such as gNB DUs or the like) configured to perform signal processing, UE scheduling, and/or the like. In exemplary embodiments, each of one or more DUs 166a may be implemented as a virtual DU (vDU). The RAN 162a may also include remote radio heads or remote units (RUs) 168a-1 through 168a-M (M≥1) (hereinafter referred to collectively as "RUs 168a," and individually as "RU 168a"). The RUs 168a may communicatively couple (e.g., via an air interface) with user equipment (UEs) 170a-1 through 170a-N (N≥1) (hereinafter referred to collectively as "UEs 170a," and individually as "UE 170a"). In various embodiments, the RUs 168a may include remote radio units, antennas, and/or the like. As shown in FIG. 1B, the RUs 168a, the DUs 166a, and the CU 174a may, by way of a fronthaul 181a, a midhaul 182a, and a backhaul 183a, provide (e.g., controlled) connectivity between the core network 190 and the UEs 170a. In one or more embodiments, the fronthaul 181a, the midhaul 182a, and/or the backhaul 183a may conform to open standards, such as O-RAN standards or the like.

In exemplary embodiments, each of one or more RUs 168a may include one or more aggregations of modular antenna arrays/panels. As described in more detail below with respect to FIGS. 2A-2D, a modular antenna panel may include multiple antenna elements, where a combination of the multiple antenna elements of (e.g., all of) the modular antenna panels in the aggregation enables the modular antenna panels to function as a coherent antenna system (e.g., where all the antenna elements of all the panels are synchronized in frequency and phase for every cycle). In various embodiments, a modular antenna array may enable employment of MIMO techniques, such as Su- and/or Mu-MIMO, as described herein.

Although FIG. 1B illustrates the CU 174a as being incorporated in the RIC portion 164a-2, in various embodiments, the CU 174a may be implemented as a distinct component from the RIC portion 164a-2. In some embodiments, the RIC 164a and the network service management platform 163a may operate as part of one or more central control planes that oversee a geographic region that can include multiple (e.g., hundreds, thousands, etc.) of remote units, distributed units, centralized units, or any combination thereof.

In various embodiments, the system 160 may be functionally separated or segmented in accordance with one or more time-based zones or frames. For example, the network service management platform 163a and/or the RIC portion 164a-1 may be operative at or in non-real-time; the RIC portion 164a-2 and/or the CU 174a may be operative at or in near-real-time; and the DUs 166a, the RUs 168a, and/or the UEs 170a may be operative at or in real-time. As the terms (and related terms) are used herein, real-time operations may occur over a span of fractions of a second up to a second (or the like), near-real-time operations may occur over the course of a few seconds (e.g., 1 to 5 seconds or the like), and non-real-time operations may occur over a time period that is greater than a few seconds (e.g., greater than 5 seconds or the like).

In various embodiments, the network service management platform 163a may manage, or otherwise adapt, RIC behaviors and/or operations across one or more of the three time zones or timeframes described above (e.g., real-time, near-real-time, and non-real-time) on an individualized and/or collective basis. Such management or adaptation of RIC behaviors and/or operations may conform to one or more models or microservices (e.g., artificial intelligence (AI) models or microservices), or network applications (e.g., rAPPs, xAPPs), as described herein. In turn, the RIC may establish and/or modify policies and/or behaviors of respective CUs, DUs, and RUs in accordance with the model(s) or microservice(s). In this regard, the network service management platform 163a may indirectly influence the behaviors and/or operations of CUs, DUs, and/or RUs via one or more RICs.

In some embodiments, the communication channels and/or links between the RAN 162a and the UEs 170a may include wireless links. In various embodiments, some or all of the UEs 170a may be mobile, and may therefore enter and/or exit a service or coverage area associated with the RIC 164a. In various embodiments, some of the UEs 170a may include non-mobile or stationary devices. In some of these embodiments, the RAN 162a may include one or more routers, gateways, modems, cables, wires, and/or the like, and the communication channels and/or links between the RAN 162a and such UEs may include wired/wireline links, optical links, etc.

In various embodiments, a RIC (e.g., the RIC portions 164a-1, 2 of the RIC 164a) may store, execute, and/or deploy applications or microservices that are configured to control and manage a RAN (e.g., the RAN 162a). In one or more embodiments, for example, the RIC portion 164a-1 may store, execute, and/or deploy rApps, and the RIC portion 164a-2 may store, execute, and/or deploy xApps (e.g., in or via an applications layer, such as the CU applications layer 176a). The applications or microservices may relate to scheduler capacity optimization, coverage optimization, capacity optimization (including, for example, via interference mitigation), user quality optimization (including, for example, for the UL and/or the DL), radio connection management, mobility management, quality-of-service (QoS) management, interference management, telemetry, network traffic control and/or management, device admissions (e.g., UE admissions control), and/or the like. In various embodiments, an application may include one or more models, such as AI (e.g., machine learning (ML)) models, that when executed in one or more containers, provide corresponding microservices. Deployment of an AI model in a RIC (or, more generally, a RAN) may involve, or include, for example, executing or instantiating the AI model in one or more containers in the RIC portion 164a-1 and/or the applications layer of the RIC portion 164a-2 (e.g., the CU applications layer 176a), such that the AI model processes inputs (e.g., received from other microservices running on the RIC and/or from various components of the RAN, such as the CU-CP & CU-UP 178a, the DUs 166a, and/or the RUs 168a) and provides outputs (e.g., to the other microservices and/or the various components of the RAN), in accordance with the AI model, to control the overall operation of the RAN.

It is to be appreciated and understood that the system 160 can include various quantities of cells (e.g., primary cells (Pcells) and/or secondary cells (Scells)), various quantities of network nodes in a cell, and/or various types of network nodes and/or cells (e.g., heterogeneous cells, etc.).

It is also to be appreciated and understood that the quantity and arrangement of systems, networks, platforms, controllers, controller portions, centralized units, applications layers, distributed units, remote units, fronthauls, midhauls, backhauls, and/or antenna arrays shown in FIG. 1B are provided as an example. In practice, there may be additional systems, networks, platforms, controllers, controller portions, centralized units, applications layers, distributed units, remote units, fronthauls, midhauls, backhauls, and/or antenna arrays than those shown in FIG. 1B. For example, the system 160 can include more or fewer systems, networks, platforms, controllers, controller portions, centralized units, applications layers, distributed units, remote units, fronthauls, midhauls, backhauls, and/or antenna arrays. Furthermore, two or more systems, networks, platforms, controllers, controller portions, centralized units, applications layers, distributed units, remote units, fronthauls, midhauls, backhauls, or antenna arrays shown in FIG. 1B may be implemented within a single system, network, platform, controller, controller portion, centralized unit, applications layer, distributed unit, remote unit, fronthaul, midhaul, backhaul, or antenna array shown in FIG. 1B or a single system, network, platform, controller, controller portion, centralized unit, applications layer, distributed unit, remote unit, fronthaul, midhaul, backhaul, or antenna array shown in FIG. 1B may be implemented as multiple, distributed systems, networks, platforms, controllers, controller portions, centralized units, applications layers, distributed units, remote units, fronthauls, midhauls, backhauls, or antenna arrays. Additionally, or alternatively, a set of systems, networks, platforms, controllers, controller portions, centralized units, applications layers, distributed units, remote units, fronthauls, midhauls, backhauls, and/or antenna arrays (e.g., one or more systems, networks, platforms, controllers, controller portions, centralized units, applications layers, distributed units, remote units, fronthauls, midhauls, backhauls, and/or antenna arrays) of the system 160 may perform one or more functions described as being performed by another set of systems, networks, platforms, controllers, controller portions, centralized units, applications layers, distributed units, remote units, fronthauls, midhauls, backhauls, and/or antenna arrays of the system 160.

Figure 2A:
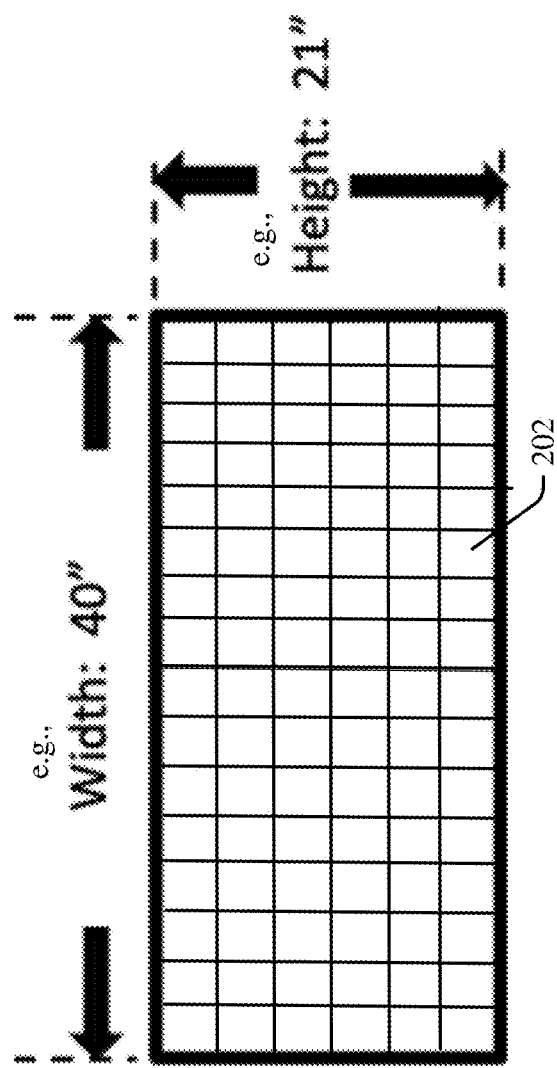
FIG. 2A depicts an exemplary, non-limiting embodiment of a modular antenna array in accordance with various aspects described herein.

FIG. 2A depicts an example, non-limiting embodiment of a modular antenna array/panel 200 in accordance with various aspects described herein. In exemplary embodiments, the modular antenna array 200 may be a modular active/adaptive antenna system. As depicted, the modular antenna array 200 may be rectangular, and may include multiple columns and rows of antenna elements 202. For example, as shown, the modular antenna array 200 may include sixteen columns and six rows of antenna elements 202, and may have a width of about 40 inches and a height of about 21 inches (with a surface area of about 840 inches$^2$). It is to be appreciated and understood that the modular antenna array 200 and/or the antenna elements 202 therein may be any shape or combination of shapes with any suitable dimensions, and the modular antenna array 200 may include any suitable numbers of columns and rows of antenna elements 202.

The antenna elements 202 may employ any suitable type of antenna technology. In exemplary embodiments, one or more (e.g., each) of the antenna elements may employ advanced RF semiconductor technology (e.g., RF CMOS technology) to avoid excessive power requirements. In one or more embodiments, each antenna element 202 may be weightable with amplitude and phase, where the antenna elements 202, as a group, may support numerous layers (e.g., simultaneous data streams intended for multiple UEs) in the DL (e.g., 32 layers or more) and the UL (e.g., 16 layers or more). In various embodiments, the shape, dimensions, and/or the number/type of antenna elements and application of various T/Rs of a modular antenna array 200 may be selected in accordance with various aspects described herein, including, for example, to enable (e.g., operative) aggregating of multiple modular antenna arrays 200 that, in combination, function as a "coherent" antenna system capable of providing improved beamforming capabilities and supporting various communication schemes, such as MIMO (e.g., Su- and/or Mu-MIMO).

Figure 2B:
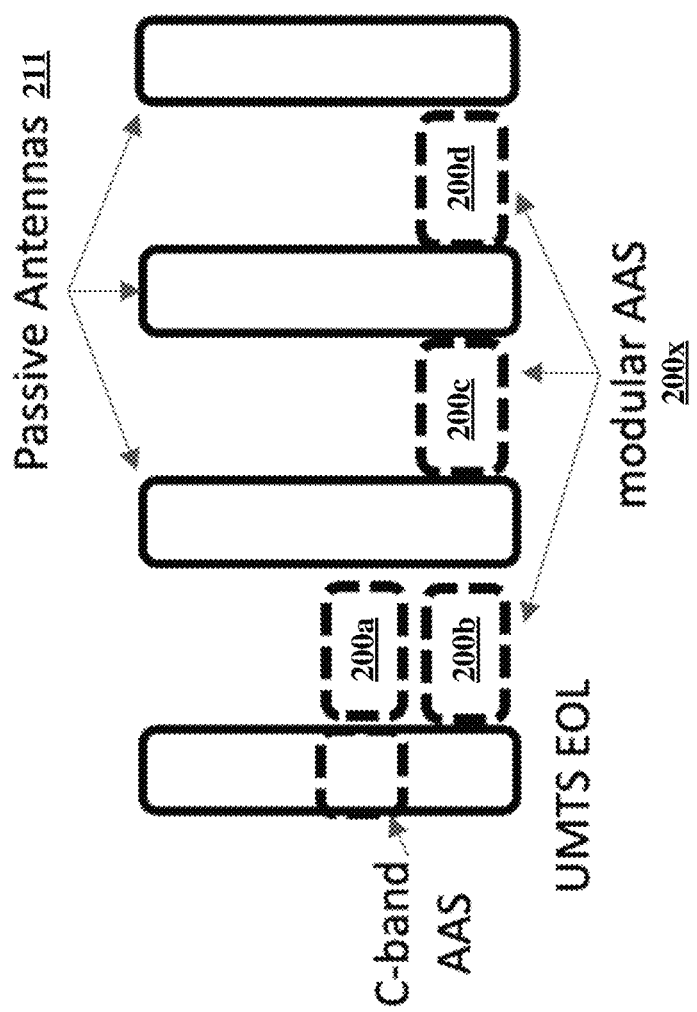
FIG. 2B depicts an example deployment of multiple instances of the modular antenna array of FIG. 2A along with other antennas in accordance with various aspects described herein.

FIG. 2B depicts an example deployment 210 of multiple instances of the modular antenna array 200 of FIG. 2A (shown in combination as modular AAS 200x and individually as modular antenna arrays 200a, 200b, 200c, and 200d) along with other antennas in accordance with various aspects described herein. In various embodiments, example deployment 210 may be disposed on, or otherwise mounted to, a tower (e.g., at a tower top) (not shown). As depicted, the modular antenna arrays 200a-200d may be arranged among other types of antennas, such as conventional, narrower passive antennas 211, a Universal Mobile Telecommunications System (UMTS) antenna, and a C-band AAS. Here, the modular antenna arrays may be operatively aggregated or combined to function as a coherent antenna system. For example, one or more of the modular antenna arrays 200a-200d may be combined with other(s) of the modular antenna arrays 200a-200d to provide coordinated beamforming and beamsteering. Given the modular nature of the arrays 200, new arrays or panels may be added to a deployment (possibly with additional processing power adds or the like, such as at a conveniently located vRAN DU 166a and/or a CU 174a of FIG. 1B, as needed) to seamlessly increase capacity without a need for an overhaul, removal, or a reconfiguration of antennas at a tower top. In some embodiments, one or more of modular antenna arrays 200a, 200b, 200c, and 200d shown in FIG. 1B may be operated in combination (i.e., as a coherent antenna system) with one or more other modular antenna arrays 200a-200d located in a different cell site. In this way, modular antenna arrays, which may not be co-located, may nevertheless be operatively aggregated or combined to function as a coherent antenna system.

It is to be appreciated and understood that the modular antenna arrays 200a-200d may be arranged with one or more other antennas in any suitable manner. In certain embodiments, one or more of the modular antenna arrays 200a-200d may be aggregated or combined with one or more other types of antennas (such as those shown in FIG. 2B) to function as a coherent antenna system.

In some embodiments, a distance, or spacing, between the various modular antenna arrays 200a-200d may necessitate different spatial sampling rates associated with the various antenna elements of the modular antenna arrays 200a-200d in order to accommodate situations where antenna elements of different arrays have differing UL and DL frequencies in order to maintain the same physical angle of arrivals/departures. In various embodiments, aggregating modular antenna arrays with certain separation between arrays may enable beamforming that might not be possible with a single antenna array having the same surface area as the aggregated modular antenna arrays.

Figure 2D:
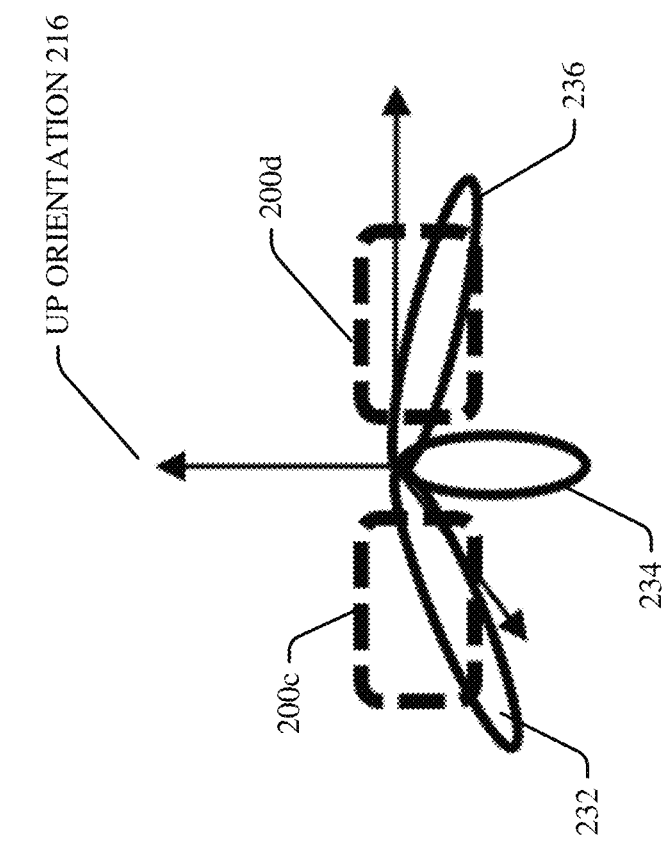
FIGS. 2C and 2D each depicts an example arrangement of multiple instances of the modular antenna array of FIG. 2A in accordance with various aspects described herein.
Figure 2C:
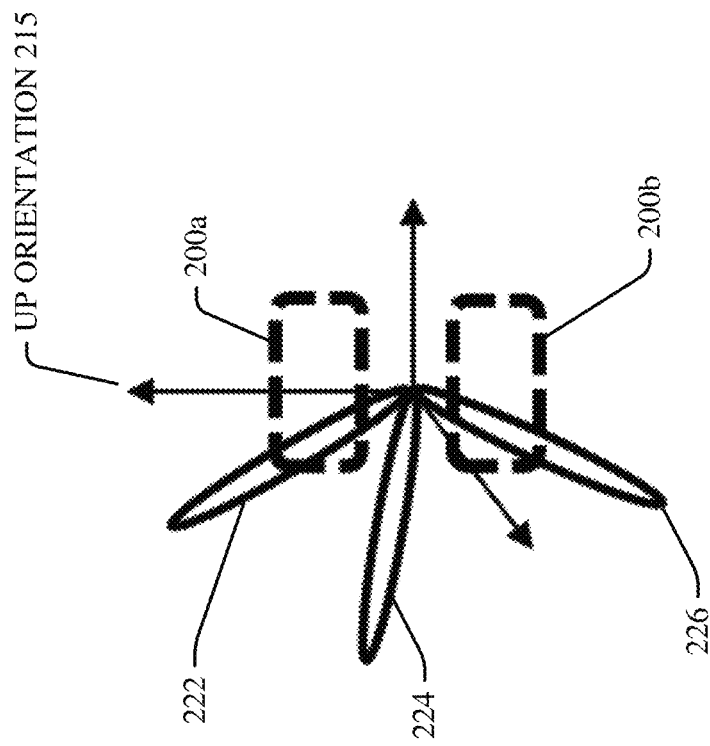

FIGS. 2C and 2D each depicts an example aggregation (or combination) of multiple instances of the modular antenna array 200 of FIG. 2A in accordance with various aspects described herein. As depicted in FIG. 2C, modular antenna arrays 200a, 200b may be aggregated (e.g., stacked) in a vertical direction relative to up orientation 215. Combining the modular antenna arrays 200a, 200b in such a manner may enable improved beamforming/beamsteering in the vertical direction (e.g., as shown by beams 222, 224, and 226). As depicted in FIG. 2D, modular antenna arrays 200c, 200d may be arranged (e.g., stacked) in a horizontal direction relative to up orientation 216. Orienting the modular antenna arrays 200c, 200d in such a manner may enable improved beamforming/beamsteering in the horizontal direction (e.g., as shown by beams 232, 234, and 236). In various embodiments, the modular antenna arrays 200a-200d may be operatively combined together, with a vertical arrangement of arrays 200a, 200b and a horizontal arrangement of arrays 200c, 200d (e.g., as shown in FIG. 2B), to enable improved beamforming/beamsteering in both the vertical and horizontal directions, depending on the needs of the particular site geometry and user location distribution.

In exemplary embodiments, aggregations of modular antenna arrays 200 may be arranged and mounted on a tower as lightweight modules, where modular beamforming and signal processing systems (which may include, for example, commercial off-the-shelf (COTs) devices, hybrid COTS devices, and application-specific integrated circuit (ASIC) daughter cards, and/or the like) may be located at a concentration point or hub, such as a centralized RAN (C-RAN) or the like. In such embodiments, the modular antenna arrays 200 may be communicatively coupled to DUs/CUs (or vDUs/vCUs, such as vDUs 166a and/or vCUs 174a) via a (e.g., preferably) open standard fronthaul (e.g., fronthaul 181a). For example, in various embodiments, aggregations of modular antenna arrays 200 may correspond to the RUs 168a. In various embodiments, there may be minimal associated physical layer 1 electronics (e.g., Low Phy electronics) and/or RF electronics disposed on the tower. Centralizing signal processing power away from the tower reduces or eliminates a need to perform tower top maintenance/replacements and allows opportunities for simple upgrade to more advanced (e.g., lower power and higher performance) semiconductor technologies every eighteen months or so cycle.

Figure 3:
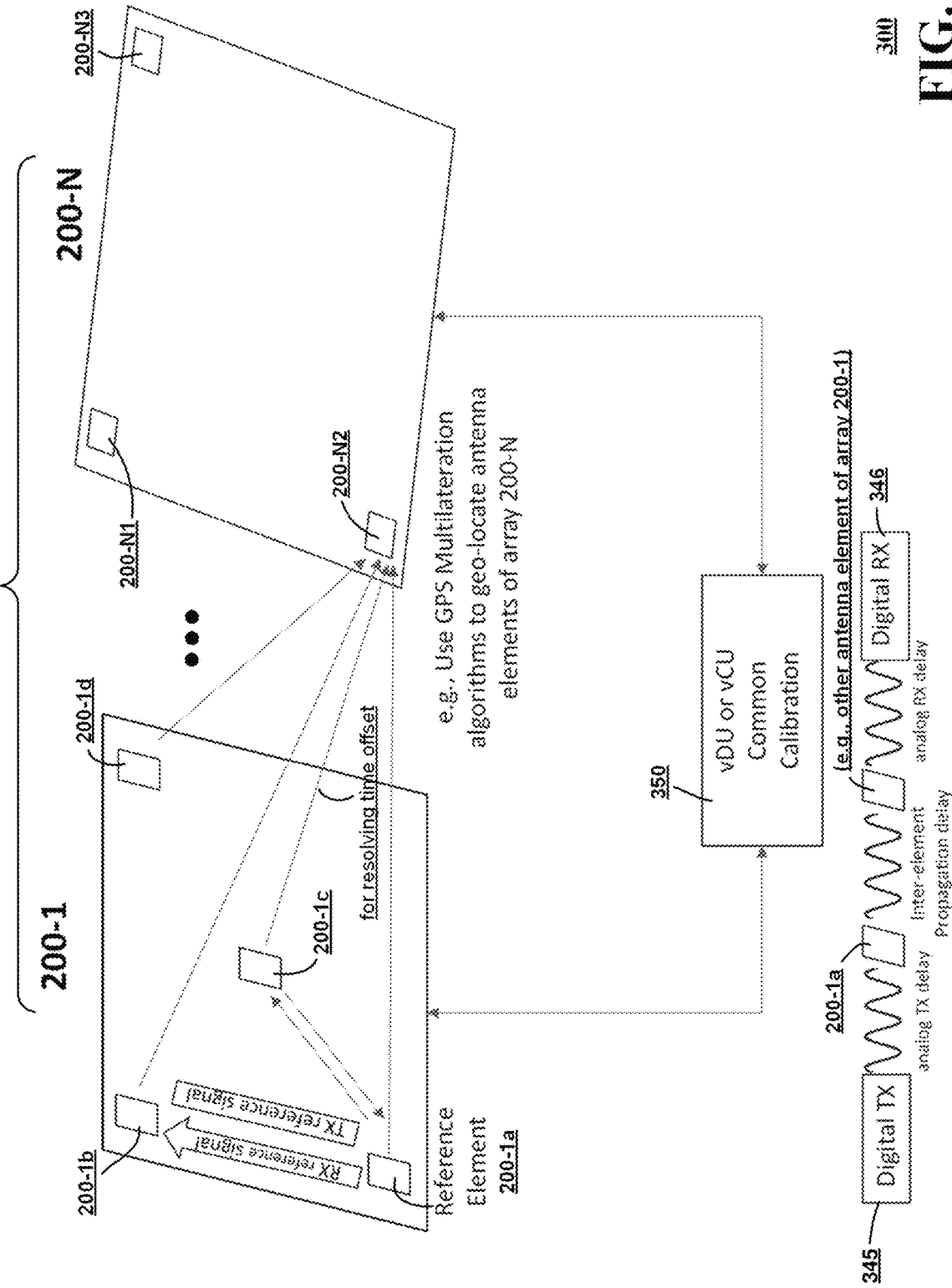
FIG. 3 is a diagram illustrating an exemplary, non-limiting embodiment of multi-array/panel antenna calibration in accordance with various aspects described herein.

FIG. 3 is a diagram illustrating an exemplary, non-limiting embodiment of multi-array/panel antenna calibration/recalibration in accordance with various aspects described herein. As shown in FIG. 3, multiple modular antenna arrays 200 (numbered 200-1 to 200-N) may be aggregated or combined to function or operate as a coherent antenna system 201. Although not shown in FIG. 3, each antenna element of each of the modular antenna arrays 200-1 through 200-N may be communicatively coupled with a respective transmitter (Tx) device (such as, e.g., digital Tx 345 or the like) for the DL and a respective receiver (Rx) device (such as, e.g., digital Rx 346 or the like) for the UL. In exemplary embodiments, various aspects of the calibration/recalibration may be applied for modular antenna arrays employed for TDD or FDD.

In exemplary embodiments, calibration/recalibration may be performed by a calibration function/device/system 350, which may be implemented in the system 162*a* (e.g., in a base station that includes the vDUs 166*a* and/or the vCUs 174*a*). In various embodiments, the calibration/recalibration process may begin by (or involve) identifying a reference antenna element (e.g., reference antenna element 200-1*a* of modular antenna array 200-1, although any antenna element of modular antenna array 200-1 may be used as a reference antenna element). A respective Rx (UL) phase offset and a respective Tx (DL) phase offset (e.g., for each of one or more tone frequencies) associated with each other antenna element of the modular antenna array 200-1, relative to the reference antenna element 200-1*a*, may then be determined so as to identify or "unwrap" phase amounts related to known propagation delays. In various embodiments, the calibration function/device/system 350 may cause the digital Tx 345 to transmit an Rx reference signal (e.g., a sine wave at the Rx frequency for, say, FDD) in order to measure the Rx (UL) delay of each of the other antenna elements of the modular antenna array 200-1. The Rx reference signal may experience an analog transmit delay, which may be associated with conversion filters and/or other electronic devices related to the reference antenna element 200-1*a*. Each other antenna element of modular antenna array 200-1, such as antenna elements 200-1*b*, 200-1*c*, 200-1*d*, etc., may receive the Rx reference signal at a respective (e.g., known or constant) inter-element propagation delay, which may be based on the (e.g., known or fixed) distance between that antenna element and the reference antenna element 200-1*a* and/or based on properties of the material(s) of the antenna elements. As shown in FIG. 3, there may also be an analog receive delay (which may be associated with conversion filters and/or other electronic devices) prior to receipt of the Rx reference signal at each digital Rx 346. Given that the reference antenna element 200-1*a*'s analog transmit delay is common to all of the other antenna elements for purposes of the Rx reference signal, the phase offset (i.e., the UL delay) of the Rx reference signal received by each of the other antenna elements of modular antenna array 200-1, relative to the reference antenna element 200-1*a*, can be based on a difference between a total duration (from transmission of the Rx reference signal to receipt of the Rx reference signal) and the known inter-element propagation delay between that antenna element and the reference antenna element 200-1*a*. Here, the calibration function/device/system 350 may thus determine the respective phase offsets (UL delays) for all of the other antenna elements, relative to the reference antenna element 200-1*a*, accordingly, and can use these respective phase offsets as part of calibrating the reference antenna element 200-1*a* and those other antenna elements.

The calibration function/device/system 350 may cause each of the other antenna elements of modular antenna array 200-1 to transmit a Tx reference signal (e.g., one at a time) to the reference antenna element 200-1*a* in order to determine the relative Tx (DL) delay associated with that other antenna element. Here, for each of those other antenna elements, the corresponding Tx reference signal may experience an analog transmit delay (which may be associated with conversion filters and/or other electronic devices related to that antenna element), and the reference antenna element 200-1*a* may receive the Tx reference signal at a respective (e.g., known or constant) inter-element propagation delay (which may be based on the (e.g., known or fixed) distance between that antenna element and the reference antenna element 200-1*a*). Given that the analog receive delay associated with the reference antenna element 200-1*a* is common to all of the other antenna elements for purposes of the Tx reference signals, the phase offset (i.e., the DL delay) of the Tx reference signal transmitted by each of those other antenna elements, relative to the reference antenna element 200-1*a*, can be based on a difference between a total duration (from transmission of the Tx reference signal to receipt of the Tx reference signal) and the known inter-element propagation delay between that antenna element and the reference antenna element 200-1*a*. Here, the calibration function/device/system 350 may thus determine the respective phase offsets (DL delays) for each of the other antenna elements, relative to the reference antenna element 200-1*a*, accordingly, and can use these respective phase offsets as part of calibrating the reference antenna element 200-1*a* and those other antenna elements.

In exemplary embodiments, for FDD and/or TDD, the calibration function/device/system 350 may calibrate the various UL delays and DL delays with one another, such that the relative delays between the UL and the DL are zero (or near zero), so as to overall calibrate the UL with the DL. Additionally, for FDD, transmissions of reference signals may need to be in the proper frequency of the intended receiver. For example, for FDD, the calibration function/device/system 350 may cause the digital Tx 345 (the DL) to switch to a frequency, at which the various digital Rx 346's (the UL) may be configured to receive, prior to transmitting the above-described Rx and/or Tx reference signals.

Calibration/recalibration, as described herein, can thus facilitate coherent beamforming and beamsteering (including, for example, for null patterns) among all of the antenna elements of the modular antenna array 200-1.

It is to be appreciated and understood that amplitude (e.g., associated with the various Tx and Rx reference signals) can also be measured and used in the calibration process described above. Furthermore, the same or a similar process may be used to calibrate the antenna elements of every other modular antenna array (e.g., modular antenna array 200-N, etc.) that is (or is to be) aggregated/combined with modular antenna array 200-1.

Depending on how the modular antenna arrays 200-1 through 200-N are installed/oriented relative to one another, antenna elements of these different arrays may be arbitrarily offset from one another in three-dimensional (3D) space. In exemplary embodiments, the calibration function/device/system 350 may determine the installation geometry of modular antenna array 200-N, relative to modular antenna array 200-1, via time difference of arrival (TDOA) or Global Positioning System (GPS) type multilateration. For example, assume that the antenna elements of each of these different individual arrays have been calibrated in the manner described above. Here, the locations of three antenna elements of modular antenna array 200-1—e.g., antenna elements 200-1*a*, 200-1*b*, and 200-1*d*—may be known. The calibration function/device/system 350 may cause each of these three antenna elements to transmit a respective signal to enable determination of the location of three antenna elements—e.g., antenna elements 200-N1, 200-N2, and 200-N3—of modular antenna array 200-N, which enables calculation of an offset of a plane of the modular antenna array 200-N relative to a plane of modular antenna array 200-1 that can be used to facilitate coherent beamforming and beamsteering between the modular antenna arrays 200-1 and 200-N. In some embodiments, the calibration function/device/system 350 may also cause a fourth antenna element—e.g., antenna element 200-1*c*—of modular antenna array 200-1 to transmit a signal, which may enable determination of a time offset for time synchronization purposes.

In exemplary embodiments, the calibration function/device/system 350 may calibrate the antenna elements of the modular antenna array 200-1 with the antenna elements of modular antenna array 200-N. Here, the calibration function/device/system 350 may determine inter-element propagation delays between the antenna elements of the modular antenna array 200-1 (e.g., each antenna element of the modular antenna array 200-1) and the antenna elements of the modular antenna array 200-N (e.g., each antenna element of the modular antenna array 200-N) based on the determined location(s) of one or more of the three antenna elements—e.g., antenna elements 200-N1, 200-N2, and 200-N3—of modular antenna array 200-N and/or based on known distances between each antenna element of modular antenna array 200-N and every other antenna element of modular antenna array 200-N. Subsequently, the calibration function/device/system 350 may employ a process similar to that described above with respect to the modular antenna array 200-1, such as identifying a reference antenna element and transmitting Tx and/or Rx reference signals to determine UL and DL offsets. For instance, the calibration function/device/system 350 may control the digital Tx associated with reference antenna element 200-1a to transmit an Rx reference signal, where each antenna element of the modular antenna element 200-N (e.g., the antenna elements 200-N1, 200-N2, 200-N3, etc.) may receive the Rx reference signal, and where the calibration function/device/system 350 may similarly determine respective Rx (UL) delays or phase offsets associated with the antenna elements of the modular antenna array 200-N relative to the reference antenna element 200-1a. Additionally, the calibration function/device/system 350 may cause each antenna element of the modular antenna array 200-N to transmit a Tx reference signal (e.g., one at a time), where the reference antenna element 200-1a may receive each of the Tx reference signals, and where the calibration function/device/system 350 may similarly determine respective Tx (DL) delays or phase offsets associated with the antenna elements of the modular antenna array 200-N relative to the reference antenna element 200-1a. The calibration function/device/system 350 may then utilize the various phase offsets to calibrate the modular antenna array 200-N with the modular antenna array 200-1.

In various embodiments, the calibration function/device/system 350 may account for waveguide and line of sight (LOS) propagation in determining UL and/or DL phase offsets and/or in geolocating antenna elements between antenna panels. Waveguide propagation may occur in a case where two modular antenna panels are coplanar and in which a transmission from an antenna element of one of the panels, such as the antenna element 200-1a of modular antenna array 200-1, may, prior to being received by an antenna element of the other panel, such as the antenna element 200-N2 of the modular antenna array 200-N, propagate along a portion of the modular antenna array 200-1 and/or a portion of the modular antenna array 200-N as a surface wave. Because the speed of waveguide propagation is slower relative to LOS propagation, any component of a total propagation delay that is attributable to waveguide propagation may need to be taken into account. In certain embodiments, a waveguide propagation delay may be determined based on properties of material(s) of the various antenna panels. In one or more embodiments, a waveguide propagation delay can be determined experimentally. In such embodiments, for example, two antenna panels, such as the modular antenna arrays 200-1 and 200-N may be positioned flush with one another, side-by-side, such that the arrays are coplanar. Here, a transmission from an antenna element of one of the panels, such as the antenna element 200-1a of modular antenna array 200-1, may encounter (e.g., mainly) waveguide propagation delay and not (e.g., minimal) LOS propagation delay, prior to being received by an antenna element of the other panel, such as the antenna element 200-N2 of the modular antenna array 200-N, in which case a particular waveguide propagation delay may be determined. The two panels may then be positioned apart from another, and a LOS propagation delay may be inferred based on a difference between a total measured delay for a similar transmission and the particular waveguide propagation delay. A similar process may be performed for one or more other antenna elements of the modular antenna array 200-N in the above-described determination of UL/DL phase offsets and/or geolocating of antenna elements between antenna panels.

It is to be appreciated and understood that the above-described process for calibration/recalibration between modular antenna array 200-1 and modular antenna array 200-N can be applied across all of the arrays of the multi-array configuration (e.g., where each array may become calibrated with each other array of the multi-array configuration 201). Additionally, in various embodiments, some or all of the above-described calibration steps/processes may be performed periodically (e.g., daily or the like) to account for any phase bias drifts. In certain embodiments, the calibration function/device/system 350 may calibrate the various UL delays and DL delays (across the multiple arrays) with one another, such that the relative delays between the UL and the DL are zero (or near zero), so as to overall calibrate the UL with the DL for the multi-array configuration 201.

Performing calibration as described herein thus enables the multi-array configuration 201 to function as a coherent antenna system that is capable of providing collective beamforming and beamsteering (including, for example, for null patterns) among all of the antenna elements of the multi-array configuration 201.

It is to be appreciated and understood that various aspects of the above-described calibration may be performed at any suitable time from manufacture of the modular antenna arrays to post-installation or -deployment. For example, calibration of antenna elements of an individual modular antenna array may be performed upon manufacture (e.g., at a factory) or offline (e.g., while the modular antenna array is not in use) after installation or deployment. As another example, calibration of antenna elements across multiple modular antenna arrays (e.g., for coherency) may be performed offline.

In certain embodiments, a least mean squares (LMS) filter can be employed to enable offline or even online optimization of antenna weights—e.g., for high signal-to-interference-plus-noise ratio (SINR) UEs (e.g., for Rx and/or Tx). The LMS filter may adjust the phases to maximize the SINR at a calibration UE location, and may store the phases as calibration phases separate from phases due to the UE channel. This approach can be most effective when the calibration errors are not relatively large, which might cause an extended LMS filter convergence issue or even non-convergence.

In various embodiments, calibration data, such as phase offsets (e.g., respective UL/DL offsets), time delays, amplitudes, etc., can be stored in the device/system 350 or other central repository, for each antenna element of each modular antenna array of a multi-array configuration, for use in UL and DL operations (e.g., by the corresponding digital Tx and digital Rx of each antenna element).

In some embodiments, delays can be translated to a slope across the frequency band, e.g., phase shift=exp(−j2πfτ) where 2π τ is the slope across frequency or rad./Hz. For example, for a 2 nanosecond (ns) delay, this is equal to a slope of $2\times10^{-9}$ seconds, with rad./Hz=(1 cycle/2π)/(cycle/sec.)=rad.-sec./(2π). Additionally, with $2\pi*2\times10^{-9}$ rad./Hz=>over 20 MHz, the phase change is $4\pi 10^{-9}*2\times10^{7}=8\pi\times10^{-2}$ rad=>0.25 rad. (14 deg.). In certain embodiments, the compensation slope across frequency for a given antenna element can be alternatively applied to the frequency domain weights to account for differences between the UL and the DL (e.g., to achieve reciprocity for TDD and also across FDD frequency differences). Further, to measure differences as small as 1 nanosecond (ns) or less, in one or more embodiments, the calibration signals (which may only be 20 MHz in bandwidth or 50 ns), can be averaged to facilitate cross correlation measurements down to $10^{-2}$ of a symbol (e.g., with 40 decibel (dB) SINR). Alternatively, in some implementations, a 100 MHz calibration signal can be generated (e.g., with 10 ns resolution) and averaged to $10^{-1}$, with a SINR of 20 dB or better.

In exemplary embodiments, UEs of a cell may need to transmit pilot signals (e.g., sounding reference signals (SRS)) over the UL, and possibly spanning across an entirety of a desired communication (or transmission) channel bandwidth. This enables the system 162a (e.g., the vDUs 166a and/or the vCUs 174a) to properly estimate the channel between a given UE (and its antenna ports) and the base station (or more particularly, between that UE and aggregated modular antenna arrays 200), which can facilitate various actions, including, for example, tracking of coherence blocks of the UE to determine whether the UE is eligible for Mu-MIMO, deriving appropriate precoding vector(s) for the DL (including, for example, for null forming, especially for a UE in Mu-MIMO mode, where nulls may need to be formed and steered in the direction(s) of other UEs when layer data is transmitted to the UE), determining appropriate combining vector(s) for the UL (including, for example, for null forming, especially for a UE in Mu-MIMO mode, where nulls may need to be formed and steered in the direction(s) of other UEs when data is received from the UE), controlling inter-cell interference, and/or the like. In Mu-MIMO, adequate CSI may be needed to provide/maintain sufficient network performance for a large number of users. Therefore, regardless of whether Mu-MIMO is employed in a higher band (e.g., the C-band) or a lower band (e.g., the Mid-band) and regardless of whether it is used in FDD or TDD, monitoring SRS data of UEs may be important for purposes of Mu-MIMO management.

While Mu-MIMO provides expanded capacity, UL coverage for a UE may be universally reduced with respect to DL coverage (e.g., due to large Tx power differences (e.g., about three orders of magnitude) between the base station and the UE), and this may be especially troublesome for UEs that are located farther away from the tower top or the aggregated modular antenna arrays 200, or in environments where UL interference can limit the UL SINR. This can result in SRS sounding deficits, and such a problem can be exacerbated in cases where a larger desired/available communication (or channel) bandwidth is employed for Mu-MIMO (e.g., 100 MHz or the like rather than 10 MHz or the like), and where a UE may be required (e.g., due poor UL conditions) to transmit pilot signals that span an entirety of that channel bandwidth, since the power of each of numerous tones that span that channel bandwidth may need to be significantly reduced in order to accommodate the transmission of all of those tones, thereby further reducing UL coverage.

Figure 4A:
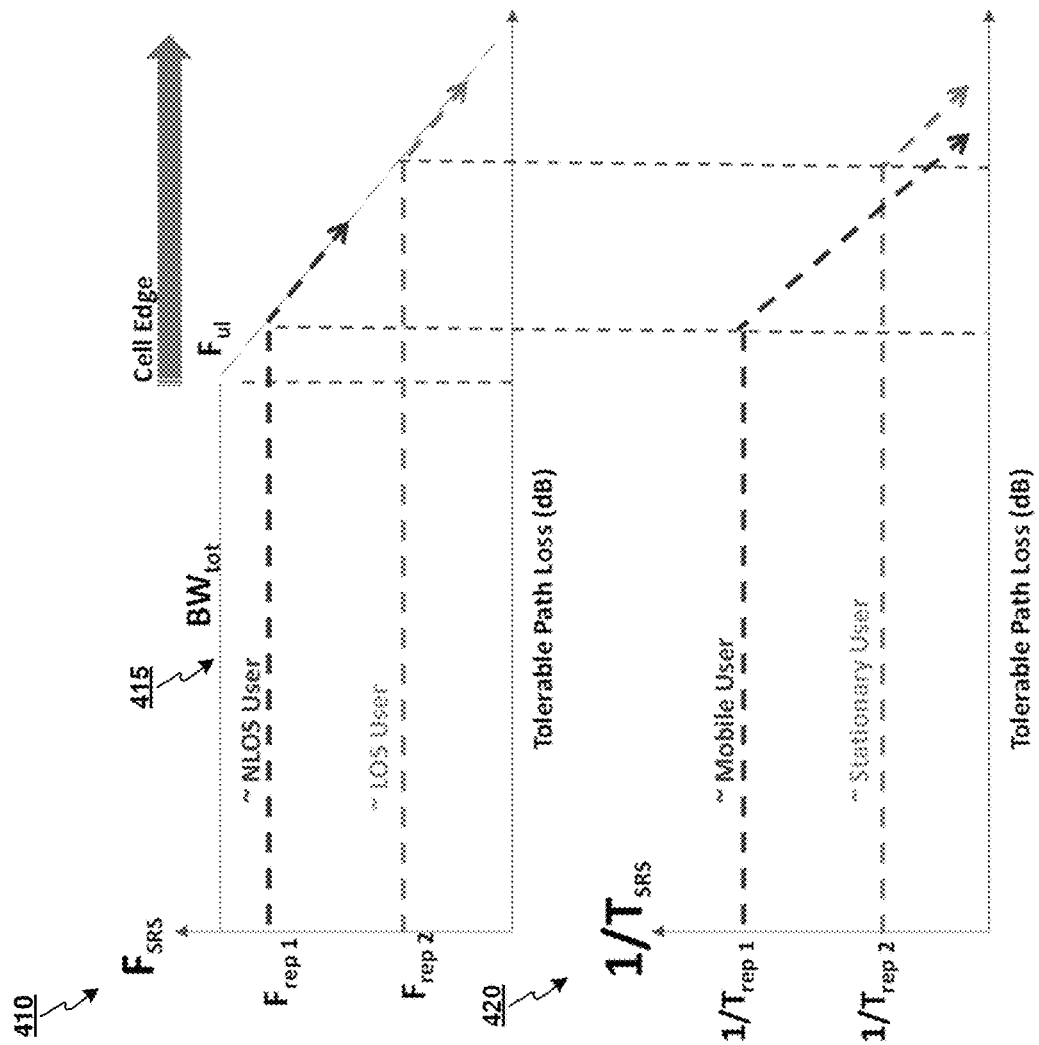
FIG. 4A is a diagram illustrating exemplary, non-limiting coherence block-related graphs in accordance with various aspects described herein.

FIG. 4A is a diagram illustrating exemplary, non-limiting coherence block-related graphs 410 and 420 that may inform adjustments that can be made to address SRS sounding deficits in coverage (e.g., for Mu-MIMO) in accordance with various aspects described herein. In exemplary embodiments, coherence block information can be utilized to enhance SRS-based channel estimation, control inter-cell interference (e.g., pilot signal distribution/control), and/or maximize UL coverage (e.g., for SRS). A coherence block can be a measure of how long and how much a channel spectrum stays constant. Frequency coherence (or coherence bandwidth) can represent a frequency band across which relative amplitudes/phases of signals at different frequencies within the frequency band are consistent. Time coherence (or coherence time) can represent a duration over which amplitudes/phases of received signals are consistent. In exemplary embodiments, a coherence block may be equal to the number of SRS symbols/samples with amplitudes and/or phases that are coherent across frequency and over time.

Since a coherence block is the product of the coherence time and the coherence bandwidth (e.g., coherence time multiplied by coherence bandwidth), a relatively large coherence block for a UE can indicate channel stability, which can reduce a need to probe the channel across a large portion, or entirety, of a channel bandwidth $BW_{tot}$ 415 in a single instant of time. That is, less SRS sampling may be sufficient for estimation of the UL channel for the UE. For example, rather than transmitting SRS (e.g., numerous tones) across a large region of interest (larger reporting bandwidth, such as that spanning 20 MHz, for example), the UE may be permitted to report SRS to the system 162a (e.g., the vDUs 166a and/or the vCUs 174a) for a smaller region of interest (smaller reporting bandwidth, such as that spanning 100 kHz, for example). Continuing the example, and additionally, or alternatively, rather than transmitting SRS more frequently (e.g., every 2 subframes), the UE may be permitted to report SRS to the system 162a less frequently (e.g., every frame), or the system 162a can use the time coherence of the channel to allow averaging of the SRS data to compensate for lower SRS SINRs at or proximate to the cell edge (e.g., within a threshold distance from the cell edge).

As depicted in graph 410, a smaller SRS bandwidth, e.g., $F_{rep2}$, may apply in a case where the coherence block is larger (e.g., for a line of sight (LOS) user or UE), whereas a larger SRS bandwidth, e.g., $F_{rep1}$, may be needed in a case where the coherence block is smaller (e.g., a non-line of sight (NLOS) user or UE). As shown, a UE with LOS may be able to tolerate a larger path loss (at or proximate to the cell edge, such as within a threshold distance from the cell edge) than a UE with NLOS, where the full channel bandwidth $BW_{tot}$ 415 may be available for the UE with LOS for farther distances from the system 162a (e.g., from the RUs 168a or the modular antenna arrays 200). This may be the case at least until the distance is large enough that a minimum UL SINR is no longer satisfied, in which case the channel bandwidth may need to be reduced for the UE with LOS to maintain coverage. Similar principles apply to time coherence, as shown in graph 420—e.g., where a stationary UE may be able to tolerate a larger path loss (at or proximate to the cell edge) than a UE in motion, and thus a longer period between SRS transmissions may be sufficient for a stationary UE to maintain UL coverage.

In exemplary embodiments, the system 162a (e.g., the vDUs 166a, the vCUs 174a, and/or the RIC, such as the RIC portion 164a-1 and/or the RIC portion 164a-2 of FIG. 1B) may determine, for UEs, adjustments to (e.g., increases or decreases in) the transmission bandwidth, the SRS bandwidth, and/or a periodicity of SRS based on their coherence blocks. For example, in a case where UL coverage is maintained, decreasing the SRS bandwidth and/or a periodicity of SRS can conserve power for a UE and improve UL coverage. A UE with a larger coherence block (e.g., where the coherence block satisfies (e.g., is greater than or equal to) a threshold), such as a UE with LOS or near LOS, a stationary or near stationary UE, or the like (which may have buffers that are continuously full or near full or where (e.g., historical) throughput is high or exceeds a threshold), can thus benefit from a decrease in transmission bandwidth, SRS bandwidth, and/or periodicity of SRS, since this would reduce or eliminate a need for the UE to transmit over a larger channel bandwidth (or, for SRS purposes, reduce or eliminate a need for the UE to frequently transmit SRS for numerous tones/subcarriers across what might otherwise be a fairly stable channel). This conserves power resources of the UE, which allows for more tolerable path loss and thus increased overall UL coverage.

For any given path loss, a stationary UE or a UE with LOS or near LOS may need to expend additional power resources for data transmissions and/or for SRS reporting purposes. Thus, in a case where UL coverage is decreasing (e.g., where a stationary or LOS UE is at or proximate to the cell edge, as shown in FIG. 4A), the UE may increase transmit power and transmit over a smaller channel bandwidth. Where such a UE increases transmit power to the point where the channel bandwidth is decreased to a minimum channel bandwidth (e.g., a minimum channel bandwidth required by a base station to maintain the UL, which may be as low as two physical resource blocks (PRBs) wide or the like), the ability to probe the full channel bandwidth may be limited, which can hinder the ability to employ Mu-MIMO. However, in exemplary embodiments, the UE's coherence block may be large (e.g., the coherence bandwidth may be relatively large compared to that minimum bandwidth and/or the coherence time may be long, such as on the order of a tenth of a second long, a second long, or longer), and thus can be exploited to maintain UL coverage and thereby enable Mu-MIMO. Here, SRS data may not be needed for an entirety of the channel bandwidth, and so the SRS provided across the smaller SRS bandwidth may be sufficient for SRS purposes given the large coherence block (e.g., long coherence bandwidths), thus permitting the UL channel to still be probed. In various embodiments, the system 162a may instruct such a UE to transmit SRS for one or more different, narrow frequency bands, which increases tolerable path loss (as compared to the full bandwidth) and thus expands the UL coverage significantly, recovers SRS coverage, and enables Mu-MIMO. In one or more embodiments, the system 162a may determine an average across coherence block(s) for such a UE (e.g., at or proximate to the cell edge) to obtain an UL channel estimate for the UE. While each of the SRS symbols/samples might be afflicted with noise given the greater distance between the UE and the base station (or more particularly, between that UE and aggregated modular antenna arrays 200), the noise may have zero (or near zero) mean and may have a finite variance, and thus averaging the SRS symbols/samples (or, in other words, gathering signal energy over coherent periods) yields a quality UL channel estimate for the UE. In exemplary embodiments, therefore, the system 162a may track the coherence block for a given UE, and exploit a large coherence block (e.g., a coherence block that satisfies a threshold) to increase tolerable path loss, and thus maximize UL coverage for the UE (e.g., by averaging the SRS over large coherence block(s)).

Accordingly, it is to be appreciated and understood that embodiments described herein enable restoration or recovery of the above-mentioned SRS sounding deficit in coverage, enabling efficient selective deployment of Mu-MIMO. For example, Mu-MIMO may be employed for UEs that have LOS or near LOS or that are stationary or near stationary (that is, multiple parallel transmissions may be facilitated, where different UEs in Mu-MIMO mode may share physical resource blocks (PRBs)), and Su-MIMO may be employed for UEs that have NLOS or that are in motion, where all of the UEs of a cell may be serviced via a scheduler using time slots, such as individual time slots for Su-MIMO transmissions and Mu-MIMO transmissions. Obtaining (e.g., via an interface, such as an O-RAN interface or the like), or estimating, coherence times and coherence bandwidths for UEs may thus prove useful for providing improved service quality and end-user experience/maximization of UL coverage/capacity optimization (by employing Mu-MIMO).

In various embodiments, the system 162a (e.g., the vDUs 166a and/or the vCUs 174a) may track coherence blocks for all served UEs. A coherence block may represent a number of coherent SRS symbols or an SRS/pilot sequence length, where a longer SRS/pilot sequence length increases the number of available, orthogonal SRS/pilot sequences that may be used by UEs (e.g., all UEs served by the cell), as well as neighbor or adjacent cell UEs, for SRS purposes. In various embodiments, the system 162a may determine the SRS/pilot sequence length and determine/generate orthogonal SRS/pilot sequences (e.g., Zadoff-Chu-based sequences or the like) based on the SRS/pilot sequence length. For example, where multiple UEs share a coherence block (that is, the UEs' SRS are consistent across a particular frequency band over a certain amount of time), a size of the coherence block can determine an SRS/pilot sequence length and/or a quantity of orthogonal SRS/pilot sequences.

Because reuse of SRS/pilot sequences in adjacent cells can result in pilot contamination, in exemplary embodiments, the system 162a (e.g., the vDUs 166a and/or the vCUs 174a) may designate a first subset or group of the SRS/pilot sequences for use in its own cell, and distribute a different subset or group of the remaining orthogonal SRS/pilot sequences to each of $N_{reuse}$ cells for use in those $N_{reuse}$ cells, where 'N' is a number of surrounding/neighboring cells across which orthogonal SRS/pilot sequences are not to be reused. In this way, no single SRS/pilot sequence of the generated orthogonal SRS/pilot sequences may be reused across the $N_{reuse}$ cells. This allows the system 162a to also perform channel estimation for UEs of a neighboring cell (e.g., based upon receiving and identifying transmissions of orthogonal SRS/pilot sequence(s) that have been distributed for use in that neighboring cell), and enables the system 162a to generate appropriate nulling for both the UL (combining weights) and the DL (precoding weights) for those UEs of the neighboring cell. In some embodiments, the system 162a may notify one or more (e.g., each) of the surrounding/neighboring cells of the first subset or group of SRS/pilot sequences, which can enable those surrounding/neighboring cells to similarly identify any UEs transmitting those SRS/pilot sequences as being served by the cell associated with the system 162a, and to similarly generate appropriate nulls patterns (e.g., in the UL and the DL) for those UEs. In certain embodiments, a surrounding/neighboring cell may, by virtue of a UE using an unrecognized SRS/pilot sequence or an already used SRS/pilot sequence, infer that that UE is being served by a different cell, and can similarly generate appropriate null patterns (e.g., in the UL and the DL) for such a UE based on the inference.

Selecting an appropriate SRS/pilot sequence length and/or the value 'N' may, therefore, be useful for maintaining orthogonality in SRS transmissions amongst UEs in a cell and across neighboring cells, which helps avoid pilot contamination, ensures proper channel estimation, and facilitates rejection of intra-cell and inter-cell interference, thereby extending UL coverage and enabling higher network throughput. In some embodiments, the system 162a may determine an SRS/pilot sequence length based on a smallest-detected coherence block, based on a number of UEs being served in the current cell, and/or based on a number of UEs being served in one or more neighboring cells to ensure pilot sequence orthogonality.

In various embodiments, the system 162a (e.g., the vDUs 166a and/or the vCUs 174a) may be configured to determine an impact zone/region around the cell associated with the system 162a in which UEs served by one or more other neighboring cells are likely to act as a source of interference to the UL of the system 162a or are likely to be subjected to interference in the DL of the system 162a. In some embodiments, the system 162a may communicate with other systems 162a (or base stations) associated with those neighboring cell(s) to identify locations of UEs served by those neighboring cell(s) as part of identifying UEs that are located within the impact zone/region. In this way, the system 162a can account for such UEs when determining a suitable number of orthogonal SRS/pilot sequences to derive and use.

FIG. 4B is a diagram illustrating the benefits of using orthogonal pilot sequences in accordance with various aspects described herein. Here, as shown by reference number 425, a UE1 connected to a first cell may utilize the same code as a UE2 connected to a neighboring cell, which may introduce interference at the neighboring cell. For proper rejection of UL interference from a UE that is served by a neighboring cell (and/or to prevent interfering with such a UE on the DL), the UL channel associated with that UE may need to be known. Accurate estimation of the UL channel of such a UE may require the use of orthogonal pilot signals. By using orthogonal codes, as shown by reference number 426, the neighboring cell may be capable of determining and forming null patterns/beams in a direction of the UE1 to facilitate interference rejection. As described above with respect to FIG. 4A, achieving orthogonality may require a sufficient number of codes (e.g., SRS/pilot sequences) to be distributed among neighbor cells, where the number of orthogonal codes may be directly proportional (e.g., nearly equal) to the length of a given coherence block. In exemplary embodiments, a minimum coherence block, radio resource control (RRC) connections, and/or the number of UEs proximate to the cell edge (e.g., at or proximate to the cell edge) may be used (e.g., in an algorithm) to determine or compute the available and needed codes. In various embodiments, a minimum coherence block may be the smallest coherence block of all UEs in the cell or all UEs in the cell and neighbor cell clusters that are intended to be included in Mu-MIMO scheduling. In one or more embodiments, a minimum coherence block may be the smallest coherence block of all UEs in the cell that are determined to be eligible for Mu-MIMO or parallel transmissions—i.e., transmissions at the same time and/or over a particular frequency band/allocation (e.g., a 5 MHz, 10 MHz, 20 MHz, or the like band) or over a certain number of PRBs or resource elements. In various embodiments, the system 162a (e.g., the vDUs 166a and/or the vCUs 174a) may determine required rejection performance, which may involve eliminating UEs (e.g., at or proximate to the cell edge (e.g., within a threshold distance from the cell edge), are traveling at high speeds (e.g., higher than a threshold speed), have severe delay spreads (e.g., greater than a threshold delay spread), and/or the like) that have relatively small coherence blocks from consideration for parallel transmissions in order to achieve orthogonal code distribution. AI/ML approaches may be employed in exemplary embodiments to assist in this complex scheduling and pilot distribution task.

Figure 4C:
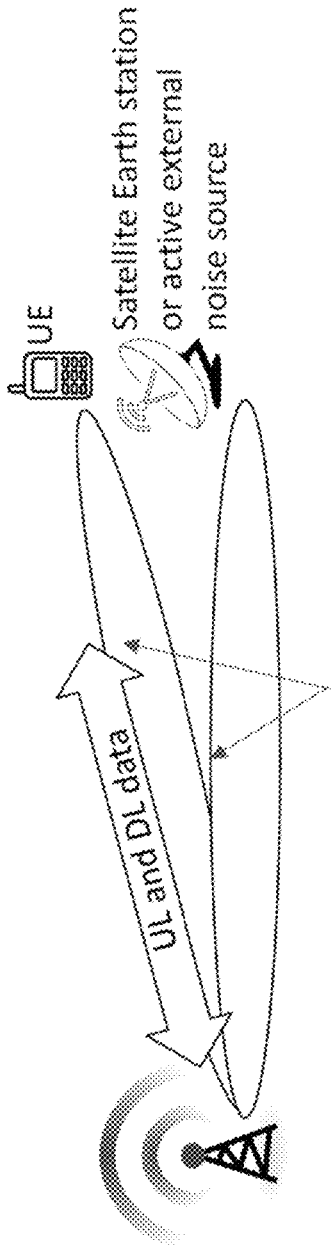
FIGS. 4C and 4D are diagrams illustrating example interference mitigation techniques in accordance with various aspects described herein.

In exemplary embodiments, the system 162a (e.g., the vDUs 166a and/or the vCUs 174a) may (e.g., using one or more AI-based algorithms or the like) be capable of monitoring for or detecting external sources and performing action(s) to mitigate interference to and/or from such external sources. For example, as shown in FIG. 4C, there may generally be external radiating/noise sources (e.g., fixed interferers) located in or near a cell, such as Earth stations (whose locations may be known), repeaters (whose locations may or may not be known), and/or the like, that might affect UL and/or DL performance or that might be affected by out-of-band emissions of the DL. In various embodiments, the system 162a may be configured to monitor for or detect level(s) of interference (e.g., in the UL) from such an external source, and perform one or more mitigative actions. In some embodiments, the system 162a may utilize available geolocation information (if available) regarding an external noise source and/or UL-received signal (e.g., post pilot removal) covariance measurements to determine adjustments for various antenna elements 202 of an aggregation of modular antenna arrays 200. For example, UL-received signals may include transmissions from various UEs as well as from external sources. Here, channel vectors associated with the UEs may be accounted for across the antenna elements 202 of the aggregation of modular antenna arrays 200 (e.g., as described in more detail below with respect to FIG. 6), where remaining covariance (e.g., as identified by eigenvalues) may inform on transmissions/interference from the external source(s). In some embodiments, the system 162a may utilize (e.g., only utilize) UL-received signals that do not include, or that are not over, SRS transmissions, which may facilitate identifying of covariance due to external source(s). In one or more embodiments, adjustments for the various antenna elements 202 may include precoding or the like for null patterns (e.g., quiescent nulls) and/or changes in beam directions, such that DL transmissions (which may, for example, include parallel transmissions in Mu-MIMO mode) may be steered away from (or avoid) the external noise source(s) and/or may null out-of-band emissions that might otherwise interfere with the external entity or entities. In certain embodiments, the system 162a may employ one or more ML algorithms to learn the spectral signatures of transmissions emitted by external noise sources (such as frequency and time signatures, angles of arrival, timing advances, etc.), and may utilize the learnings to facilitate identifying of such transmissions and/or determining of the above-described adjustments relating to steering/nulling.

In certain embodiments, an antenna system may be configured with adaptive transmit filters that limit DL transmit power. In one or more embodiments, the transmit filters may include one or more antenna patterns that are programmed (e.g., spatially and/or in frequency) to adjust a transmit filter shape to constrain transmit power, such as that for out-ofband emissions. In some embodiments, the system 162a (e.g., the vDUs 166a and/or the vCUs 174a) may be configured to control the adjusting based on one or more criteria being satisfied, such as based upon detecting a presence of external noise sources—e.g., Earth stations, repeaters, and/or the like. Enabling adaptive filtering for suppressing out-of-band emissions reduces or eliminates a need to alter or replace antennas/elements on a tower top.

Figure 4D:
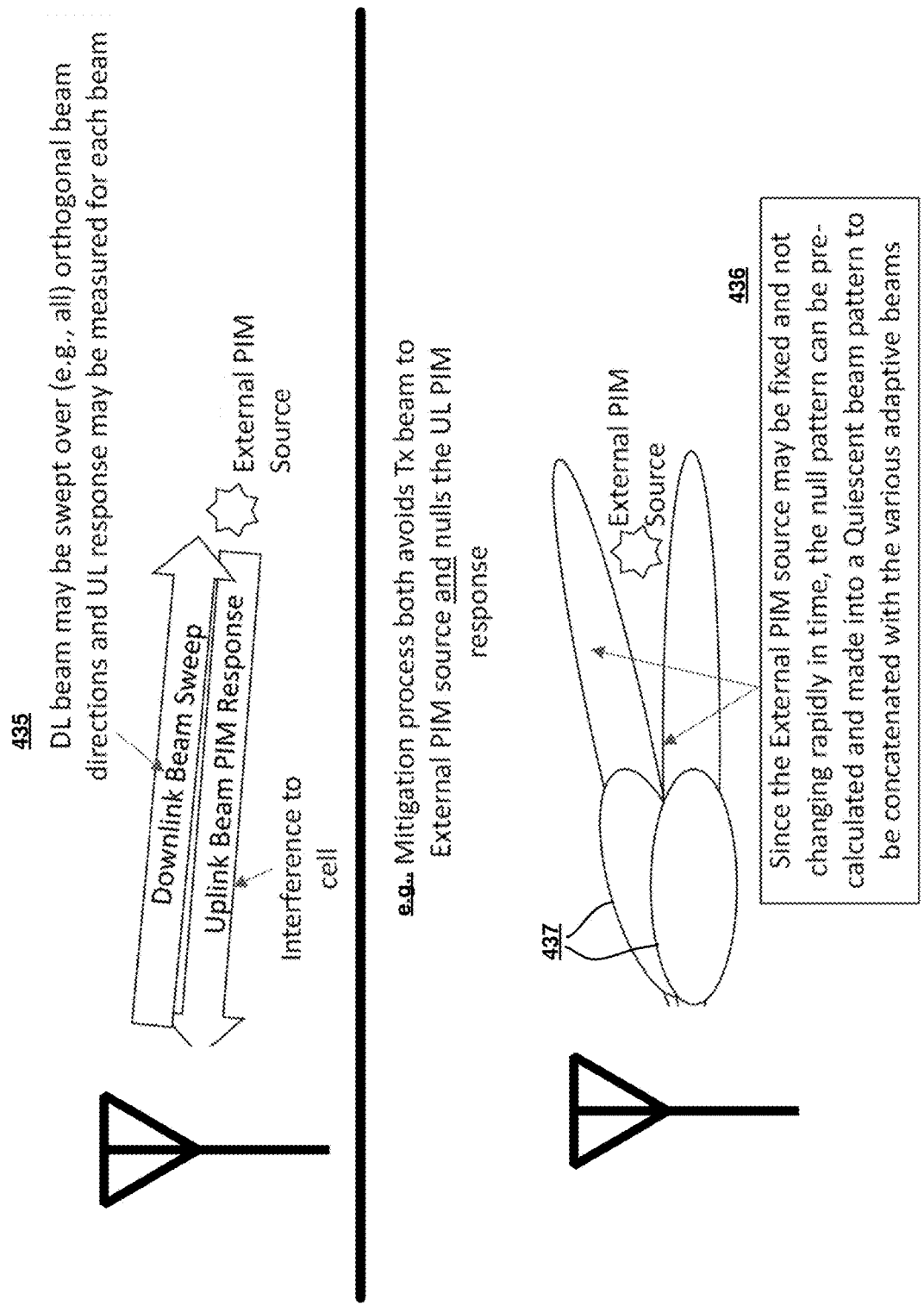

In exemplary embodiments, the system 162a (e.g., the vDUs 166a and/or the vCUs 174a) may be capable of performing (e.g., using one or more AI-based algorithms or the like) passive intermodulation (PIM)/interference cancellation to improve UL coverage. PIM interference may be due to nonlinearities that might be external to antennas, such as loose nuts/bolts, rusty appliances, etc., where such external sources, when subjected to electromagnetic waves emitted by antenna elements of one or more modular antenna arrays 200 in the DL, may generate reflections at frequencies in the UL band, which may negatively impact the UL and thus reduce the UL coverage. In certain embodiments, the system 162a may cause one or more devices (e.g., one or more aggregations of modular antenna arrays 200) to perform a beam sweep over (e.g., all) orthogonal beam directions, and may measure UL PIM responses for each beam (e.g., as shown by reference number 435 of FIG. 4D). In one or more embodiments, the system 162a may utilize available UL PIM responses to identify a direction/location of external PIM source(s) and perform one or more mitigative actions. Such action(s) may include, for example, as shown by reference number 436 of FIG. 4D, refraining from transmitting beams in the direction of the identified external PIM sources and/or determining or calculating beam patterns (e.g., quiescent nulls 437), to be transmitted by one or more modular antenna arrays 200, for nulling the UL PIM responses. This can avoid DL transmissions from radiating the PIM source, which reduces or eliminates undesired reflections thereof off of the PIM source that can otherwise result in UL interference. In various embodiments, a null pattern may be formed into a quiescent beam pattern that can be concatenated with various adaptive beams. In this way, PIM/interference cancellation can be performed to improve/increase overall UL coverage.

Figure 4E:
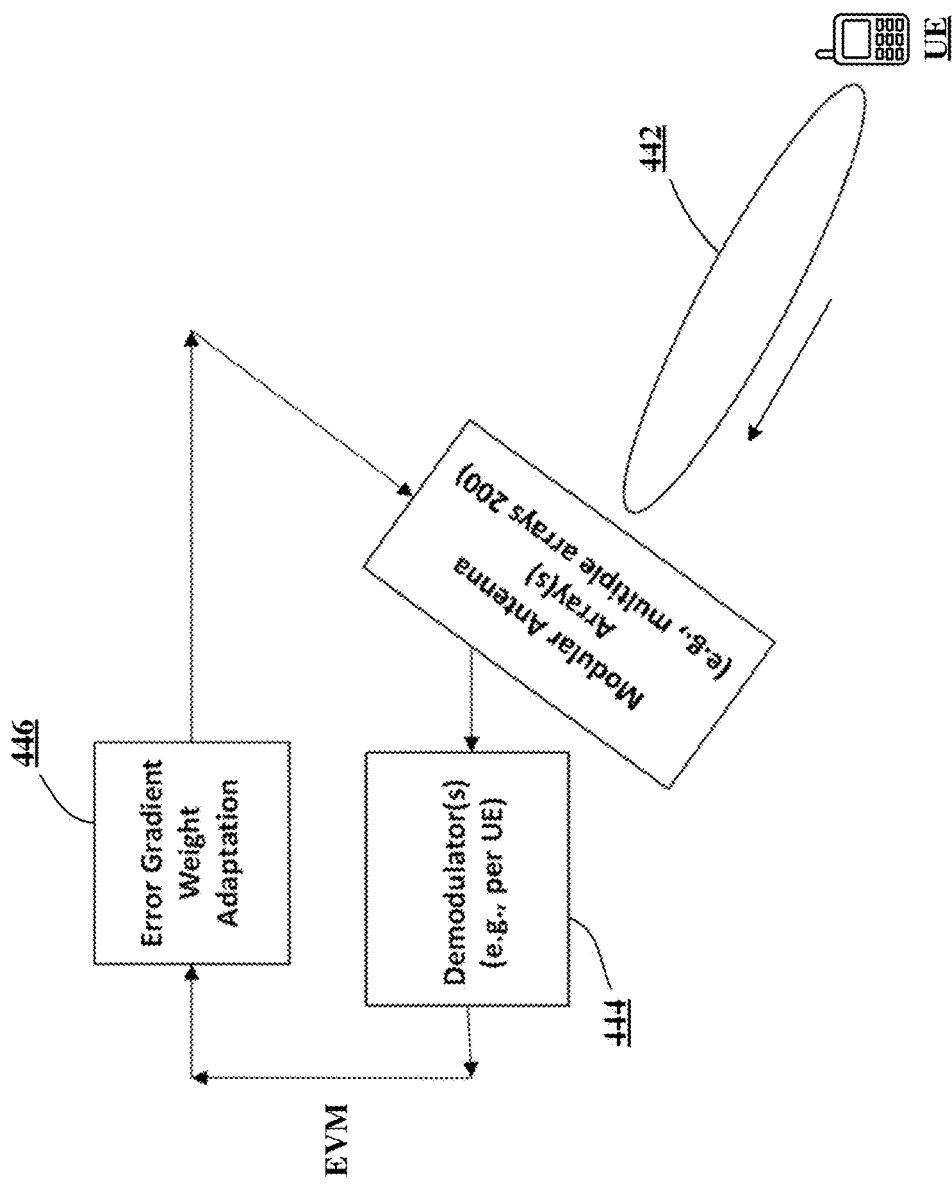
FIG. 4E is a diagram illustrating an exemplary, non-limiting system for beam optimization in accordance with various aspects described herein.

In some cases, feedback provided by a UE (e.g., a channel quality index/indicator (CQI)) may be used by a base station to adjust DL transmissions, including, for example, to adjust weights of various antennas for beamforming and beam-steering. In exemplary embodiments, UE feedback can rather be used to adjust UL weights of various antenna elements of one or more modular antenna arrays 200 to optimize processing of UL beams. Doing so may be particularly advantageous for a UE that is associated with a small coherence block (e.g., a coherence block that is smaller than a threshold), where there may be more channel estimation (SRS) errors. FIG. 4E is a diagram illustrating an exemplary, non-limiting system 440 for beam optimization in accordance with various aspects described herein. As shown in FIG. 4E, one or more modular antenna array(s) (e.g., aggregated modular antenna arrays 200) may receive a beam/signal 442 in the UL from a UE. This beam may be received in response to a request (for feedback) transmitted by the system 162a (e.g., via aggregated modular antenna arrays 200). One or more demodulators (e.g., orthogonal frequency division multiplexing (OFDM) demodulators or the like) may perform (444) demodulation on the received signal. Demodulator constellation error(s) may be determined by measuring an error vector magnitude (EVM) (e.g., the root mean square (RMS) of error vectors). At 446, an error gradient weight adaptation may be performed to adjust/revise one or more weights for one or more antenna elements of the modular antenna array(s) 200 based on the EVM. In this way, UL beam processing may be adjusted or optimized and/or channel estimation errors may be compensated for by fine tuning beam weights.

In certain embodiments, system 440 may additionally, or alternatively, be employed for calibration/recalibration purposes. Calibration/recalibration using system 440 may be performed in addition, or as an alternative, to the calibration process(es) described above with respect to FIG. 3. It is to be appreciated and understood that calibration/recalibration using system 440 may be performed offline (e.g., while the subject modular antenna array(s) are not in use) or during operations. In exemplary embodiments, calibration/recalibration may include measuring EVM(s) associated with signals received from UEs determined to be located proximate to a boresight of the modular antenna array(s) (e.g., signals having a high SINR, such as those that exceed a threshold SINR level), and performing an error gradient weight adaptation (at 446) to adjust one or more weights for one or more antenna elements of the modular antenna array(s) based on the EVM. Where determined weight adaptations for high SINR signals associated with multiple UEs (e.g., a number of UEs greater than a threshold) are the same or similar (e.g., where the difference between respective weight adaptations is less than a threshold), it can be assumed, for example, that such weight adaptations (or combinations thereof, such as average(s) thereof) would likely be effective as calibration correction(s), and the weight adaptations (or combinations thereof, such as average(s) thereof) can be stored and/or applied for use with the corresponding antenna elements of the modular antenna array(s). In some embodiments, a determination of whether an interferer is stationary can be made, where, if so, the antenna weights may be stored until the next scheduling opportunity arises and may be (e.g., continually) updated for the interferer with additional scheduling slots.

It is to be appreciated and understood that measures of EVM can be applied to various processes relating to MIMO described herein, including, for example, processing relating to FDD DL MIMO, propagation delay determinations, processing delay determinations, MIMO-related scheduling, etc.

While for purposes of simplicity of explanation, certain processes are shown/described as a series of steps/blocks in FIG. 4E, it is to be understood and appreciated that the claimed subject matter is not limited by the order of the steps/blocks, as some steps/blocks may occur in different orders and/or concurrently with other steps/blocks from what is depicted/described herein. Moreover, not all illustrated steps/blocks may be required to implement the methods described herein.

Figure 5A:
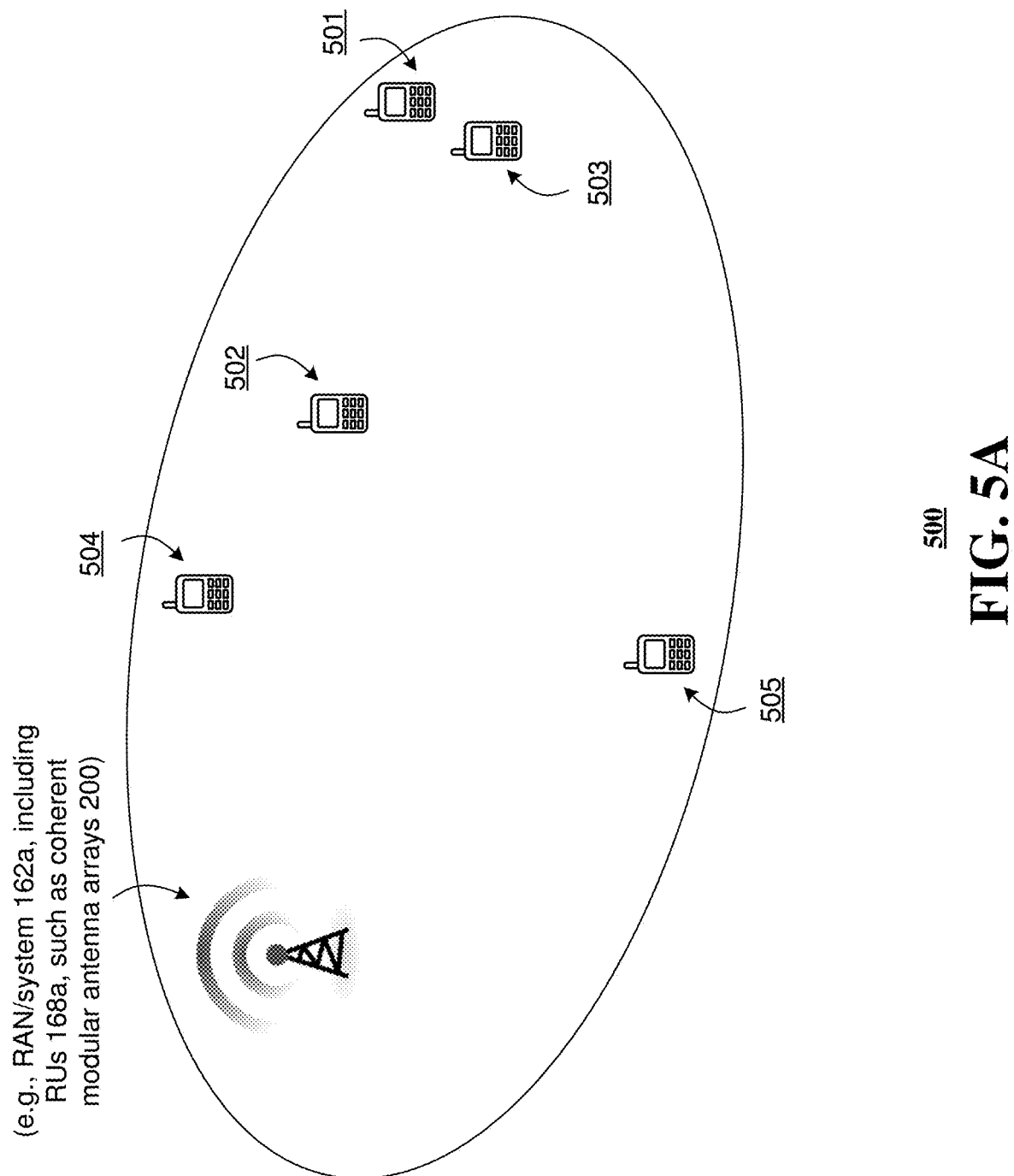
FIG. 5A depicts an exemplary, non-limiting example of multiple user equipment (UEs) being served in a cell in accordance with various aspects described herein.

FIG. 5A depicts an exemplary, non-limiting example 500 of multiple UEs being served in one or more cells in accordance with various aspects described herein. As shown, a system/RAN, such as the system 162a, which may include one or more RUs 168a (e.g., combination(s) of coherent modular antenna arrays 200), may serve multiple UEs 501-505 (e.g., corresponding to UEs 170a) in one or more cells. It is to be appreciated and understood that example 500 can include various quantities of cells (e.g., Pcells and/or Scells), various quantities of network nodes in a cell, various types of network nodes and/or cells (e.g., heterogeneous cells, etc.), and/or various quantities/types of UEs. In exemplary embodiments, the system 162a can be configured to operate in TDD and/or FDD, and may be configured to serve the various UEs 501-505 in Su-MIMO mode and/or Mu-MIMO mode. In various embodiments, and whether the system 162a operates in TDD or FDD, the system 162a may utilize the combination(s) of coherent modular antenna arrays 200 to serve the UEs 501-505 in different time slots. For example, a scheduler of the system 162a may schedule transmissions for (e.g., all) Mu-MIMO mode-eligible UEs in one time slot, may schedule a Su-MIMO mode UE in another time slot, may schedule another Su-MIMO mode UE in yet another time slot, and so on. As another example, the scheduler of the system 162a may additionally, or alternatively, schedule transmissions for (e.g., all) Mu-MIMO mode-eligible UEs over certain PRBs or over a frequency band allocation (e.g., a 5 MHz, 10 MHz, 20 MHz, or the like band).

FIG. 5B depicts an exemplary, non-limiting example of a scalable architecture 530 of aggregated (coherent) modular antenna arrays and clustered processing units in accordance with various aspects described herein. As shown, architecture 530 can include a vDU cluster 166c (also referred to as vDUs 166c, and which may be the same as or similar to the vDUs 166a of FIG. 1B) configured to perform SRS data processing (e.g., UL channel estimation in TDD and/or FDD) and determination of weights (in the UL and DL) for antenna elements of various aggregated modular antenna arrays 201a, 201b (which may each be the same as or similar to the modular antenna array 200 of FIG. 2A) mounted on a tower top 535. In various embodiments, the tower top 535 may be sectorized in three—e.g., where each sector has 120 degrees of coverage, and where the aggregated modular antenna arrays 201a may be disposed on one sector of the tower top 535, the aggregated modular antenna arrays 201b may be disposed on another sector of the tower top 535, etc.

As shown by reference number 552, the vDUs 166c (or vCU 174a or RIC portion(s) 164a-1, 2) may obtain SRS data/symbols (e.g., including amplitude and phase information) from each antenna element of each coherent array/panel of each aggregation of modular antenna arrays. In exemplary embodiments, the vDUs 166c (or vCU 174a or RIC portion(s) 164a-1, 2) may instruct a given UE, at the outset, to provide, via each of one or more antennas of the UE, an initial SRS (e.g., a known SRS symbol or the like) across an entirety of an available communication bandwidth and at a particular rate. For example, the vDUs 166c (or vCU 174a or RIC portion(s) 164a-1, 2) may instruct the UE to transmit the initial SRS for every $N^{th}$ tone (e.g., every $4^{th}$ tone or the like) across multiple PRBs 540. A PRB may span a certain number of tones/subcarriers (e.g., 12 subcarriers or the like) each separated by a subcarrier spacing (e.g., 15 kHz wide, 30 kHz wide, or the like). Based on coherence block information (e.g., as described above with respect to FIG. 4A), the vDUs 166c (or vCU 174a or RIC portion(s) 164a-1, 2) may perform one or more corresponding actions. In some cases, where the vDUs 166c (or vCU 174a or RIC portion(s) 164a-1, 2) determine, from coherence block information associated with the UE, that the coherence block is large, the vDUs 166c (or vCU 174a or RIC portion(s) 164a-1, 2) may instruct the UE to perform certain adjustments, such as to transmit SRS for a smaller region of interest of the bandwidth (e.g., for every $8^{th}$ tone across several PRBs), transmit SRS less frequently (e.g., once every two seconds), and/or the like. In various embodiments, for example, the vDUs 166c (or vCU 174a or RIC portion(s) 164a-1, 2) may, based upon identifying a band where the channel for a UE is constant or near constant (e.g., where differences between signal amplitudes/phases are within threshold(s)), the vDUs 166c (or vCU 174a or RIC portion(s) 164a-1, 2) may provide an orthogonal pilot sequence to the UE to be used for subsequent SRS transmissions across the coherence block (which may involve SRS transmissions across time in a case where the coherence block extends across multiple (e.g., OFDM) symbols in time).

As shown by reference number 554, the vDUs 166c (or vCU 174a or RIC portion(s) 164a-1, 2) may cluster the obtained SRS data, and process the SRS data for one or more (e.g., each) of the PRBs 540, which may involve cross-correlating the SRS data with known reference tones. As depicted, each array/panel may be associated with a set of PRBs 540 (e.g., 16 in a case where an array/panel supports 16 layers). In various embodiments, processing the SRS data may include performing channel estimation (with respect to amplitude and phase) for each modular antenna array and/or for an entirety of the aggregation 201a. Thus, where an aggregation of modular antenna arrays, including multiple panels, has hundreds or even thousands of antenna elements, and where (e.g., each of) the antenna elements capture a channel estimate in a certain frequency band, the vDUs 166c (or vCU 174a or RIC portion(s) 164a-1, 2) may estimate an amplitude and phase for each of the antenna elements for that frequency band.

In various embodiments, where the vDUs 166c (or vCU 174a or RIC portion(s) 164a-1, 2) obtain amplitude and phase information for different tones within the same PRB, the vDUs 166c (or vCU 174a or RIC portion(s) 164a-1, 2) may calculate an average of the amplitudes and an average of the phases for that PRB, and assign the average amplitude to one or more (e.g., each) of the tones of that PRB and assign the average phase to one or more (e.g., each) of the tones of that PRB. In some embodiments, the vDUs 166c (or vCU 174a or RIC portion(s) 164a-1, 2) may apply the same precoder weight for all of the tones of that PRB accordingly. Averaging the amplitudes and phases for each PRB can result in one PRB that included sample data and a next PRB that included sample data, to exhibit large, step-wise jumps or drops in amplitude/phase. In certain cases, the vDUs 166c (or vCU 174a or RIC portion(s) 164a-1, 2) may perform optimal interpolation for amplitude and phase values of any PRBs that may have been skipped in the SRS sampling (e.g., that may not have included any amplitude or phase data) based on bandpass (or similar filters) filtering of the data after transformation via Fast Fourier Transform (FFT) of the frequency data. The subsequent sampling can be made to be optimal (in the sense of recovering (e.g., all of) the original filtered data) via the Nyquist sampling theorem.

As shown by reference number 556, the vDUs 166c (or vCU 174a or RIC portion(s) 164a-1, 2) may share multiple matrix inversions (which may, for example, relate to one or more processes described below with respect to FIG. 6) across all coherent panels and PRBs (e.g., by splitting up the PRB workload) as a function of PRB, UE, and/or layer data.

As shown by reference numbers 556 and 558, the vDUs 166c (or vCU 174a or RIC portion(s) 164a-1, 2) may aggregate calculated UL combining beam weights and DL precoder beam weights (e.g., amplitudes and phases, which may be unique for each frequency, each PRB, or across multiple PRBs, depending on the coherency bandwidth) for each antenna element of each array/panel, and may send the UL and DL beam weights (including, for example, data regarding beam pattern formation) to the corresponding array/panel of aggregated modular antenna arrays 201a, 201b, etc. The antenna elements of each array/panel of each aggregation of module antenna arrays can then be controlled to form narrow beams to individual UEs, and properly process beams incoming from the individual UEs, based on the DL and UL weights, respectively. In this way, a distributed processing system can be positioned at a central (or hubbing) location, and can accumulate and process partial data from each modular antenna array. As described in more detail below, in exemplary embodiments, the UL and DL weights for each antenna element may be different.

In some embodiments, the vDUs 166*c* (or vCU 174*a* or RIC portion(s) 164*a*-1, 2) may share the generation of the complete multi-panel matrices (e.g., compute scaling may be required) and, after inversion, communicate the segments of the beam weight matrices to each corresponding array/panel. In certain embodiments, UL weights may be updated per slot, and DL FDD data may be updated per 3 dB covariance change to accommodate changes in a large scale multipath environment. FDD data can exploit changes in a microscopic fading environment (e.g., over constant large scale fading) to update the statistical information.

It is to be appreciated and understood that the above-described processing of SRS data can be scalable with the addition of more arrays/panels at the tower top 535.

In TDD, antenna elements operate—i.e., transmit (DL) and receive (UL)—at the same frequency band or channel, but simply at different times (e.g., different time slots). Because the UL and DL utilize the same frequency or spectrum, channel estimation for the UL can be applied to the DL in TDD (e.g., assuming that the DL is calibrated with the UL and precoder DL weights are utilized for/within a coherence block determined from UL SRS). FDD allows for exchange of communications in both directions simultaneously, since the UL and DL operate in different frequency bands or channels. However, because of the difference in UL and DL frequencies, channel estimation of the FDD UL cannot simply be applied to the FDD DL. For example, it cannot safely be assumed that just because there is fading in the UL that there is similar fading in the DL. A poor or improper channel estimation of an FDD DL can negatively impact transmission bandwidth/speed and render it difficult to derive appropriate null patterns for neighboring UEs (e.g., in Mu-MIMO mode).

In exemplary embodiments, to compensate for different phase changes that signals of different frequencies may experience in a channel, information (e.g., statistical data) regarding FDD UL(s) can be used (e.g., averaged) to predict the FDD DL. In various embodiments, channel statistics can be extracted from UL-received signals for different UEs (e.g., the UEs being served by the cell), and combined (e.g., averaged) to predict the large scale fading DL channel. Combining or determining an "expectation" of (e.g., an average of) UL channel statistics can provide information regarding a general "shape" of the large scale fading channel, and enables determination of the general (e.g., azimuth) direction of neighboring UEs relative to the aggregated modular antenna arrays 200, which can aid in identifying appropriate, narrow null patterns for those UEs. For example, in a case where there is fast fading in the FDD UL (e.g., where coherence time of the channel is relatively small or where amplitude/phase vary considerably over a short period of time), for example, the fast fading can be averaged over a predefined (e.g., reasonable) time and used to derive appropriate, narrow null patterns for neighboring UEs.

In conjunction with the ability to form narrow beams using aggregated modular antenna arrays, being able to form narrow null patterns enables finer separation of UEs, and thus more efficient and effective Mu-MIMO in FDD and optimized capacity.

As an example, in FDD, assume that the system 162*a* determines, based on tracking of coherence blocks of multiple UEs—e.g., UEs 501, 502, and 503 of FIG. 5A, that there is a coherence block, for each of these UEs, over a 1 MHz band of a 100 MHz channel bandwidth and over a time period of 1 ms. That is, assume that the coherence block, for each of these UEs, spans 1 MHz in frequency and 1 ms in time, such that SRS is constant over this block, and where SRS then changes for the next 1 MHz in frequency and next 1 ms in time, and so on. A quantity of orthogonal pilot/SRS sequences (e.g., Zadoff-Chu sequences) can be determined based on this coherence block size, which can enable a corresponding quantity of UEs to be multiplexed across each of these coherence blocks, where the orthogonal pilot/SRS sequences may be reused, for example, for each 1 MHz band across the 100 MHz channel bandwidth. Here, the system 162*a* may measure the UL channels for each of the UEs (e.g., UEs 501, 502, 503, etc.) by performing cross correlation (where the orthogonal pilot/SRS sequence for that UE may be extracted/removed and cross correlation of channel vectors for that UE may yield a complex number that represents that UE's channel), and averaging different, independent samples of that UE's channel as the channel changes every 1 MHz band and/or as the channel changes every 1 ms in time. This enables determination of appropriate FDD DL weights for the multiple UEs to be multiplexed in Mu-MIMO mode. In exemplary embodiments, while FDD UL weights for these UEs may be periodically updated (e.g., per slot as briefly described above), the FDD DL weights for these UEs may (e.g., may only) be updated based on detecting a change in cross covariance (which may, for example, be due to movement of one or more of these UEs and thus changes in multipath) that satisfies a threshold (e.g., a change in cross covariance that is greater than 3 dB or the like). In various embodiments, a change in a general "shape" of a UE's spatial correlation data—e.g., which may be determined from recalculating $R_k$ described in more detail below with respect to FIG. 6—may trigger FDD DL weight(s) to be updated.

FIG. 6 shows exemplary, non-limiting equations 620, 630, 640, and 650 that can be applied to implement Mu-MIMO in accordance with various aspects described herein. Generally speaking, one or more embodiments described herein can perform DL channel estimation based on UL performance indicators, despite the DL and UL channels being operated at different frequencies. DL channel quality estimation can be useful for DL precoding and for preventing interference between multiple beams of a Mu-MIMO system. Exemplary embodiments provide an example heuristic algorithm for DL beamforming, with some implementations being based on a given UL CSI over a narrow frequency/spatial range. It is to be appreciated and understood that different modifications and expansions of the algorithm may be made to facilitate use thereof in other contexts or circumstances. The example algorithm may employ an M×M matrix inversion for the DL precoder and Eigenvector calculation, where various principles described herein can also apply to K×K matrices. Here, performance of the example algorithm is quantified for three cell scenarios.

In a first scenario, a single cell may be served by a MIMO base station (e.g., the system 162*a*, such as the vDUs 166*a* and/or the vCUs 174*a*) with an M element MIMO antenna array (e.g., modular antenna array(s) 200 or the like) serving K users (e.g., UEs), each having a single Rx antenna. In this example, weight coefficients may be applied to the antenna elements of the MIMO antenna array according to equation 620, where W is the M×K matrix of weight vectors, where each column is the complex weight vector to be applied to serve a given UE, where H is the M×K channel matrix, where each of the K columns represents the channel vector whose elements are the complex-valued channel gain between each MIMO antenna element and the single Rx antenna of the UE, where the [*] denotes a conjugate transpose, where $I_M$ is the M×M identity matrix, where $\sigma^2$ is the noise at the UE, and where $p=P_{Tx}/K$ is the total transmit power of the base station divided by K (e.g., the number of UEs). In one approach, the channel vectors that can comprise H may be channel vectors obtained within a given coherence block acquired from the use of orthogonal pilot signals transmitted from each UE at the UL frequency. In various embodiments, equation 620 (or a similar equation) may be applied for estimating a TDD UL, a TDD DL, and an FDD UL. In some embodiments, complex values may be obtained for each antenna element based on received UL signals (e.g., pilot signals, where known (e.g., orthogonal) SRS sequences may be removed).

In some circumstances, it may be difficult to utilize weights equation 620 for FDD DL beamforming since the H matrix in equation 620 describes CSI at the UL frequency, which may be significantly different from that at the DL frequency. This difference is primarily due to differences in phases acquired when ray paths of the same length are traversed at different wavelengths. This can, for example, affect the fast-fading component of the CSI. While the H matrix contains contributions from both fast-fading components and slow-fading components of the channels, the spatial correlation matrix R, defined for a single channel by equation 630, describes contributions only from slow-fading components, e.g., path loss, shadowing, and spatial correlation.

In equation 630, $h_k$ is an M×1 complex channel vector for the $k^{th}$ UE and E{ } denotes an expectation value. It is noted that R is an M×M complex matrix because h h* denotes an outer product (rather than an inner product) of the channel vectors. Thus, as it primarily describes slow-fading characteristics, it is expected that the spatial correlation matrix R will be much less sensitive to changes in frequency. The heuristic beamforming approach described in this example can generalize the regularized zero-forcing method in equation 620 such that it is expressed in terms of spatial correlation matrices rather than H matrices. Though these spatial correlation matrices may be constructed from channel vectors acquired at the UL frequency, in one or more embodiments, by taking the expectation value, which, in practice, might be accomplished by averaging $h_k h_k^*$ over many coherence blocks, the resulting spatial correlation matrices can be relatively insensitive to frequency as compared to other approaches. An example of this approach is described by equation 640, with the M×M matrix Q being the sum over spatial correlation matrices for all UEs in the cell, e.g., depicted in equation 650. In one or more embodiments, the M×K matrix V appearing in equation 640 can be constructed by taking the M×1 dimensional eigenvector of $R_k$, with the largest eigenvalue and concatenating those eigenvectors for each of the K users, to form the columns of the matrix V. Before applying them, each of the weight vectors in the columns of the M×K dimensional matrix W can be normalized such that the power transmitted by the base station to each UE is $p=P_{Tx}/K$. In certain embodiments, the eigenvector with the largest eigenvalue can be simply replaced with the estimated channel vector for the UE of interest. In various embodiments, equations 630, 640, and/or 650 (or similar equations) may be used for predicting an FDD DL. For example, equations 630, 640, and/or 650 may be used for predicting an FDD DL for UEs in Mu-MIMO mode scheduled for a particular time slot over a particular set of PRBs, where SRS transmitted by such UEs (and not other UEs that may be in other modes, such as the Su-MIMO mode) may be used to determine the channel vectors. In various embodiments, the known channels can be replaced by covariance functions for FDD (and TDD) applications where significant interference is expected.

Figure 7:
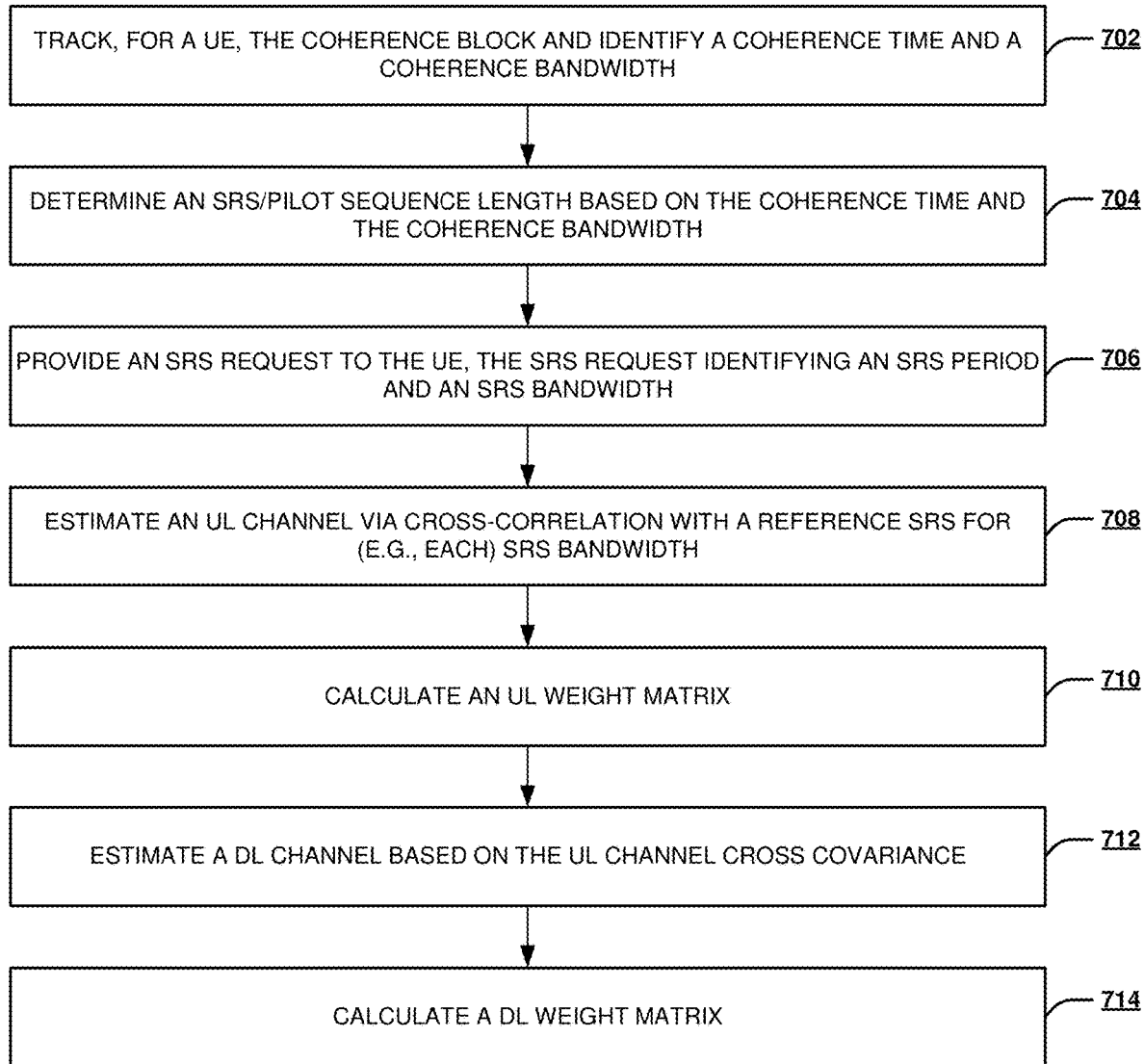
FIG. 7 depicts an illustrative embodiment of a method for FDD Mu-MIMO in accordance with various aspects described herein.

FIG. 7 depicts an illustrative embodiment of a method 700 for FDD Mu-MIMO in accordance with various aspects described herein.

At 702, the process may include tracking, for a UE, a coherence block and identifying (e.g., estimating or obtaining) a coherence time ($T_c$) and a frequency coherence bandwidth ($F_c$). In various embodiments, estimation of $T_c$ and/or $F_c$ may be fine-tuned for errors (that might be imparted to channel estimates) via a feedback mechanism.

At 704, the process may include determining an SRS/pilot sequence length based on $T_c$ and $F_c$. For example, the SRS/pilot sequence length may be $\leq T_c * F_c$. The SRS/pilot sequence length may inform the number of unique SRS codes that can be deployed to a cluster of cells. In various embodiments, the values $T_c$ and $F_c$, for a UE that has the smallest coherence block (e.g., fewest number of SRS symbols) relative to other UEs, may be used for determining the SRS/pilot sequence length. In some embodiments, a coherence block threshold may be defined for determining whether a UE may be eligible for parallel transmissions or Mu-MIMO. In a case where a UE's coherence block does not satisfy the threshold (e.g., is less than or equal to the threshold), the UE may be determined to be ineligible for parallel transmissions or Mu-MIMO. In such a case, that UE's coherence block may or may not be used in the determining of the SRS/pilot sequence length.

At 706, the process may include providing an SRS request to the UE. In various embodiments, the SRS request may identify an SRS period PI (where, for example, $PI<T_c$), and SRS bandwidth B (where, for example, $B<F_c$), etc.

At 708, the process may include estimating an UL channel for the UE via cross-correlation with a reference SRS for (e.g., each) SRS bandwidth B. In various embodiments, and in a case where $PI \ll T_c$, an estimate may be improved via averaging. In some embodiments, such as in a case where the UL SINR is poor for a UE (e.g., satisfies (e.g., is less than or equal to) a threshold SINR) and $PI \sim T_c$, the process may include imposing UL Tx power control for the UE to obtain an improved estimate in such cases where averaging might not be possible.

At 710, the process may include calculating an UL weight matrix. In exemplary embodiments, the UL weight matrix may be calculated using the formula: W (M×K)=$H^d$ ($\sigma^2/P_{ui}$ $I+Q^d)^{-1}$, where $H^u$=UL channel matrix (M×K), M=number of adjacent antenna elements, K=number of UEs, Q=H*H (K×K), $\sigma$=UL noise standard deviation, and $P_{ui}$=UL UE Rx power for the $i^{th}$ UE. In various embodiments, scheduling slots (e.g., each scheduling slot) may be updated.

At 712, the process may include estimating a DL channel based on the UL channel cross covariance, $Q^u=E\{Q^d\}$, where it is assumed that stationary ergodicity can be estimated as a time average. In various embodiments, Q=(1/L) $\Sigma_1^L H^*H$, where H=the UL matrix of M×K channel estimates.

At 714, the process may include calculating a DL weight matrix. In exemplary embodiments, the DL weight matrix may be calculated using the formula: W (M×K)=$H^d$ ($\sigma^2/P_{di}$ $I+Q^u)^{-1}$. In exemplary embodiments, $P_{di}$ may be equal to the downlink Tx power allocation to the $i^{th}$ UE (which can, for example, be adjusted based on "priority"). In various embodiments, the weight matrix may be adjusted for the DL and UL frequency difference (e.g., interpolated for downstream higher than the uplink SRS estimates). $H^d$ can be an averaged estimate, an eigenvector calculation from M×M channel outer product E{hh*}, or can be from Type I UE feedback (e.g., at the expense of DL CSI-RS overhead and UL precoding matrix indicator (PMI) feedback). In one or more embodiments, the DL weight matrix may be adjusted for DL/UL frequency deltas. In certain embodiments, the DL weight matrix may (e.g., may only) be calculated or updated in cases where the channel covariance changes significantly (e.g., multipath environment changes) rather than in cases of microscopic changes (e.g., fast fading, etc.).

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In certain embodiments, coherence Time ($T_c$) may be computed. $T_c$ may determine (i) how often FDD DL weights are updated (e.g., an "independent sample" may be added), where weights may be fixed for ($<T_c$), and (ii) a maximum interval that FDD UL SRS can be measured, where UL weights may be fixed for ($<T_c$). $T_c$ may determine if SRS pilot signal(s) can have reduced bandwidth (e.g., at or proximate to the cell edge) to satisfy UE maximum transmit (Tx) power constraints, while still maintaining coherence time constraints. For example, a long $T_c$ can benefit a UE at or proximate to the cell edge (e.g., without sufficient Tx power to send the full SRS bandwidth) by allowing the UE to transmit portions of the SRS constant over the coherence bandwidth ($F_c$). In some embodiments, FDD DL calculations may include averaging over coherence time intervals, up to a time where large scale channel parameter(s) deviate (e.g., where the shape of the coherence time or $T_c$ changes significantly, such as by 20% or more or the like).

In certain embodiments, coherence bandwidth ($F_c$) may be computed. $F_c$ may determine the number of tones/PRB s where the DL weights can be the same per antenna element (e.g., not including interpolation after the weight calculation (s)). $F_c$ may also determine how often frequency domain averaging for FDD can be performed for computing DL weights (e.g., FDD covariance averaging can be performed over frequency bins/tones on the order of the $F_c$ until a time where the frequency covariance changes significantly, such as by 20% or more or the like). $F_c$ may additionally determine how wide the SRS needs to encompass, unless $F_c$ is about equal to the system bandwidth (e.g., flat fading).

In certain embodiments, a covariance function change may occur when "shapes" of time (e.g., coherence time) and bandwidth (e.g., coherence bandwidth) curves change (e.g., significantly, such as beyond a threshold). FDD DL weights may be adjusted based on such a covariance function change. Where the shapes are the same (or similar), the covariance function can be averaged (e.g., an exponential weighting function or a first order recursive average calculation may be performed).

An adaptive weighting factor may vary as the shape(s) of the function(s) change. For example, assuming a default of 1 meter with user velocity calculated and time constant: T=1 meter/UE velocity (meters/second (m/s)).

A cluster Blk may be approximately equal to min(Blk per UE). A coherence block (Blk samples) may be equal to coherence time ($T_c$)*coherence bandwidth ($F_c$), which may be greater than (>) SRS length (e.g., approximately the number of UEs served by the cell in addition to the number of first tier neighbor cell UEs). That is, Blk may determine how many orthogonal UL SRS sequences can be used per cell cluster (e.g., the serving cell and/or first tier neighbor cell(s)). The number of layers K may be less than (<) overhead (OVH)*Blk/$N_{reuse}$=0.1*Blk/4=0.025*Blk, where Blk>640 for K=16, OVH=10%, and $N_{reuse}$=4. If Blk=640 and $F_c$~500 kHz, then $T_c$=640/500 kHz=1.3 milliseconds (ms) (or greater). If Blk is this long, for example, there may be sufficient SRS Zadoff-Chu sequences for about 600 orthogonal SRS users for the cell cluster (e.g., serving cell and first tier neighbor cell(s)). Covariance function decorrelation may be the time or frequency when the function is 3 dB down from the peak, and this may be where FDD DL weights are updated (and/or SRS is updated to track microscopic fading). In certain embodiments, OVH (e.g., pilot signal overhead per Blk) may be equal to the number of pilot samples per coherence block: the number of active users per cell (K)*sequence reuse factor ($N_{reuse}$)=K*$N_{reuse}$/Blk. Keeping OVH<10% might yield K*$N_{reuse}$/Blk<0.1, where for $N_{reuse}$=4: K/BLK<0.025. Throughput ($T_{put}$) may be approximately equal to (1−OVH)*K*DR, where OVH=K*$N_{reuse}$/Blk, and where optimal K≤Blk/2. In some embodiments, ranges of Blk may be in the area of $F_c$~500 kHz and $T_c$~1 to 100 ms—e.g., BLK~500 to 50,000. Where OVH is constrained to <0.1, for example, then K<0.025*Blk or Ko=12.5 to 1250.

FIG. 7A depicts a table 720 and example equations—EQ 1 and EQ 2—that can be applied to mitigate various types of input interference in accordance with various aspects described herein. As depicted, input interference may, from the perspective of a jth serving cell, originate from one or more mobile UEs in a neighbor cell '1' (i.e., lower case L), one or more fixed UEs, one or more external active sources Tx, one or more external passive sources Rx, and/or one or more PIM sources. Here, for example, the system 162a of FIG. 5A (e.g., the jth serving cell) may, as part of serving UEs 501 to 505, identify such input interference, and apply EQs 1 and/or 2 to define nulling for one or more external interferers associated with neighbor cell '1'. EQ 1 may represent a minimum mean square estimate of a channel $H_{li}$, given an observation yli (which may be known). Similar to equation 630 of FIG. 6, $R_{li}$ may represent an expectation of h h*; that is, $R_{li}$=E{$h_{li}h_{li}$*}. In EQ 2, $\Psi_{li}$=E{$y_{li}y_{li}$*}. Generally speaking, table 720 and EQs 1, 2 enable calculation of the covariance, where interference from an external interferer (which may be independent of noise and signal) may be identified, such as in a case where the interference is larger than the signal. Obtaining an inverse (or reciprocal) thereof enables nulling out of that interference in a general direction of the external interferer. In various embodiments, equation 620 of FIG. 6, for example, may apply for a particular (e.g., optimum) scenario where the channels for served UEs (e.g., all served UEs) are known and noise is identified. There, UEs (e.g., UEs 501 to 505 of FIG. 5A) may actively transmit SRS (known orthogonal pilot sequences), which may be cross correlated out to obtain a channel model for each of the UEs, where a channel model for a given one of the UEs may involve multipath signals (arriving at different angles) that may need to be nulled when transmissions are received/transmitted for another one of the UEs. Referring back to FIG. 7A, after obtaining the auto-covariance based on received signals (which may include external interference), for a given UE, such as UE 501 of FIG. 5A, summation (e.g., R) of known information (e.g., known channels as per equation 620 of FIG. 6) for other served UEs (such as UEs 502 to 505 of FIG. 5A) can be subtracted from the autocovariance to identify or isolate the (e.g., general direction of the) external interference. Here, as depicted in table 720 of FIG. 7A, for certain input interference, equation 620 of FIG. 6 may be adapted, for TDD, such that ψ (i.e., EQ 2) may be substituted for the term "$I_M+H H^*$" in equation 620, and equation 640 may be adapted, for FDD, such that ψ (i.e., EQ 2) may be substituted for the term "$I_M+Q$" in equation 640. In various embodiments, for FDD precoding, a resampling approach may be used to account for the angle of arrival. In this way, nulling can be effected for UEs 502 to 505 as well as for the external interference.

Figure 7B:
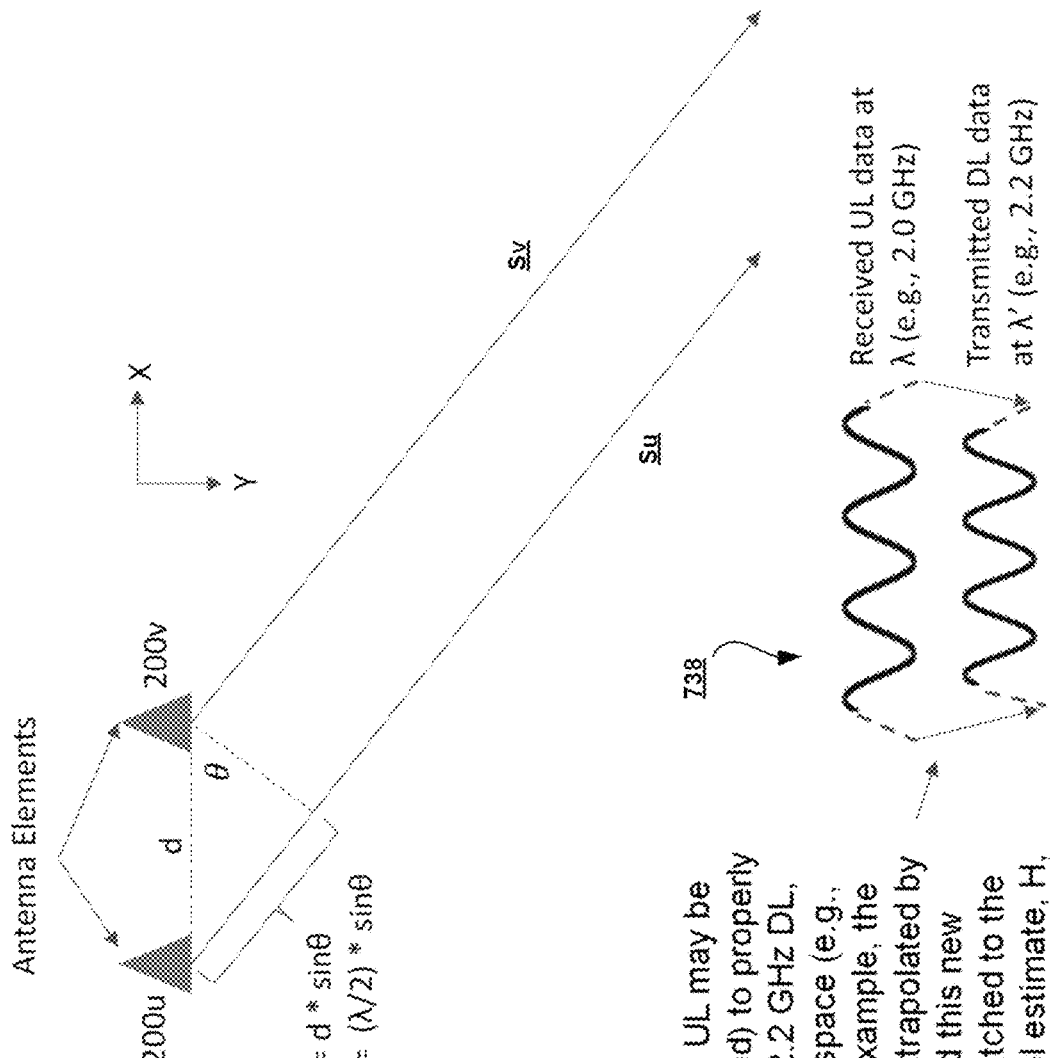
FIG. 7B is a diagram of example antenna elements of a modular antenna array in which a phase difference between uplink and downlink signals in FDD may be compensated in accordance with various aspects described herein.

FIG. 7B is a diagram of example antenna elements of a modular antenna array in which a phase difference between uplink and downlink signals in FDD may be compensated in accordance with various aspects described herein. As depicted in FIG. 7B, antenna elements 200u and 200v may be included in a modular antenna array, such as modular antenna array 200 of FIG. 2A. Here, antenna elements 200u and 200v may be aligned in an X-direction. It is to be appreciated and understood that, although only two antenna elements 200u and 200v and two DL transmissions $S_u$ and $S_v$ are depicted in FIG. 7B, there may be additional antenna elements and/or additional DL transmissions. In an extreme case where the antenna elements 200u and 200v emit DL transmissions in the Y-direction, a resulting plane wave may constitute a sinusoid in the Y direction and a constant in the X-direction. In a general case, emitting DL transmissions $S_u$ and $S_v$ from the antenna elements 200u and 200v at an arbitrary angle θ may result in a phase shift between transmissions $S_u$ and $S_v$, which may be represented as distance P=d*sin θ=(λ/2)*sin θ, where d (or λ/2) is the distance between the antenna elements 200u and 200v. In a specific limiting case, where a sine wave is launched in exactly the X-direction, for example, d may be equal to λ/2=180 degrees. To achieve zero phase shift between the DL transmissions $S_u$ and $S_v$, in this case, the transmission $S_u$ may be shifted or "advanced" by 180 degrees. In FDD, the DL transmission frequency is different from that of UL-received signals. While nulls may be easily applied in the UL in FDD, nulls that are applied in the DL may be directed in incorrect or unintended directions. Boresight signals may not be affected by the difference in UL and DL frequencies in FDD, but end-fire, or near-end-fire, signals (i.e., a signal at an angle of departure, relative to the X-direction, that satisfies (e.g., is less than or equal to) a threshold angle) may be most affected. For example, for UL end-fire signals (e.g., in the X-direction), a higher DL frequency in FDD may not have zero crossings at λ/2 as the UL. That is, assuming a higher DL frequency than the UL frequency in FDD, a DL waveform launched across the antenna elements may have more cycles across the aperture than desired or required. Here, a higher DL frequency results in a smaller λ value—e.g., a λ' value that is smaller than λ—which changes the distance P (or phase difference), and thus the angle of departure from the UL angle of arrival. As an example, a larger DL frequency may yield a larger phase difference, and thus a larger angle of departure. For a given angle θ, therefore, directionality of a resulting DL plane wave can be different than in a case where λ'=λ. For instance, for end-fire UL signals, a resulting DL waveform in FDD may not be launched as an end-fire DL waveform, but rather at a different undesired angle or direction.

In exemplary embodiments, given the frequency delta in FDD between the UL and the DL, the DL data may be pre-compensated. In particular, received UL data may be extrapolated by a ratio of the frequency of the DL relative to the frequency of the UL. As shown by reference number 738, assume that the frequency of the DL is 2.2 GHz and the frequency of the UL is 2.0 GHz. Here, the ratio may be 2.2 GHz/2.0 GHz=1.1, and thus, about five percent of additional data may be added or extrapolated to each end of the received UL data, as depicted, and the total resulting UL data may be matched (e.g., precoded) to what is to be transmitted in the DL over the original array aperture. This may thus involve generating data that exceeds or that is larger than the array aperture, and then compressing that data to fit in the array aperture, where DL data obtained based on such extrapolated and compressed data (e.g., obtained from UL channel estimation and predicting of the DL channel based thereon, as described elsewhere herein) would also fit in the array aperture. This may adjust or change the relationship between the antenna elements 200u and 200v by the above-described ratio, resulting in the phase change or difference between the antenna elements 200u and 200v to be the same as the phase change or difference in the UL direction in end-fire and/or near-end-fire cases (i.e., a signal at an angle of departure, relative to the X-direction, that satisfies (e.g., is less than or equal to) a threshold angle). In various embodiments, the above-described compression may be implemented by applying the ratio as a scalar α of a vector f(t)—e.g., f(αt), where α can be greater than 1 or less than 1 and may provide time- or spatial-based scaling of the vector. Obtaining a Fourier Transform of f(αt), where F(f/α) is the Fourier Transform pair of f(αt), and α provides time- or spatial-based scaling, effects a frequency change in the frequency domain. By transforming the adjustment from the spatial domain to the beam domain, the direction or angle of the DL beam can thus be adjusted such that nulls may be pointed in the proper direction. In one or more embodiments, the system 162a may apply the above-described extrapolation and compression to raw UL channel data (e.g., the signals within the H H* of equation 620 after SRS has been correlated out) to obtain the desired phase change in the UL channel data, and may subsequently derive DL data therefrom (e.g., as described above with respect to equations 630, 640, and 650). In alternate embodiments, the system 162a may first derive DL weight data from the UL data (e.g., as described above with respect to equations 630, 640, and 650), and may subsequently apply a form of the above-described extrapolation and compression to the DL weight data to derive DL data with the desired compensation in phase change.

In exemplary embodiments, aggregated modular antenna arrays 200 may be employed for both Su-MIMO and Mu-MIMO (e.g., in different time slots as arranged by a scheduler). The aggregated modular antenna arrays 200 may be used in TDD or FDD.

Many UEs may operate using legacy technology, and thus may have limited support for CSI-RS. For example, a legacy UE may have a small number of CSI-RS ports, such as 4 or 8, which may be inadequate for a high T/R massive MIMO system, where, for example, aggregated modular antenna arrays 200 may include hundreds of antenna elements or more. In a case where each of these antenna elements transmits an orthogonal CSI-RS, the amount of overhead needed for the UE (e.g., per coherence block) and/or the link could be insurmountable.

In various embodiments, for a UE—e.g., the UE 504 of FIG. 5A—in Su-MIMO mode in TDD, the system 162a (e.g., the vDUs 166a and/or the vCUs 174a) may leverage reciprocity for estimating the DL channel. Here, the UE 504 may transmit power- and bandwidth controlled SRS (e.g., using each of multiple antennas of the UE), which the system 162a may utilize to estimate the UL channel (e.g., by applying equation 620 of FIG. 6 in a case where equation 620 is adapted for determining UL weights, and where p in equation 620 represents UL power, which may be different for each UE). The DL can also be estimated by analyzing channel vectors associated with the UE 504—e.g., by determining eigenvalues relating to H H* of equation 620 of FIG. 6, which can inform on an appropriate Su-MIMO rank (e.g., number of data layers) to assign/use for the UE 504 and how the system 162a (e.g., the base station) is to be configured. In various embodiments, maximum ratio transmission may be employed, where DL weights may be matched to channel fading as determined from the UL channel estimation. By leveraging UL- or reciprocity-based estimation in a TDD system, a UE in Su-MIMO mode can be spared of having to provide feedback on the DL, such as feedback on CSI-RS. That is, for example, in certain embodiments, CSI-RS-based processing may be eliminated for UEs in Su-MIMO mode in TDD, where channel estimation for both UL and DL may be (e.g., only) reciprocity-based (e.g., SRS-based).

In various embodiments, for a UE—e.g., the UE 504 of FIG. 5A—in Su-MIMO mode in FDD, the system 162a (e.g., the vDUs 166a and/or the vCUs 174a) may similarly estimate the UL channel using SRS. Additionally, in one or more embodiments, the system 162a may leverage the channel vectors, determined based on the SRS, to predict the DL channel for the UE 504. For example, the system 162a may utilize one or more of equations 630, 640, and 650 (or versions thereof) to determine DL precoding weights for the UE 504. Continuing the example, the system 162a can identify eigenvalues relating to $R_k$, where k represents the UE 504, and can perform an average of the channel vectors for the UE 504 to predict the DL channel for the UE 504. In various embodiments, maximum ratio transmission may be employed, where DL weights may be matched to channel fading as determined from the UL channel estimation. Here, CSI-RS transmissions and overhead may similarly be reduced or eliminated for a UE in Su-MIMO mode in FDD. Given that Su-MIMO users generally have smaller coherence blocks, and thus lower available capacity for DL symbols, minimizing the transmission of CSI-RS data can conserve resources for transmission of actual user data.

In certain embodiments, for a UE—e.g., the UE 504 of FIG. 5A—in Su-MIMO mode in FDD, the system 162a may additionally or alternatively, provide DL CSI-RS, which the UE 504 may respond to with feedback (e.g., a PMI or quantized feedback weights) that the system 162a may utilize for DL estimation and beamforming. Such feedback (and/or additional information) may reveal a desired Su-MIMO configuration for the UE 504, such as, for example, a ranking for Su-MIMO relating to a desired number of layers. In various embodiments, as part of nevertheless minimizing CSI-RS transmission for a large antenna system, such as an aggregation of modular antenna arrays 200, the system 162a may identify an antenna element on each "side" of the antenna system to use for CSI-RS. For an aggregation of modular antenna arrays 200 (where the aggregation may include two, three, or more antenna panels), the system 162a may logically partition the aggregation (e.g., in half, in quarters, or in any other suitable division, etc.), resulting in partitions from which antenna elements may be selected for CSI-RS purposes. For instance, the system 162a may logically partition the aggregation of modular antenna arrays 200 in half, in a horizontal direction, resulting in a "left" partition and a "right" partition of the antenna system. Continuing the example, the system 162a may identify a first antenna element on the left partition and a second antenna element on the right partition, and cause the first antenna element to output orthogonal signals in multiple polarizations (such as two polarizations, e.g., +45 degrees and −45 degrees) and the second antenna element to output orthogonal signals in different polarizations (such as two polarizations, e.g., +45 degrees and −45 degrees), resulting in multiple (e.g., four) orthogonal CSI-RS, where the multiple T/R element array(s) may "appear" to the UE as just a four T/R or port array. The UE 504 may, based upon receiving the orthogonal CSI-RS, provide one of a variety of (e.g., sixteen) different quantized feedback weights (or matrices), which the system 162a can use to determine, or maximize, a ranking for Su-MIMO (e.g., to rank 4 or higher). Transmitting CSI-RS in this manner—that is, using only a subset of the antenna elements of an aggregation of modular antenna arrays—reduces DL CSI-RS overhead for a UE in Su-MIMO mode and enables the aggregation of modular antenna arrays 200 to transparently serve the UE in Su-MIMO mode (e.g., based on the requested Su-MIMO rank, such as rank 4, etc.) and other UEs—e.g., the UEs 501, 502, and 503—in Mu-MIMO mode.

In various embodiments, the system 162a may repeat the above-described process (e.g., using the same or different partitions, using some or all of the same antenna elements, or using different antenna elements) periodically, based upon one or more criteria being satisfied, and/or the like.

It is to be appreciated and understood that the system 162a can identify the first antenna element or T/R and the second antenna element or T/R in any suitable manner, such as randomly, based on a sequence or pattern, by position (e.g., identifying only the antenna elements or T/Rs that are positioned at a corner portion (e.g., a top corner portion and/or a bottom corner portion) of the antenna system), by designation (e.g., always selecting a particular antenna element on the left side of the antenna system and/or always selecting another particular antenna element on the right side of the antenna system), and so on. Furthermore, in various embodiments, the system 162a can identify a group of antenna elements (rather than a single antenna element) in each of different partitions of the aggregation of modular antenna arrays 200 for CSI-RS purposes. For example, in a case where the system 162a logically partitions the aggregation of modular antenna arrays 200 in half, in a horizontal direction, resulting in a left partition and a right partition of the antenna system, the system 162a may identify a first group of antenna elements (e.g., four antenna elements) on the left partition and a second group of antenna elements (e.g., four antenna elements) on the right partition, and cause each antenna element in the first group of antenna elements to output orthogonal signals in multiple polarizations (such as two polarizations, e.g., +45 degrees and −45 degrees) and each antenna element in the second group of antenna elements to output orthogonal signals in different polarizations (such as two polarizations, e.g., +45 degrees and −45 degrees), resulting in multiple (e.g., sixteen) orthogonal CSI-RS.

In this way, the system 162a may leverage both reciprocity-based and/or feedback-based (e.g., CSI-RS-based) estimation for UEs in Su-MIMO mode, with minimal overhead to the UEs even with large aggregations of modular antenna or T/R arrays.

As can be seen, processing associated with various embodiments described herein, including embodiments relating to antenna element weight calculations, combining/precoding/beamforming, coherence block tracking, multi-array calibration/recalibration, SRS processing, interference mitigation, etc. may involve monitoring and controlling of various parameters of a MIMO system (e.g., a Su-MIMO system and/or a Mu-MIMO system), whether in FDD or TDD in any suitable frequency range (e.g., Frequency Range 1 (FR1), Frequency Range 2 (FR2), and/or the like). In exemplary embodiments where modular antenna arrays 200 are communicatively coupled to DUs/vDUs and/or CUs/vCUs of a RAN (or C-RAN) via open/accessible interfaces, as described above, the interfaces may be used for the monitoring and controlling of various parameters. Here, AI/ML may be employed by the RAN (e.g., by one or more RICs or RIC portions of the RAN/system 162a, such as the RIC 164a, the RIC portion 164a-1, and/or the RIC portion 164a-2) to achieve (e.g., operator-specific) policies and goals, such as those relating to optimizing user experience and spectrum capacity (which may involve, for example, balancing overall system capacity with individual user experience or balancing bandwidth provided to groups of users (e.g., stationary or fixed wireless users) with interference from such users to other users (e.g., high-mobility users)). For example, in a case where the RAN 162a of FIG. 1B is in an O-RAN implementation, various RAN interfaces, such as the E2, A1, O1, and FH interfaces may be utilized to permit monitoring ("dials") and controlling ("knobs") of parameters of a MIMO system. Continuing the example, the RIC portion 164a-2 (e.g., a near real-time RIC) and/or an associated E2 interface may be used to facilitate beamforming functions. Further continuing the example, the RIC portion 164a-1 (e.g., a non-real-time RIC) may be configured to train AI/ML model(s) (e.g., an rAPP), relating to MIMO beam forming/enhancements (MBE), using O1 and/or fronthaul (FH) M-plane measurement data (e.g., from the RUs 168a/aggregated modular antenna arrays 200), which may be exposed via services provided by the network service management platform 163a (e.g., a Service Management and Orchestration (SMO) platform). Yet further continuing the example, in various embodiments, the MBE rApp may utilize O1/FH-M plane data to optimize beamforming/enhancements by configuring RU or DU parameters. Still continuing the example, an MBE xApp (which may be deployed from the network service management platform 163a to the RIC portion 164a-2) may perform beamforming-related actions and/or enhancements based on data collected from E2 reports.

FIG. 8A depicts a table 800 identifying monitorable parameters for facilitating MIMO networking in accordance with various aspects described herein. As shown in FIG. 8A, parameters that may be monitored ("dials") may relate to scheduler capacity optimization, coverage and/or capacity optimization (including, for example, capacity optimization via interference mitigation), and user DL quality optimization.

In various embodiments, data regarding "Scheduled UEs" may be monitored (e.g., in real-time or near real-time). This may include, for example, Quality-of-Service (QoS) Class Identifiers (QCIs) with associated priorities, angle of arrival (2D beam #), timing advance (TA), data radio bearer (DRB) throughput (T-put), SINR, and/or the like. Interfaces between the RU/DU and the RIC/CU, etc. may allow a resident DU scheduler to accept inputs and take affirmative actions to incorporate the parallelism afforded by Mu-MIMO scheduling opportunities identified by the RIC from all sources.

In some embodiments, data regarding "UE Spatial Separability" may be monitored. In various embodiments, a UE Channel Cross Correlation Matrix (e.g., pairwise for all simultaneously scheduled UEs), such as $E\{h_i^* h_j\}$, may be obtained and analyzed to facilitate one or more functions/optimizations. For instance, for two UEs, their spatial separability may relate to an inner product of the UEs' respective estimated channels, where there may be orthogonality or near orthogonality between the two UEs if that inner product is zero or near zero. In certain embodiments, the inner product may be normalized as a correlation coefficient that can be used as a measure of orthogonality (where, e.g., a correlation coefficient of '1' may indicate that there is no orthogonality, and a correlation coefficient that is smaller, such as near zero, may indicate that there is orthogonality or near orthogonality). In various embodiments, a correlation threshold relating to the UE Spatial Separability parameter (e.g., a threshold for the correlation coefficient) may be defined and used for scheduler-related and/or power control-related determinations.

As an example, the UE Spatial Separability parameter may be useful for determining whether a scheduler is under-scheduling UEs, in which case one or more actions can be taken (e.g., by the system 162a, such as the vDUs 166a and/or the vCUs 174a) to adjust the scheduling, particularly to include UEs to be scheduled (e.g., with data in their buffers, priority to transmit, etc.) and that are determined to be sufficiently separated (e.g., based on the correlation coefficient satisfying (e.g., being less than or equal to) the correlation threshold).

As another example, there may be instances where a UE, such as UE 501 of FIG. 5A, at or proximate to a cell edge is experiencing poor/decreasing throughput (e.g., with a full or near full buffer or with (e.g., historical) throughput falling to or below a particular threshold), and thus warrants higher scheduler priority for the UE 501. However, considerations may need to be made as to whether the UE 501 should be given higher scheduling priority over one or more other UEs. For instance, a different UE, such as the UE 503 of FIG. 5A, may have high SINR and/or may have a need/demand for high throughput (e.g., the UE 503 may correspond to a fixed wireless user or the like with a throughput demand that is greater than or equal to a throughput threshold and/or where SINR of signal(s) associated with the UE 503 is greater than or equal to a signal quality threshold). Where the system 162a determines that the UE 503, from the perspective of the antenna system (e.g., an aggregation of modular antenna arrays 200), is not sufficiently spatially separated from the UE 501 (e.g., the correlation coefficient is greater than the correlation threshold and thus the UE 502 and the UE 503 are not orthogonal or not near orthogonal to one another), prioritizing the UE 501 for scheduling purposes may result in powerful transmissions being sent for the UE 501 that undesirably interfere with the UE 503. Here, the system 162a may utilize the UE Spatial Separability parameter to determine whether the UE 501 should be given higher scheduling priority. For example, in a case where the system 162a determines that the coefficient correlation associated with the UE 501 and the UE 503 satisfies the correlation threshold (e.g., is less than or equal to the correlation threshold), and thus there is likely high separability between the two UEs, the system 162a may permit the scheduler to schedule the UE 501 (e.g., may permit the scheduler to schedule the UE 501 for parallel transmissions with the UE 503). In a case where the system 162a determines that the coefficient correlation associated with the two UEs does not satisfy the correlation threshold (e.g., where the correlation coefficient is greater than the correlation threshold), and thus there is likely low separability between the two UEs, the system 162a may prevent the scheduler from scheduling the UE 501 (e.g., may prevent the scheduler from scheduling the UE 501 for parallel transmissions with the UE 503) or otherwise de-prioritize scheduling of the UE 501.

Continuing the example, in some embodiments, in the case where the system 162a determines that the correlation coefficient does not satisfy the correlation threshold, the system 162a may additionally, or alternatively, perform one or more other actions to address the low separability, such as adjusting or modulating (e.g., decreasing) the DL transmit power (e.g., the Downlink Transmit Power Allocation parameter described below) for transmissions directed to/for the UE 501 and/or adjusting or modulating (e.g., increasing) the DL transmit power for transmissions directed to/for the UE 503, so as to minimize the effects of interference to the UE 503. In certain embodiments, the system 162a may be configured to perform additional adjustments to the DL transmit power for the UE 501 and/or perform adjustments to the DL transmit power for the UE 503, based on measurement data (e.g., provided by the UE 503). For instance, in a case where measurement data indicates a decrease in signal quality (e.g., a lower SINR or the like), the system 162a may (e.g., further) decrease the DL transmit power for the UE 501 and/or may (e.g., further) increase the DL transmit power for the UE 503.

In certain embodiments, data regarding a "Coherence Bandwidth" and/or a "Coherence Time" may be monitored (e.g., in real-time or near real-time). In one or more embodiments, data regarding "Pilot signal length" and/or "Coherence block" size (e.g., in symbols) may additionally, or alternatively, be monitored. In various embodiments, data regarding "Frequency Reuse factor for Pilots" (a pilot reuse factor over $N_{reuse}$ sites or cells) may be monitored. As described above in connection with various embodiments, such as those relating to FIG. 4A, a coherence block (or coherence bandwidth and coherence time) can be used to determine the number of orthogonal SRS/pilot sequences that may be used by a cell and/or various neighboring cells. In one or more embodiments, $N_{reuse}$ can be set based on an estimate of the quality of a channel (e.g., based on indicators such as a coherency block or the like). Additionally, pilot reuse factors can identify whether pilots may be reused, which can increase orthogonality, avoid pilot contamination amongst a cluster of cells, and/or avoid inter-base station DL and UL interference in a cluster of cells in which Mu-MIMO, for example, may be employed.

In some embodiments, data regarding "Indication of MIMO type" may be monitored (e.g., in real-time or near real-time), which may, for example, inform whether UL data relates to Mu-MIMO or Su-MIMO.

In certain embodiments, data regarding "Downlink CQI" may be monitored (e.g., in real-time or near real-time), which may indicate a modulation/coding scheme. In various embodiments, data regarding a PMI (which may, for example, include a Rank Indicator—e.g., a number of layers to be used for DL transmissions to a UE) may be monitored. The PMI may indicate the precoding matrix to be used for DL transmissions, which may be based on the Rank Indicator.

In one or more embodiments, data regarding "Uplink SINR and EVM" may be monitored (e.g., in real-time or near real-time).

In some embodiments, data regarding "Uplink Covariance" may be monitored (e.g., in real-time or near real-time). This may include an UL Covariance matrix of a received signal after removal of pilot(s).

In certain embodiments, data regarding "Condition Number" may be monitored (e.g., in real-time or near real-time). A condition number (e.g., in dB), or a channel condition number, may relate to estimation of performance of a MIMO channel.

FIG. 8B depicts a table 810 identifying controllable parameters for facilitating MIMO networking in accordance with various aspects described herein. As shown in FIG. 8B, parameters that may be controlled may relate to user quality optimization (including, for example, UL/DL user quality optimization), scheduler optimization, and capacity optimization.

In various embodiments, an "Uplink UE Transmit Power Control" parameter may be controllable (e.g., in real-time or near real-time). In exemplary embodiments, controlling UE transmit power may be based upon obtaining (e.g., in real-time or near real-time) an internal UL UE SINR measurement, where a policy may be to increase the UE transmit power up to a (e.g., mobile network operator) specified minimum SINR level. In some cases, such as where there is an ongoing high data rate transmission (e.g., at 100 megabits per second (Mbps)), the UE transmit power may or may not be increased (e.g., may not be increased in order to conserve overall power resources for the UE). In various embodiments, a determination as to whether to control (e.g., increase or decrease) UE transmit power for a particular UE may depend on operation mode (such as whether Mu-MIMO is being employed, etc.), orthogonality between the particular UE and other UEs, and/or the like.

In exemplary embodiments, the system 162a (e.g., the vDUs 166a and/or the vCUs 174a) may control UL UE transmit power for UEs in Mu-MIMO mode in cases where one of the UEs' UL transmissions are determined to likely interfere with those of another one of the UEs. For example, assume that the system 162a schedules parallel transmissions for the UEs 501, 502, and 503 in Mu-MIMO in a particular time slot and over a certain number of PRBs. As part of facilitating such transmissions, the system 162a may generate UL combining weights that cause antenna elements to "point" toward the UE 501 for receiving UE 501's transmissions and to simultaneously null (e.g., spatially filter) UL transmissions from the UEs 502 and 503, may generate UL combining weights that cause antenna elements to "point" toward the UE 502 for receiving UE 502's transmissions and to simultaneously null UL transmissions from the UEs 501 and 503, and so on. Where one of the UEs, such as the UE 502 (e.g., a LOS UE with minimal path loss), is much closer to the modular antenna arrays 200 than another one of the UEs, such as the UE 501, the UL signal strength of the UE 502 may be much larger than that of the UE 501 (e.g., a difference between the signal strengths may be larger than or equal to a threshold). For instance, the UL signal strength of the UE 502 may be 50 dB greater than that of the UE 501. In such a case, it may be difficult for the system 162a or the modular antenna arrays 200 to null the UE 502's transmissions when receiving UE 501's transmissions. For example, the system 162a or the modular antenna arrays 200 may only be able to generate a 30 dB null on the UE 502's transmissions, which may still leave the UE 501's transmissions at −20 dB relative to the UE 502's transmissions. Therefore, in certain embodiments, the system 162a may instruct one UE to adjust (e.g., increase) its UL transmit power and/or instruct another UE to adjust (e.g., decrease) its UL transmit power to compensate for disparities between the two UEs' UL transmit signal strengths. In the foregoing example, the system 162a may instruct the UE 501 to increase its UL transmit power and/or instruct the UE 502 to decrease its UL transmit power to a point where the system 162a and/or the modular antenna arrays 200 are able to properly receive UE 501's transmissions (e.g., where the UE 501's transmissions are at or near 0 dB relative to the UE 502's transmissions).

In some cases, depending on where a UE is located, increasing that UE's UL transmit power may negatively impact a neighboring cell's operations. In various embodiments, orthogonal SRS/pilot sequences may be employed, as described elsewhere herein, to alleviate such an impact.

In some embodiments, a "Downlink Transmit Power Allocation" parameter (e.g., as described above) may be controllable (e.g., in real-time or near real-time). In exemplary embodiments, controlling transmit power to a UE may be based upon obtaining a downlink UE internal SINR measurement, where a policy may be to increase the transmit power to the UE in a case where the downlink UE internal SINR falls below a (e.g., mobile network operator) specified minimum SINR level. In some cases, the system 162*a* (e.g., the vDUs 166*a* and/or the vCUs 174*a*) may determine and form null patterns as part of mitigating interference to a first UE caused by transmissions for a second UE. Where a null pattern for the first UE satisfies (e.g., reaches) a deepest/highest possible level (dependent on the number of antenna weights, user separation, etc.), the transmit power to the second UE may be reduced as a further mitigative action.

In Mu-MIMO, for example, the power that is allocated for transmitting parallel streams can impact the resulting quality of the parallel streams when they are received (e.g., by a base station or by UEs). Where a base station, such as the system 162*a* (e.g., the vDUs 166*a* and/or the vCUs 174*a*), has limited information regarding Mu-MIMO stream carriers, proper power allocation for individual streams can be less than optimal. In exemplary embodiments, the system 162*a* (e.g., the vDUs 166*a* and/or the vCUs 174*a*) may adjust Mu-MIMO downlink and/or uplink power allocations based on measurements relating to UE signal quality (e.g., KPIs provided by UEs or the like). In some embodiments, the system 162*a* can define power allocation policies for base station equipment to follow based on the measurements (which may, for example, involve rapid dynamic adjustments/reconfigurations needed for efficient Mu-MIMO). In various embodiments, parameters that can be monitored to inform Mu-MIMO downlink and/or uplink power allocations may include, for example, downlink CQI, uplink SINR, error vector magnitude (EVM), scheduled UEs, UE spatial separability, etc. In some embodiments, various parameters may be modified as part of adjusting Mu-MIMO downlink and/or uplink power allocations, such as, for example, pilot sequences, pilot sequence distribution, MIMO modes, Su-MIMO rank, etc.

In certain embodiments, a "Parallel Scheduling Control" parameter may be controllable. This may relate to capacity (e.g., the one minute average number K of parallel scheduled UEs) and may be specified by one or more required UE separability thresholds—i.e., an UL threshold and/or a DL threshold—that indicate how far UEs are to be separated from one another in geolocation. In various embodiments, the Parallel Scheduling Control parameter may be adjusted such that a correlation threshold—e.g., described above with respect to the UE Spatial Separability parameter of FIG. 8A—may be modified in order to increase the number of UEs that are eligible for parallel transmissions. As an example, assume that the correlation threshold is 0.3. Continuing the example, assume that, for the UEs 501 to 505 of FIG. 5A, the correlation coefficient between UE 501 and UE 503 is 0.7, the correlation coefficient between UE 504 and UE 505 is 0.1, etc., where the largest correlation coefficient between various pairs of the UEs 501 to 505 is 0.7 (e.g., the correlation coefficient between UE 501 and UE 503). Here, the system 162*a* (e.g., the vDUs 166*a* and/or the vCUs 174*a*) may adjust the correlation threshold, such as by increasing the correlation threshold from 0.3 to 0.7, 0.71, or the like, so as to enable some or all of the UEs 501 to 505 to be eligible for parallel transmissions or to be simultaneously served. In this way, PRBs may be reused for multiple UEs (e.g., all five of UEs 501 to 505 shown in FIG. 5A), and capacity can be significantly increased in the cell (here, e.g., five times the capacity in a case where transmissions are otherwise made for only a single one of the UEs). Controlling the Parallel Scheduling Control parameter and/or the correlation threshold relating to UE Spatial Separability can avoid any artificial control (e.g., by a third-party vendor or the like) of the quantity of UEs that may be eligible, or considered, for parallel transmissions.

In Mu-MIMO, overlapping streams can interfere with one another, and the likelihood of such interference may vary depending on the circumstances. In exemplary embodiments, the system 162*a* (e.g., the vDUs 166*a* and/or the vCUs 174*a*) may adjust the number of parallel streams (e.g., that overlap in frequency and time) or existing connections for a group of UEs in Mu-MIMO mode based on measurements relating to channel quality of individual UEs in the group of UEs. For example, in a case where the system 162*a* determines that signal quality is low for a UE (e.g., poor SRS or the like, shrinking coherence block, etc.), the system 162*a* may reduce the number of parallel streams (e.g., capacity) for that UE and/or for one or more other UEs that are also in Mu-MIMO mode. As another example, in a case where the system 162*a* determines that signal quality is high for a UE (e.g., adequate SRS or the like, large coherence block, etc.), the system 162*a* may increase the number of parallel streams for that UE and/or for one or more other UEs that are also in Mu-MIMO mode. In one or more embodiments, the system 162*a* may perform such adjustments dynamically (e.g., based on results from analyzing obtained data) and/or periodically, in accordance with one or more feedback loops. In various embodiments, parameters that can be monitored to inform adjustments to the number of parallel streams may include, for example, scheduled UEs, UE spatial separability, downlink CQI, etc. In some embodiments, parallel scheduling control parameter(s) may be modified (e.g., raised or lowered) as part of adjusting the number of parallel streams.

In one or more embodiments, a "Pilot Sequence" parameter may be controllable. In certain embodiments, pilot sequence lengths and/or numbers of pilot sequences may be set to ensure that overhead is minimized while also avoiding pilot contamination.

In various embodiments, a "Pilot Sequence distribution" parameter may be controllable (e.g., in real-time or near real-time). As described above with respect to FIGS. 4A and 4B, for example, available orthogonal SRS/pilot sequences may be partitioned and distributed to $N_{reuse}$ surrounding cells.

In some embodiments, an "Ability to set MIMO modes" parameter may be controllable (e.g., in real-time or near real-time). MIMO modes may include, for example, Su-MIMO only, Mu-MIMO only, both, by QCI, or the like. As described above with respect to at least FIG. 4A, Mu-MIMO may be more suitable for LOS or near LOS/stationary or near stationary (e.g., fixed wireless) UEs (which may have buffers that are continuously full or near full and/or may have coherence blocks that are relatively large (e.g., larger than a threshold number of symbols)). Implementations of MIMO networking described herein provide Mu-MIMO to such UEs in a transparent manner to other UEs (e.g., in Su-MIMO mode), such as UEs in motion or that have NLOS. The ability to set MIMO modes enables the network to differentiate UEs that may be eligible for Mu-MIMO from UEs that may not.

In exemplary embodiments, eligibility for Mu-MIMO may be based on mobility or predicted mobility of a UE. For example, lower mobility users (e.g., wireless users with UEs that are stationary or near stationary or that are not predicted to move significantly (e.g., predicted to move at less than a threshold speed or the like)) may generally have high network resource usage requirements, such as for video applications, etc., where buffers for such UEs may be constantly full or near full, and thus may require simultaneous scheduling to avoid congestion. Low-mobility users may thus be better served via Mu-MIMO as compared to other types of techniques, such as Su-MIMO. In contrast, high-mobility users typically use applications with periodic, short bursts of packets, where buffers are not as full as with fixed usage. With minimal to no periodic channel change (e.g., large coherence blocks), UL channel estimations are generally more accurate for low-mobility users, and thus yield more capacity.

In some cases, treating all UEs equally (as may often be done)—that is, employing the same network mode for all UEs regardless of their mobility or predicted mobility—can actually degrade network performance. For example, whereas fixed wireless users may not require frequent channel estimation as UEs with higher mobility (e.g., as can be seen from various embodiments described herein), performing typical channel estimation for fixed wireless users may increase network load and thus negatively impact network performance for higher mobility UEs. Therefore, beyond increasing performance for fixed wireless users, the ability to set MIMO modes for different UEs, including where SRS-related overhead is reduced, can improve network capacity in a given cell.

In various embodiments, parameters that can be monitored to inform determinations regarding MIMO modes may include, for example, downlink CQI, condition number, coherence time, pilot frequency reuse factor, pilot and coherence block, etc.

In certain embodiments, a "Set Su-MIMO Rank" parameter may be controllable. In various embodiments, the system 162a (e.g., the vDUs 166a and/or the vCUs 174a) may calculate (e.g., internally in real-time or near real-time) a condition number (or rank). A threshold for the condition number may be defined (e.g., by a mobile network operator), which may be used to derive a base station-assigned Su-MIMO rank from a UE-reported Su-MIMO rank that the UE may have requested based on DL measurements. A higher Su-MIMO rank may correspond to a larger number of layers or parallel streams for a UE. In various embodiments, the system 162a may identify a precoding vector, which the UE may utilize to distinguish between layers.

In some embodiments, parameters that can be monitored to inform determinations regarding Su-MIMO ranks may include, for example, downlink CQI, channel condition number, etc. In various embodiments, the system 162a may additionally be capable of setting a rank for UEs in Mu-MIMO mode. Ranks for a UE in Mu-MIMO mode may include rank 4, rank 8, etc.

In one or more embodiments, an "Insert Quiescent Antenna Weights" parameter may be controllable (e.g., in real-time or near real-time). This may enable arbitrary quiescent (e.g., static) weights for antenna elements (e.g., antenna elements 202) that are to be convolved or more efficiently multiplied in the beam space with calculated weights for either the UL or the DL.

Figure 8C:
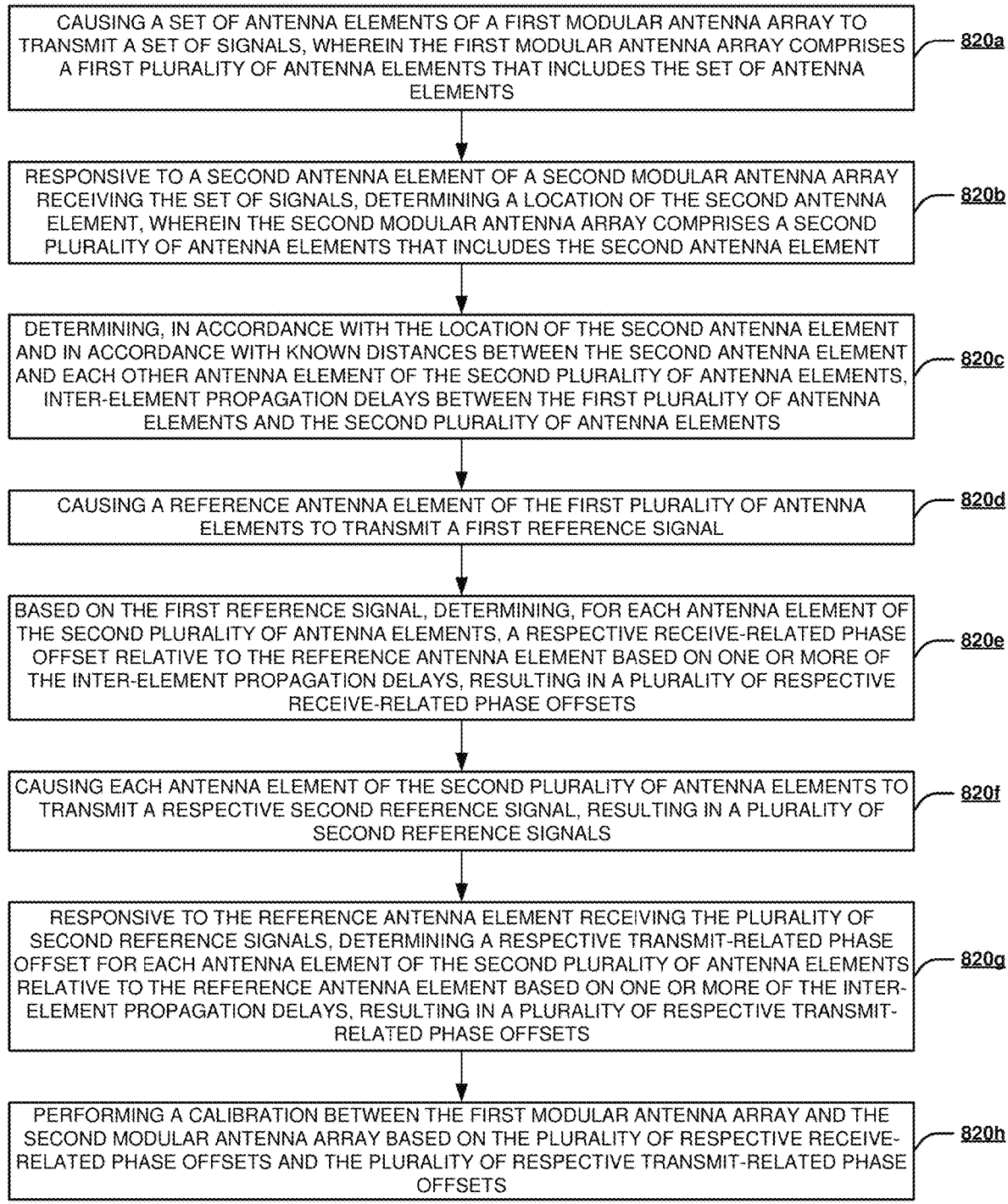
FIGS. 8C-8H, 8J-8N, and 8P-8R each depicts an illustrative embodiment of a method in accordance with various aspects described herein.

FIG. 8C depicts an illustrative embodiment of a method 820 in accordance with various aspects described herein. In some embodiments, one or more process blocks of FIG. 8C can be performed by a RAN or system, such as the system 162a. In some embodiments, one or more process blocks of FIG. 8C may be performed by another device or a group of devices separate from or including the system 162a, such as the network service management platform 163a, the RIC 164a, the CU 174a, one or more DUs 166a, one or more RUs 168a, and/or the core network 190.

At 820a, the method can include causing a set of antenna elements of a first modular antenna array to transmit a set of signals, wherein the first modular antenna array comprises a first plurality of antenna elements that includes the set of antenna elements. For example, the system 162a can, in a manner similar to that described elsewhere herein, perform one or more operations that include causing a set of antenna elements of a first modular antenna array to transmit a set of signals, wherein the first modular antenna array comprises a first plurality of antenna elements that includes the set of antenna elements.

At 820b, the method can include, responsive to a second antenna element of a second modular antenna array receiving the set of signals, determining a location of the second antenna element, wherein the second modular antenna array comprises a second plurality of antenna elements that includes the second antenna element. For example, the system 162a can, in a manner similar to that described elsewhere herein, perform one or more operations that include, responsive to a second antenna element of a second modular antenna array receiving the set of signals, determining a location of the second antenna element, wherein the second modular antenna array comprises a second plurality of antenna elements that includes the second antenna element.

At 820c, the method can include determining, in accordance with the location of the second antenna element and in accordance with known distances between the second antenna element and each other antenna element of the second plurality of antenna elements, inter-element propagation delays between the first plurality of antenna elements and the second plurality of antenna elements. For example, the system 162a can, in a manner similar to that described elsewhere herein, perform one or more operations that include determining, in accordance with the location of the second antenna element and in accordance with known distances between the second antenna element and each other antenna element of the second plurality of antenna elements, inter-element propagation delays between the first plurality of antenna elements and the second plurality of antenna elements.

At 820d, the method can include causing a reference antenna element of the first plurality of antenna elements to transmit a first reference signal. For example, the system 162a can, in a manner similar to that described elsewhere herein, perform one or more operations that include causing a reference antenna element of the first plurality of antenna elements to transmit a first reference signal.

At 820e, the method can include, based on the first reference signal, determining, for each antenna element of the second plurality of antenna elements, a respective receive-related phase offset relative to the reference antenna element based on one or more of the inter-element propagation delays, resulting in a plurality of respective receive-related phase offsets. For example, the system 162a can, in a manner similar to that described elsewhere herein, perform one or more operations that include, based on the first reference signal, determining, for each antenna element of the second plurality of antenna elements, a respective receive-related phase offset relative to the reference antenna element based on one or more of the inter-element propagation delays, resulting in a plurality of respective receive-related phase offsets.

At 820f, the method can include causing each antenna element of the second plurality of antenna elements to transmit a respective second reference signal, resulting in a plurality of second reference signals. For example, the system 162a can, in a manner similar to that described elsewhere herein, perform one or more operations that include causing each antenna element of the second plurality of antenna elements to transmit a respective second reference signal, resulting in a plurality of second reference signals.

At 820g, the method can include, responsive to the reference antenna element receiving the plurality of second reference signals, determining a respective transmit-related phase offset for each antenna element of the second plurality of antenna elements relative to the reference antenna element based on one or more of the inter-element propagation delays, resulting in a plurality of respective transmit-related phase offsets. For example, the system 162a can, in a manner similar to that described elsewhere herein, perform one or more operations that include, responsive to the reference antenna element receiving the plurality of second reference signals, determining a respective transmit-related phase offset for each antenna element of the second plurality of antenna elements relative to the reference antenna element based on one or more of the inter-element propagation delays, resulting in a plurality of respective transmit-related phase offsets.

At 820h, the method can include performing a calibration between the first modular antenna array and the second modular antenna array based on the plurality of respective receive-related phase offsets and the plurality of respective transmit-related phase offsets. For example, the system 162a can, in a manner similar to that described elsewhere herein, perform one or more operations that include performing a calibration between the first modular antenna array and the second modular antenna array based on the respective receive-related phase offsets and the respective transmit-related phase offsets.

In some implementations of these embodiments, the first plurality of antenna elements is calibrated with one another, the second plurality of antenna elements is calibrated with one another, and the performing the calibration results in the first modular antenna array and the second modular antenna array forming a coherent antenna system.

In some implementations of these embodiments, the set of antenna elements comprises at least three antenna elements, the set of signals comprises at least three signals, and the determining the location of the second antenna element is based on multilateration.

In some implementations of these embodiments, the system 162a may perform one or more operations that include determining an offset of a first plane of the first modular antenna array relative to a second plane of the second modular antenna array based on the location of the second antenna element, a location of a third antenna element of the second modular antenna array, and a location of a fourth antenna element of the second modular antenna array.

In some implementations of these embodiments, the system 162a may perform one or more operations that include identifying the reference antenna element.

In some implementations of these embodiments, each antenna element of the first plurality of antenna elements and the second plurality of antenna elements is associated with a respective transmitter.

In some implementations of these embodiments, each antenna element of the first plurality of antenna elements and the second plurality of antenna elements is associated with a respective receiver.

In some implementations of these embodiments, the first modular antenna array and the second modular antenna array are operable in multi-user (Mu)-multiple-input-multiple-output (MIMO) mode, single-user (Su)-MIMO mode, or a combination thereof.

In some implementations of these embodiments, the first modular antenna array and the second modular antenna array are operable in time division duplex (TDD), frequency division duplex (FDD), or a combination thereof.

In some implementations of these embodiments, the first plurality of antenna elements and the second plurality of antenna elements employ radio frequency (RF) complementary metal-oxide-semiconductor (CMOS) technology.

While for purposes of simplicity of explanation, the respective processes are shown and described as a series of blocks in FIG. 8C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may include a processing system including a processor, and a memory that stores executable instructions that, when executed by the processing system, facilitate performance of operations. The operations may include causing a reference antenna element of a first plurality of antenna elements of a first modular antenna panel to transmit a first signal. The operations may further include deriving, for each antenna element of a second plurality of antenna elements of a second modular antenna panel, a respective receive-related phase offset, relative to the reference antenna element, based on inter-element propagation delays between the first plurality of antenna elements and the second plurality of antenna elements, resulting in a plurality of respective receive-related phase offsets. The operations may further include causing each antenna element of the second plurality of antenna elements to transmit a respective second signal, resulting in a plurality of second signals. The operations may further include, responsive to the reference antenna element receiving the plurality of second signals, determining a respective transmit-related phase offset for each antenna element of the second plurality of antenna elements, relative to the reference antenna element, based on the inter-element propagation delays between the first plurality of antenna elements and the second plurality of antenna elements, resulting in a plurality of respective transmit-related phase offsets. The operations may further include calibrating the first modular antenna panel with the second modular antenna panel based on the plurality of respective receive-related phase offsets and the plurality of respective transmit-related phase offsets.

In some implementations of these embodiments, the operations may further include emitting, via a group of antenna elements of the first plurality of antenna elements, a first group of signals, and estimating respective locations of a second antenna element of the second plurality of antenna elements, a third antenna element of the second plurality of antenna elements, and a fourth antenna element of the second plurality of antenna elements.

In some implementations of these embodiments, the operations may further include, based on the estimating, determining, in accordance with known inter-element distances of the second plurality of antenna elements, the inter-element propagation delays between the first plurality of antenna elements and the second plurality of antenna elements.

In some implementations of these embodiments, the operations may further include determining an offset between a first plane of the first modular antenna panel and a second plane of the second modular antenna panel based on the respective locations of the second antenna element, the third antenna element, and the fourth antenna element.

In some implementations of these embodiments, use of the offset between the first plane and the second plane enables the first modular antenna panel and the second modular antenna panel to operate as a coherent antenna system.

In some implementations of these embodiments, the causing the reference antenna element to transmit the first signal, the deriving, the causing each antenna element of the second plurality of antenna elements to transmit the respective second signal, the determining, and the calibrating the first modular antenna panel with the second modular antenna panel are performed periodically.

In various embodiments, a method may include causing, by a processing system including a processor, a reference antenna element of a first set of antenna elements of a first modular antenna array to transmit a first reference signal. The method may further include determining, by the processing system, for each antenna element of a second set of antenna elements of a second modular antenna array, a respective receive-related offset, relative to the reference antenna element, based on inter-element propagation delays between the first set of antenna elements and the second set of antenna elements, resulting in a plurality of respective receive-related offsets. The method may further include causing, by the processing system, each antenna element of the second set of antenna elements to transmit a respective second reference signal, resulting in a plurality of second reference signals. The method may further include, based on the reference antenna element receiving the plurality of second reference signals, calculating, by the processing system, a respective transmit-related offset for each antenna element of the second set of antenna elements relative to the reference antenna element based on the inter-element propagation delays between the first set of antenna elements and the second set of antenna elements, resulting in a plurality of respective transmit-related offsets. The method may further include performing, by the processing system, a calibration between the first modular antenna array and the second modular antenna array based on the plurality of respective receive-related offsets and the plurality of respective transmit-related offsets.

In some implementations of these embodiments, the method may further include identifying the reference antenna element.

In some implementations of these embodiments, each antenna element of the first set of antenna elements and the second set of antenna elements is associated with a respective transmitter.

In some implementations of these embodiments, each antenna element of the first set of antenna elements and the second set of antenna elements is associated with a respective receiver.

In some implementations of these embodiments, the first set of antenna elements and the second set of antenna elements employ radio frequency (RF) complementary metal-oxide-semiconductor (CMOS) technology.

Figure 8D:
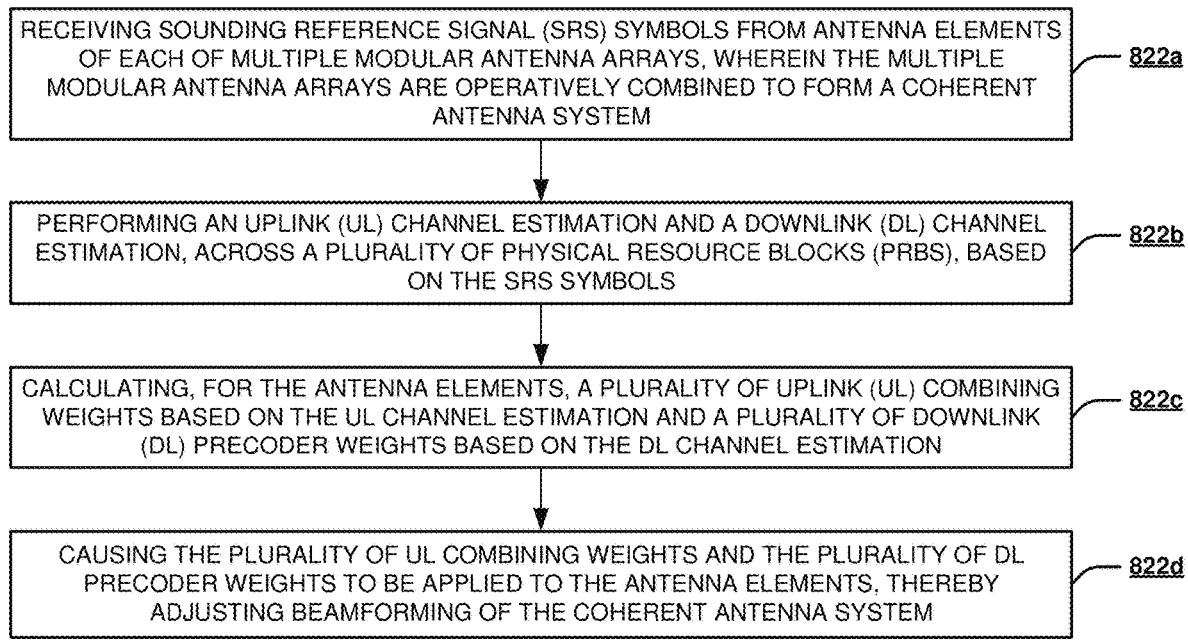

FIG. 8D depicts an illustrative embodiment of a method 822 in accordance with various aspects described herein. In some embodiments, one or more process blocks of FIG. 8D can be performed by a RAN or system, such as the system 162a. In some embodiments, one or more process blocks of FIG. 8D may be performed by another device or a group of devices separate from or including the system 162a, such as the network service management platform 163a, the RIC 164a, the CU 174a, one or more DUs 166a, one or more RUs 168a, and/or the core network 190.

At 822a, the method can include receiving sounding reference signal (SRS) symbols from antenna elements of each of multiple modular antenna arrays, wherein the multiple modular antenna arrays are operatively combined to form a coherent antenna system. For example, the system 162a can, in a manner similar to that described elsewhere herein, perform one or more operations that include receiving sounding reference signal (SRS) symbols from antenna elements of each of multiple modular antenna arrays, wherein the multiple modular antenna arrays are operatively combined to form a coherent antenna system.

At 822b, the method can include performing an uplink (UL) channel estimation and a downlink (DL) channel estimation, across a plurality of physical resource blocks (PRBs), based on the SRS symbols. For example, the system 162a can, in a manner similar to that described elsewhere herein, perform one or more operations that include performing an uplink (UL) channel estimation and a downlink (DL) channel estimation, across a plurality of physical resource blocks (PRBs), based on the SRS symbols.

At 822c, the method can include calculating, for the antenna elements, a plurality of uplink (UL) combining weights based on the UL channel estimation and a plurality of downlink (DL) precoder weights based on the DL channel estimation. For example, the system 162a can, in a manner similar to that described elsewhere herein, perform one or more operations that include calculating, for the antenna elements, a plurality of uplink (UL) combining weights based on the UL channel estimation and a plurality of downlink (DL) precoder weights based on the DL channel estimation.

At 822d, the method can include causing the plurality of UL combining weights and the plurality of DL precoder weights to be applied to the antenna elements, thereby adjusting beamforming of the coherent antenna system. For example, the system 162a can, in a manner similar to that described elsewhere herein, perform one or more operations that include causing the plurality of UL combining weights and the plurality of DL precoder weights to be applied to the antenna elements, thereby adjusting beamforming of the coherent antenna system.

In some implementations of these embodiments, the calculating the plurality of UL combining weights and the plurality of DL precoder weights comprises performing matrix inversions across the coherent antenna system as a function of PRB, user equipment (UE), layer data, or a combination thereof.

In some implementations of these embodiments, the performing the UL channel estimation and the DL channel estimation are based on one or more coherence block indicators.

In some implementations of these embodiments, the one or more coherence block indicators are associated with one or more user equipment (UE).

In some implementations of these embodiments, the plurality of PRB s is in the frequency domain.

In some implementations of these embodiments, the performing the UL channel estimation comprises performing interpolation for one or more PRB s of the plurality of PRB s.

In some implementations of these embodiments, the multiple modular antenna arrays are operated in multi-user (Mu)-multiple-input-multiple-output (MIMO) mode.

In some implementations of these embodiments, the multiple modular antenna arrays are operated in single-user (Su)-MIMO mode.

In some implementations of these embodiments, the multiple modular antenna arrays are operated in time division duplex (TDD), frequency division duplex (FDD), or a combination thereof.

In some implementations of these embodiments, the antenna elements comprise all of the antenna elements of the multiple modular antenna arrays.

While for purposes of simplicity of explanation, the respective processes are shown and described as a series of blocks in FIG. 8D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a method may include obtaining, by a cluster of virtual distributed units (vDUs) including a plurality of processors, pilot signals from each antenna element of each modular antenna array of a combination of coherent modular antenna arrays. The method may further include estimating, by the cluster of vDUs and per physical resource block (PRB) of a plurality of PRBs, an uplink (UL) channel based on cross-correlation of the pilot signals with reference tones, and estimating a downlink (DL) channel. The method may further include determining, by the cluster of vDUs and based on the estimating the UL channel, a respective uplink (UL) weight for each antenna element of each modular antenna array of the combination of coherent modular antenna arrays, resulting in a set of UL weights. The method may further include calculating, by the cluster of vDUs and based on the estimating the DL channel, a respective downlink (DL) weight for each antenna element of each modular antenna array of the combination of coherent modular antenna arrays, resulting in a set of DL weights. The method may further include applying, by the cluster of vDUs, the set of UL weights and the set of DL weights to the combination of coherent modular antenna arrays, thereby adjusting beamforming of the combination of coherent modular antenna arrays.

In some implementations of these embodiments, the cluster of vDUs is located at a pooling site remote from the combination of coherent modular antenna arrays.

In some implementations of these embodiments, the pilot signals comprise sounding reference signals (SRS).

In some implementations of these embodiments, the obtaining, the estimating the UL channel, the estimating the DL channel, the determining, the calculating, and the applying are performed periodically.

In some implementations of these embodiments, the determining involves matrix inversions, and wherein individual vDUs of the cluster of vDUs share or participate in determining of the matrix inversions.

In various embodiments, a non-transitory machine-readable medium may comprise executable instructions that, when executed by a processing system operatively coupled to a combination of modular antenna panels and including a processor, facilitate performance of operations. The operations may include obtaining sounding reference signal (SRS) symbols from antenna elements of the combination of modular antenna panels. The operations may further include performing an uplink (UL) channel estimation, across a plurality of physical resource blocks (PRBs), using the SRS symbols. The operations may further include predicting a downlink (DL) channel, across the plurality of PRBs, using the SRS symbols, resulting in a predicted DL channel. The operations may further include deriving, for the antenna elements, UL combining weights based on the UL channel estimation and DL precoder weights based on the predicted DL channel. The operations may further include causing the UL combining weights and the DL precoder weights to be applied to the antenna elements of the combination of modular antenna panels.

In some implementations of these embodiments, the combination of modular antenna panels is operated in multi-user (Mu)-multiple-input-multiple-output (MIMO) mode, single-user (Su)-MIMO mode, or a combination thereof.

In some implementations of these embodiments, the combination of modular antenna panels is operated in time division duplex (TDD), frequency division duplex (FDD), or a combination thereof.

In some implementations of these embodiments, the antenna elements comprise all of the antenna elements of the combination of modular antenna panels.

In some implementations of these embodiments, the performing the UL channel estimation and the predicting the DL channel are based on one or more coherence block indicators.

Figure 8E:
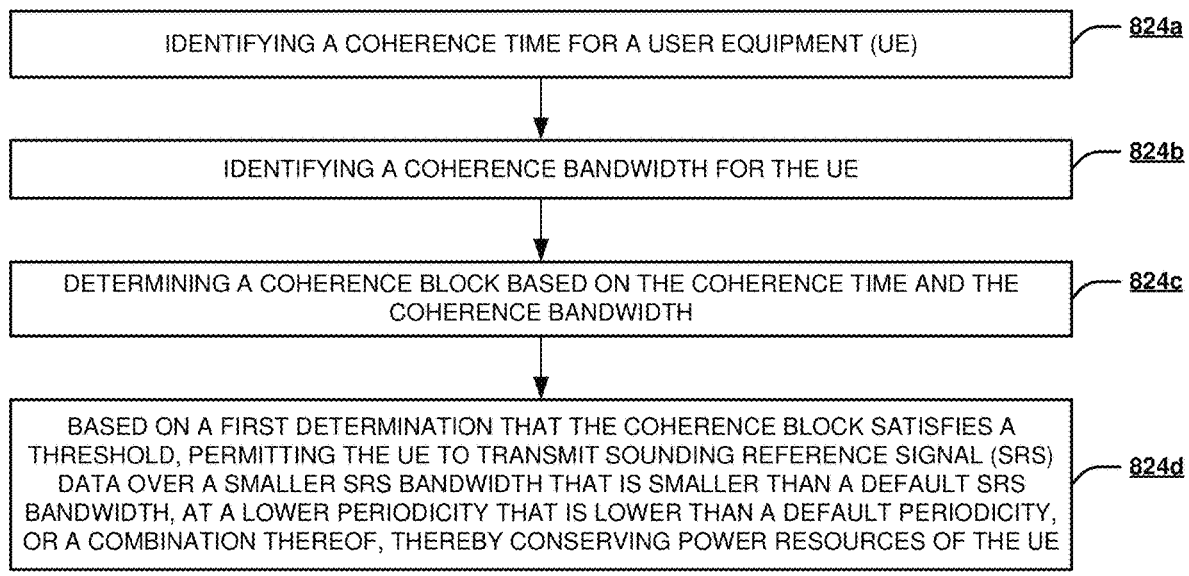

FIG. 8E depicts an illustrative embodiment of a method 824 in accordance with various aspects described herein. In some embodiments, one or more process blocks of FIG. 8E can be performed by a RAN or system, such as the system 162a. In some embodiments, one or more process blocks of FIG. 8E may be performed by another device or a group of devices separate from or including the system 162a, such as the network service management platform 163a, the RIC 164a, the CU 174a, one or more DUs 166a, one or more RUs 168a, and/or the core network 190.

At 824a, the method can include identifying a coherence time for a user equipment (UE). For example, the system 162a can, in a manner similar to that described elsewhere herein, perform one or more operations that include identifying a coherence time for a user equipment (UE). In various embodiments, the system 162a may include multiple adaptive antenna arrays that operate as a coherent antenna system.

At 824b, the method can include identifying a coherence bandwidth for the UE. For example, the system 162a can, in a manner similar to that described elsewhere herein, perform one or more operations that include identifying a coherence bandwidth for the UE.

At 824c, the method can include determining a coherence block based on the coherence time and the coherence bandwidth. For example, the system 162a can, in a manner similar to that described elsewhere herein, perform one or more operations that include determining a coherence block based on the coherence time and the coherence bandwidth.

At 824*d*, the method can include, based on a first determination that the coherence block satisfies a threshold, permitting the UE to transmit sounding reference signal (SRS) data over a smaller SRS bandwidth that is smaller than a default SRS bandwidth, at a lower periodicity that is lower than a default periodicity, or a combination thereof, thereby conserving power resources of the UE. For example, the system 162*a* can, in a manner similar to that described elsewhere herein, perform one or more operations that include, based on a first determination that the coherence block satisfies a threshold, permitting the UE to transmit sounding reference signal (SRS) data over a smaller SRS bandwidth that is smaller than a default SRS bandwidth, at a lower periodicity that is lower than a default periodicity, or a combination thereof, thereby conserving power resources of the UE.

In some implementations of these embodiments, the UE is located at or within a threshold distance from a cell edge, and the system 162*a* may perform one or more operations that include, based on the first determination that the coherence block satisfies the threshold, exploiting the coherence block by determining an average across the coherence block to obtain an uplink (UL) channel estimate for the UE, thereby maintaining UL coverage for the UE.

In some implementations of these embodiments, the permitting comprises instructing the UE to transmit the SRS data over the smaller SRS bandwidth, at the lower periodicity, or the combination thereof.

In some implementations of these embodiments, the system 162*a* may perform one or more operations that include, based on the first determination that the coherence block satisfies the threshold, determining that the UE is eligible for multi-user (Mu)-multiple-input-multiple-output (MIMO).

In some implementations of these embodiments, the system 162*a* may perform one or more operations that include employing Mu-MIMO for the UE based on the determining that the UE is eligible for Mu-MIMO.

In some implementations of these embodiments, the employing Mu-MIMO for the UE is performed transparently to other UEs for which single-user (Su)-MIMO is employed.

In some implementations of these embodiments, the system 162*a* may perform one or more operations that include, based on a second determination that the coherence block does not satisfy the threshold, determining that the UE is not eligible for multi-user (Mu)-multiple-input-multiple-output (MIMO).

In some implementations of these embodiments, the threshold comprises a number of SRS symbols.

In some implementations of these embodiments, the multiple adaptive antenna arrays operate in time division duplex (TDD), frequency division duplex (FDD), or a combination thereof.

In some implementations of these embodiments, the identifying the coherence time and the coherence bandwidth comprises obtaining information regarding the coherence time and the coherence bandwidth via an Open RAN (O-RAN) compliant interface.

While for purposes of simplicity of explanation, the respective processes are shown and described as a series of blocks in FIG. 8E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a non-transitory machine-readable medium may comprise executable instructions that, when executed by a processing system communicatively coupled with a combination of modular antenna panels and including a processor, facilitate performance of operations. The operations may include tracking a coherence block for a user equipment (UE) based on information obtained from a RAN interface. The operations may further include identifying, based on the tracking, that the coherence block does not satisfy a threshold. The operations may further include, based on the identifying that the coherence block does not satisfy the threshold, instructing the UE to transmit sounding reference signals (SRS) over a larger SRS bandwidth that is larger than a default SRS bandwidth, at a higher periodicity that is higher than a default periodicity, or a combination thereof, and determining that the UE is not eligible for multi-user (Mu)-multiple-input-multiple-output (MIMO).

In some implementations of these embodiments, each modular antenna panel of the combination of modular antenna panels comprises a respective group of antenna elements, resulting in multiple respective groups of antenna elements, and the antenna elements of the multiple respective groups of antenna elements are coherent with one another.

In some implementations of these embodiments, the combination of modular antenna panels operates in time division duplex (TDD), frequency division duplex (FDD), or a combination thereof.

In some implementations of these embodiments, the RAN interface conforms to Open RAN (O-RAN) standards.

In some implementations of these embodiments, the threshold comprises a number of SRS symbols.

In various embodiments, a method may include identifying, by a processing system including a processor, a coherence time and a coherence bandwidth for a user equipment (UE), wherein the UE is located at or within a threshold distance from a cell edge. The method may further include determining, by the processing system, a coherence block based on the coherence time and the coherence bandwidth. The method may further include, based on a determination that the coherence block satisfies a threshold, exploiting, by the processing system, the coherence block by determining an average across the coherence block to obtain an uplink (UL) channel estimate for the UE, thereby maintaining UL coverage for the UE and enabling multi-user (Mu)-multiple-input-multiple-output (MIMO).

In some implementations of these embodiments, the method may further include, based on the determination that the coherence block satisfies the threshold, permitting the UE to transmit sounding reference signal (SRS) data over a smaller SRS bandwidth, at a lower periodicity, or a combination thereof, thereby conserving power resources of the UE.

In some implementations of these embodiments, the permitting comprises instructing the UE to transmit the SRS data over the smaller SRS bandwidth, at the lower periodicity, or the combination thereof.

In some implementations of these embodiments, the processing system is communicatively coupled with an aggregation of modular antenna arrays that operate in time division duplex (TDD), frequency division duplex (FDD), or a combination thereof.

In some implementations of these embodiments, the identifying the coherence time and the coherence bandwidth comprises obtaining the coherence time and the coherence bandwidth via an Open Radio Access Network (O-RAN)-compliant interface.

Figure 8F:
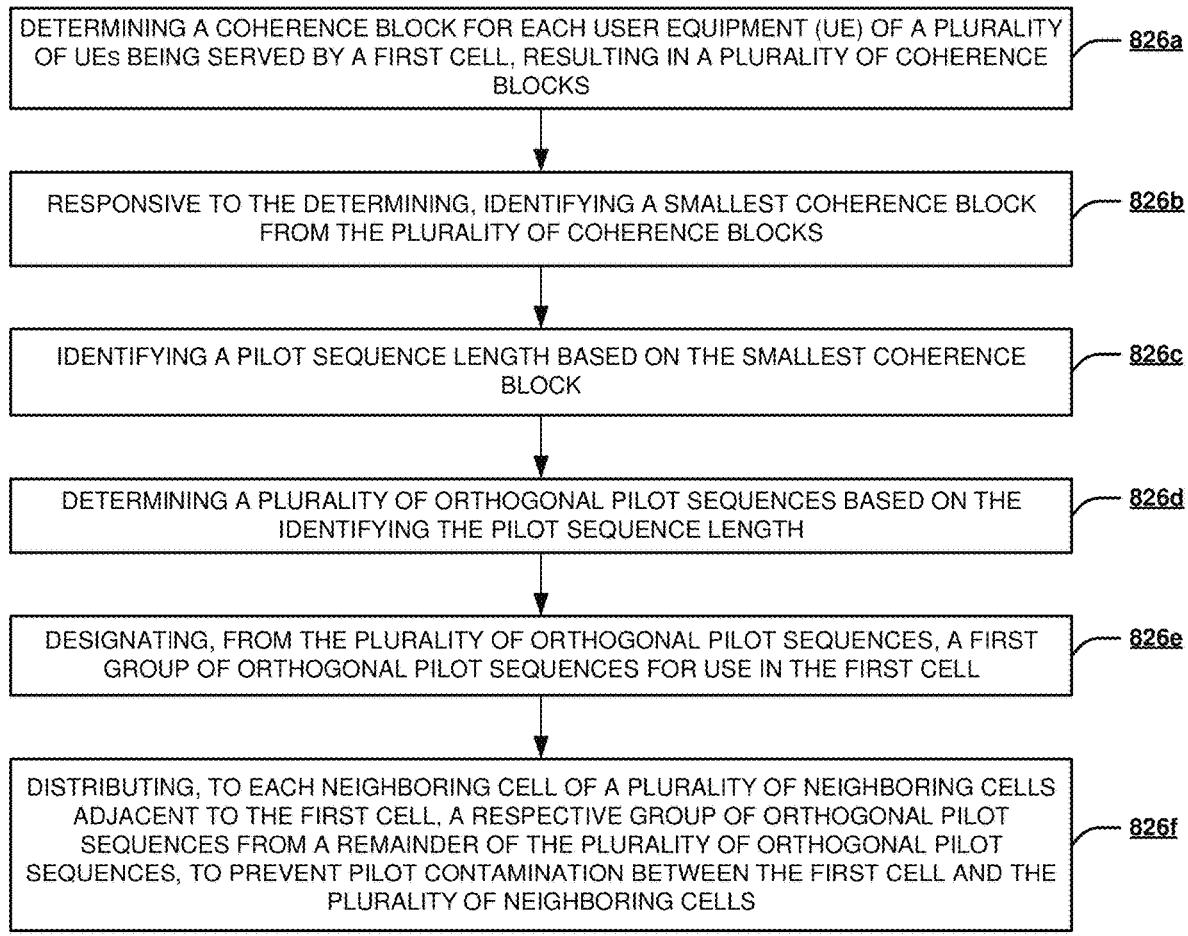

FIG. 8F depicts an illustrative embodiment of a method 826 in accordance with various aspects described herein. In some embodiments, one or more process blocks of FIG. 8F can be performed by a RAN or system, such as the system 162a. In some embodiments, one or more process blocks of FIG. 8F may be performed by another device or a group of devices separate from or including the system 162a, such as the network service management platform 163a, the RIC 164a, the CU 174a, one or more DUs 166a, one or more RUs 168a, and/or the core network 190.

At 826a, the method can include determining a coherence block for each user equipment (UE) of a plurality of UEs being served by a first cell, resulting in a plurality of coherence blocks. For example, the system 162a can, in a manner similar to that described elsewhere herein, perform one or more operations that include determining a coherence block for each user equipment (UE) of a plurality of UEs being served by a first cell, resulting in a plurality of coherence blocks.

At 826b, the method can include, responsive to the determining, identifying a smallest coherence block from the plurality of coherence blocks. For example, the system 162a can, in a manner similar to that described elsewhere herein, perform one or more operations that include, responsive to the determining, identifying a smallest coherence block from the plurality of coherence blocks.

At 826c, the method can include identifying a pilot sequence length based on the smallest coherence block. For example, the system 162a can, in a manner similar to that described elsewhere herein, perform one or more operations that include identifying a pilot sequence length based on the smallest coherence block.

At 826d, the method can include determining a plurality of orthogonal pilot sequences based on the identifying the pilot sequence length. For example, the system 162a can, in a manner similar to that described elsewhere herein, perform one or more operations that include determining a plurality of orthogonal pilot sequences based on the identifying the pilot sequence length.

At 826e, the method can include designating, from the plurality of orthogonal pilot sequences, a first group of orthogonal pilot sequences for use in the first cell. For example, the system 162a can, in a manner similar to that described elsewhere herein, perform one or more operations that include designating, from the plurality of orthogonal pilot sequences, a first group of orthogonal pilot sequences for use in the first cell.

At 826f, the method can include distributing, to each neighboring cell of a plurality of neighboring cells adjacent to the first cell, a respective group of orthogonal pilot sequences from a remainder of the plurality of orthogonal pilot sequences, to prevent pilot contamination between the first cell and the plurality of neighboring cells. For example, the system 162a can, in a manner similar to that described elsewhere herein, perform one or more operations that include distributing, to each neighboring cell of a plurality of neighboring cells adjacent to the first cell, a respective group of orthogonal pilot sequences from a remainder of the plurality of orthogonal pilot sequences, to prevent pilot contamination between the first cell and the plurality of neighboring cells.

In some implementations of these embodiments, the system 162a may perform one or more operations that include identifying a number of cells in which the plurality of orthogonal pilot sequences is not to be reused.

In some implementations of these embodiments, the distributing is based on the identifying the number of cells.

In some implementations of these embodiments, the distributing enables the processing system to identify transmissions of other UEs served by the plurality of neighboring cells.

In some implementations of these embodiments, the distributing enables the processing system to perform channel estimation for the other UEs served by the plurality of neighboring cells.

In some implementations of these embodiments, the channel estimation enables the processing system to generate null patterns for the other UEs.

In some implementations of these embodiments, the null patterns are for an uplink (UL) or a downlink (DL).

In some implementations of these embodiments, multi-user (Mu)-multiple-input-multiple-output (MIMO) is employed for a first UE of the plurality of UEs based on a first coherence block of the first UE satisfying a threshold, and single-user (Su)-MIMO is employed for a second UE of the plurality of UEs based on a second coherence block of the second UE not satisfying the threshold.

In some implementations of these embodiments, the determining the coherence block for each UE of the plurality of UEs comprises identifying a coherence time for that UE and a coherence bandwidth for that UE.

While for purposes of simplicity of explanation, the respective processes are shown and described as a series of blocks in FIG. 8F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include tracking coherence blocks for a plurality of user equipment (UEs) being served by a first cell via the plurality of coherent modular antenna panels. The operations may further include identifying a particular pilot sequence length based on the tracking the coherence blocks. The operations may further include, responsive to the identifying the particular pilot sequence length, generating a plurality of orthogonal pilot sequences. The operations may further include determining a number of cells in which any given pilot sequence of the plurality of orthogonal pilot sequences is not to be reused. The operations may further include identifying a plurality of neighboring cells adjacent to the first cell based on the determining the number of cells. The operations may further include utilizing, in the first cell, a first subset of orthogonal pilot sequences of the plurality of orthogonal pilot sequences. The operations may further include providing, to each neighboring cell of the plurality of neighboring cells, a respective subset of orthogonal pilot sequences of a remainder of the plurality of orthogonal pilot sequences.

In some implementations of these embodiments, the providing enables the processing system to perform channel estimation for other UEs served by the plurality of neighboring cells.

In some implementations of these embodiments, the channel estimation enables the processing system to generate null patterns for the other UEs.

In some implementations of these embodiments, the plurality of coherent modular antenna panels is operated in both single-user (Su)-multiple-input-multiple-output (MIMO) mode and multi-user (Mu)-MIMO mode.

In some implementations of these embodiments, the tracking the coherence blocks involves determining coherence times and coherence bandwidths for the plurality of UEs.

In various embodiments, a method may include determining, by a processing system including a processor, a coherence block for each user equipment (UE) of a plurality of UEs being served by a first cell, resulting in a plurality of coherence blocks. The method may further include, responsive to the determining, identifying, by the processing system, a particular coherence block from the plurality of coherence blocks. The method may further include identifying, by the processing system, a sounding reference signal (SRS) sequence length based on the particular coherence block. The method may further include determining, by the processing system, a plurality of orthogonal SRS sequences based on the identifying the SRS sequence length. The method may further include identifying, by the processing system and from the plurality of orthogonal SRS sequences, a first group of orthogonal SRS sequences for use in the first cell. The method may further include transmitting, by the processing system and to each neighboring cell of a plurality of neighboring cells adjacent to the first cell, a respective group of orthogonal SRS sequences from a remainder of the plurality of orthogonal SRS sequences, so as to avoid pilot contamination between the first cell and the plurality of neighboring cells.

In some implementations of these embodiments, the determining the plurality of orthogonal SRS sequences comprises determining a plurality of Zadoff-Chu sequences.

In some implementations of these embodiments, the method may further include identifying a number of cells in which any given SRS sequence of the plurality of orthogonal SRS sequences is not to be reused.

In some implementations of these embodiments, the identifying the first group of orthogonal SRS sequences for use in the first cell, and the transmitting, are based on the identifying the number of cells.

In some implementations of these embodiments, the transmitting enables the processing system to identify transmissions of other UEs served by the plurality of neighboring cells, perform channel estimation for the other UEs, and generate null patterns for the other UEs.

Figure 8G:
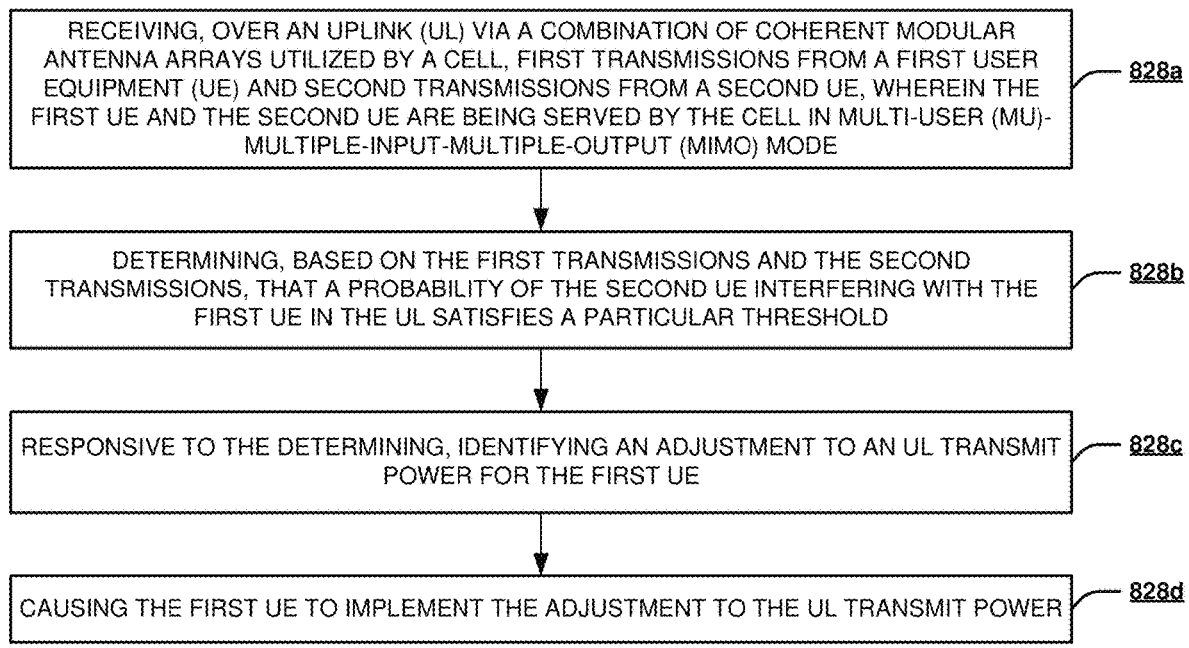

FIG. 8G depicts an illustrative embodiment of a method 828 in accordance with various aspects described herein. In some embodiments, one or more process blocks of FIG. 8G can be performed by a RAN or system, such as the system 162a. In some embodiments, one or more process blocks of FIG. 8G may be performed by another device or a group of devices separate from or including the system 162a, such as the network service management platform 163a, the RIC 164a, the CU 174a, one or more DUs 166a, one or more RUs 168a, and/or the core network 190.

At 828a, the method can include receiving, over an uplink (UL) via a combination of coherent modular antenna arrays utilized by a cell, first transmissions from a first user equipment (UE) and second transmissions from a second UE, wherein the first UE and the second UE are being served by the cell in multi-user (Mu)-multiple-input-multiple-output (MIMO) mode. For example, the system 162a can, in a manner similar to that described elsewhere herein, perform one or more operations that include receiving, over an uplink (UL) via a combination of coherent modular antenna arrays utilized by a cell, first transmissions from a first user equipment (UE) and second transmissions from a second UE, wherein the first UE and the second UE are being served by the cell in multi-user (Mu)-multiple-input-multiple-output (MIMO) mode.

At 828b, the method can include determining, based on the first transmissions and the second transmissions, that a probability of the second UE interfering with the first UE in the UL satisfies a particular threshold. For example, the system 162a can, in a manner similar to that described elsewhere herein, perform one or more operations that include determining, based on the first transmissions and the second transmissions, that a probability of the second UE interfering with the first UE in the UL satisfies a particular threshold.

At 828c, the method can include, responsive to the determining, identifying an adjustment to an UL transmit power for the first UE. For example, the system 162a can, in a manner similar to that described elsewhere herein, perform one or more operations that include, responsive to the determining, identifying an adjustment to an UL transmit power for the first UE.

At 828d, the method can include causing the first UE to implement the adjustment to the UL transmit power. For example, the system 162a can, in a manner similar to that described elsewhere herein, perform one or more operations that include causing the first UE to implement the adjustment to the UL transmit power.

In some implementations of these embodiments, the first transmissions are associated with a first signal strength, the second transmissions are associated with a second signal strength, and the determining that the probability of the second UE interfering with the first UE in the UL satisfies the particular threshold is based on detecting the second signal strength being greater than the first signal strength.

In some implementations of these embodiments, the first transmissions are associated with a first signal strength, the second transmissions are associated with a second signal strength, and the determining that the probability of the second UE interfering with the first UE in the UL satisfies the particular threshold is based on detecting that a difference between the first signal strength and the second signal strength is greater than a certain threshold.

In some implementations of these embodiments, the adjustment comprises an increase to the UL transmit power for the first UE.

In some implementations of these embodiments, the system 162a may perform one or more operations that include, responsive to the determining, identifying a second adjustment to a second UL transmit power for the second UE.

In some implementations of these embodiments, the second adjustment comprises a decrease to the second UL transmit power for the second UE.

In some implementations of these embodiments, the first UE is located at or proximate to an edge of the cell, and the second UE is located closer to the combination of coherent modular antenna arrays than the first UE.

In some implementations of these embodiments, communications between the combination of coherent modular antenna arrays and the first and second UEs are in frequency division duplex (FDD).

In some implementations of these embodiments, communications between the combination of coherent modular antenna arrays and the first and second UEs are in time division duplex (TDD).

In some implementations of these embodiments, the combination of coherent modular antenna arrays is operated in single-user (Su)-MIMO mode for one or more other UEs.

While for purposes of simplicity of explanation, the respective processes are shown and described as a series of blocks in FIG. 8G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include receiving, over an uplink (UL) via the plurality of coherent modular antenna panels, first signals from a first user equipment (UE) and second signals from a second UE, wherein the first UE and the second UE are being served in multi-user (Mu)-multiple-input-multiple-output (MIMO) mode. The operations may further include identifying, based on the first signals and the second signals, that a probability of the second UE interfering with the first UE in the UL satisfies a particular threshold. The operations may further include, based on the identifying, determining an adjustment to an UL transmit power for the second UE. The operations may further include causing the second UE to implement the adjustment to the UL transmit power.

In some implementations of these embodiments, the first signals are associated with a first signal strength, the second signals are associated with a second signal strength, and the identifying that the probability of the second UE interfering with the first UE in the UL satisfies the particular threshold is based on detecting the second signal strength being greater than the first signal strength.

In some implementations of these embodiments, the first signals are associated with a first signal strength, the second signals are associated with a second signal strength, and the identifying that the probability of the second UE interfering with the first UE in the UL satisfies the particular threshold is based on detecting that a difference between the first signal strength and the second signal strength is greater than a certain threshold.

In some implementations of these embodiments, the adjustment comprises a decrease to the UL transmit power for the second UE.

In some implementations of these embodiments, the operations may further include, responsive to the identifying, determining a different adjustment to an UL transmit power for the first UE, where the different adjustment comprises an increase to the UL transmit power for the first UE.

In various embodiments, a method may include receiving, by a processing system associated with an aggregation of coherent modular antenna arrays and including a processor, first signals from a first user equipment (UE) and second signals from a second UE, wherein the first UE and the second UE are being served in multi-user (Mu)-multiple-input-multiple-output (MIMO) mode. The method may further include identifying, by the processing system, based on the first signals and the second signals, that the second UE is likely to interfere with the first UE in an uplink (UL). The method may further include, based on the identifying, determining, by the processing system, a first adjustment to a first UL transmit power for the first UE and a second adjustment to a second UL transmit power for the second UE. The method may further include causing, by the processing system, the first UE to implement the first adjustment to the first UL transmit power and the second UE to implement the second adjustment to the second UL transmit power.

In some implementations of these embodiments, the first signals are associated with a first signal strength, the second signals are associated with a second signal strength, and the identifying that the second UE is likely to interfere with the first UE in the UL is based on detecting the second signal strength being greater than the first signal strength.

In some implementations of these embodiments, the first signals are associated with a first signal strength, the second signals are associated with a second signal strength, and the identifying that the second UE is likely to interfere with the first UE in the UL is based on detecting that a difference between the first signal strength and the second signal strength is greater than a threshold.

In some implementations of these embodiments, the causing involves controlling UL transmit power parameters via an Open Radio Access Network (O-RAN) interface.

In some implementations of these embodiments, the aggregation of coherent modular antenna arrays is operated in single-user (Su)-MIMO mode for one or more other UEs.

Figure 8H:
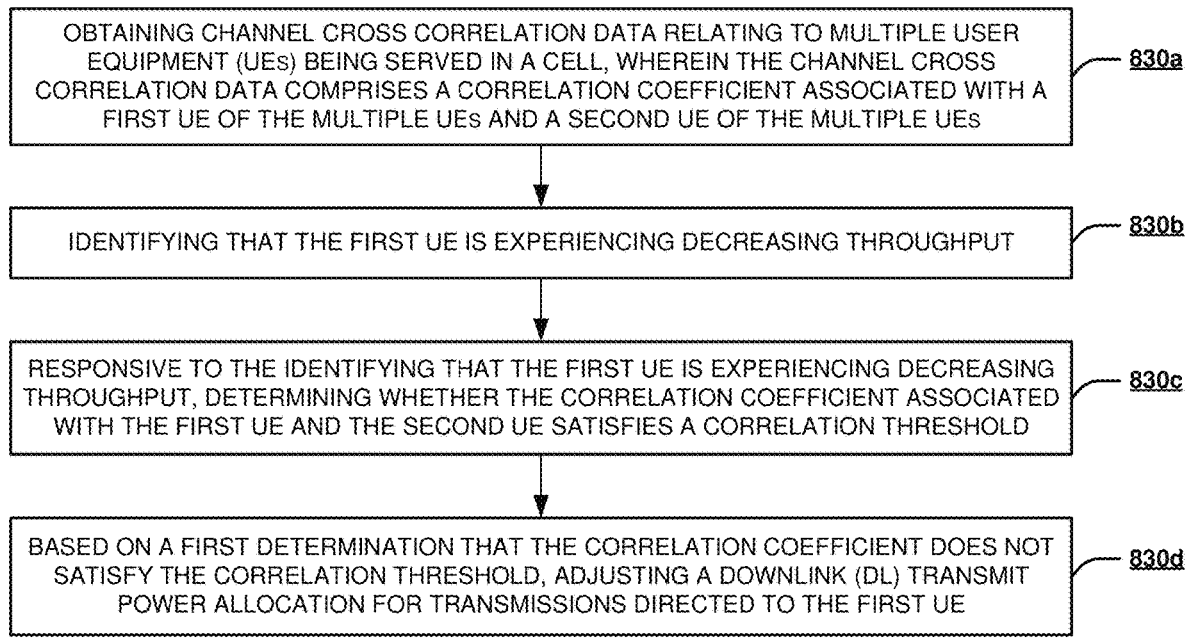

FIG. 8H depicts an illustrative embodiment of a method 830 in accordance with various aspects described herein. In some embodiments, one or more process blocks of FIG. 8H can be performed by a RAN or system, such as the system 162a. In some embodiments, one or more process blocks of FIG. 8H may be performed by another device or a group of devices separate from or including the system 162a, such as the network service management platform 163a, the RIC 164a, the CU 174a, one or more DUs 166a, one or more RUs 168a, and/or the core network 190.

At 830a, the method can include obtaining channel cross correlation data relating to multiple user equipment (UEs) being served in a cell, wherein the channel cross correlation data comprises a correlation coefficient associated with a first UE of the multiple UEs and a second UE of the multiple UEs. For example, the system 162a can, in a manner similar to that described elsewhere herein, perform one or more operations that include obtaining channel cross correlation data relating to multiple user equipment (UEs) being served in a cell, wherein the channel cross correlation data comprises a correlation coefficient associated with a first UE of the multiple UEs and a second UE of the multiple UEs.

At 830b, the method can include identifying that the first UE is experiencing decreasing throughput. For example, the system 162a can, in a manner similar to that described elsewhere herein, perform one or more operations that include identifying that the first UE is experiencing decreasing throughput.

At 830c, the method can include, responsive to the identifying that the first UE is experiencing decreasing throughput, determining whether the correlation coefficient associated with the first UE and the second UE satisfies a correlation threshold. For example, the system 162a can, in a manner similar to that described elsewhere herein, perform one or more operations that include, responsive to the identifying that the first UE is experiencing decreasing throughput, determining whether the correlation coefficient associated with the first UE and the second UE satisfies a correlation threshold.

At 830d, the method can include, based on a first determination that the correlation coefficient does not satisfy the correlation threshold, adjusting a downlink (DL) transmit power allocation for transmissions directed to the first UE. For example, the system 162a can, in a manner similar to that described elsewhere herein, perform one or more operations that include, based on a first determination that the correlation coefficient does not satisfy the correlation threshold, adjusting a downlink (DL) transmit power allocation for transmissions directed to the first UE.

In some implementations of these embodiments, the determining whether the correlation coefficient satisfies the correlation threshold comprises determining whether the correlation coefficient is less than or equal to the correlation threshold.

In some implementations of these embodiments, the adjusting the DL transmit power allocation comprises decreasing the DL transmit power allocation.

In some implementations of these embodiments, the system 162a may perform one or more operations that include, based on a second determination that the correlation coefficient satisfies the correlation threshold, maintaining the DL transmit power allocation.

In some implementations of these embodiments, the first UE is located at or proximate to an edge of the cell.

In some implementations of these embodiments, the multiple UEs are being served in the cell in multi-user (Mu)-multiple-input-multiple-output (MIMO) mode.

In some implementations of these embodiments, the system 162a may perform one or more operations that include identifying that a throughput demand of the second UE satisfies a throughput threshold, where the determining whether the correlation coefficient satisfies the correlation threshold is further responsive to the identifying that the throughput demand of the second UE satisfies the throughput threshold.

In some implementations of these embodiments, the system 162a may perform one or more operations that include identifying that a signal associated with the second UE satisfies a signal quality threshold, where the determining whether the correlation coefficient satisfies the correlation threshold is further responsive to the identifying that the signal associated with the second UE satisfies the signal quality threshold.

In some implementations of these embodiments, the system 162a may perform one or more operations that include monitoring a throughput of the first UE, where the identifying that the first UE is experiencing decreasing throughput is based on the monitoring the throughput of the first UE.

In some implementations of these embodiments, the channel cross correlation data comprises respective channel estimations for the multiple UEs.

While for purposes of simplicity of explanation, the respective processes are shown and described as a series of blocks in FIG. 8H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include determining channel cross correlation information relating to a plurality of user equipment (UEs), wherein the channel cross correlation information comprises respective channel estimations for the plurality of UEs, and wherein the channel cross correlation information is normalized with a correlation coefficient associated with a first UE of the plurality of UEs and a second UE of the plurality of UEs. The operations may further include identifying that a throughput of the first UE satisfies a condition. The operations may further include, based on the identifying that the throughput of the first UE satisfies the condition, determining whether the correlation coefficient associated with the first UE and the second UE satisfies a correlation threshold. The operations may further include, responsive to determining that the correlation coefficient does not satisfy the correlation threshold, adjusting a downlink (DL) transmit power allocation for transmissions directed to the second UE.

In some implementations of these embodiments, the adjusting the DL transmit power allocation comprises increasing the DL transmit power allocation for the transmissions directed to the second UE.

In some implementations of these embodiments, the operations may further include, based on determining that the correlation coefficient satisfies the correlation threshold, maintaining the DL transmit power allocation for the transmissions directed to the second UE.

In some implementations of these embodiments, the plurality of UEs is being served in multi-user (Mu)-multiple-input-multiple-output (MIMO) mode.

In some implementations of these embodiments, each modular antenna panel of the plurality of coherent modular antenna panels comprises a respective group of antenna elements, resulting in a multiple groups of antenna elements, where the plurality of UEs is being served in Mu-MIMO mode via the multiple groups of antenna elements.

In various embodiments, a method may include receiving, by a processing system including a processor, channel cross correlation data relating to multiple user equipment (UEs) being served in a cell, wherein the channel cross correlation data comprises a correlation coefficient associated with a first UE of the multiple UEs and a second UE of the multiple UEs. The method may further include identifying, by the processing system, that a throughput of the first UE is less than a particular threshold and is located at or proximate to an edge of the cell. The method may further include, responsive to the identifying that the throughput of the first UE is less than the particular threshold and is located at or proximate to the edge of the cell, determining, by the processing system, whether the correlation coefficient associated with the first UE and the second UE satisfies a correlation threshold. The method may further include, based on a first determination that the correlation coefficient does not satisfy the correlation threshold, adjusting, by the processing system, a first downlink (DL) transmit power allocation for first transmissions directed to the first UE, adjusting, by the processing system, a second DL transmit power allocation for second transmissions directed to the second UE, or a combination thereof.

In some implementations of these embodiments, the determining whether the correlation coefficient satisfies the correlation threshold comprises determining whether the correlation coefficient is less than or equal to the correlation threshold.

In some implementations of these embodiments, the adjusting the first DL transmit power allocation comprises decreasing the first DL transmit power allocation, where the adjusting the second DL transmit power allocation comprises increasing the second DL transmit power allocation.

In some implementations of these embodiments, the method may further include, based on a second determination that the correlation coefficient satisfies the correlation threshold, maintaining the first DL transmit power allocation, maintaining the second DL transmit power allocation, or a combination thereof.

In some implementations of these embodiments, the multiple UEs are being served in the cell in multi-user (Mu)-multiple-input-multiple-output (MIMO) mode.

Figure 8J:
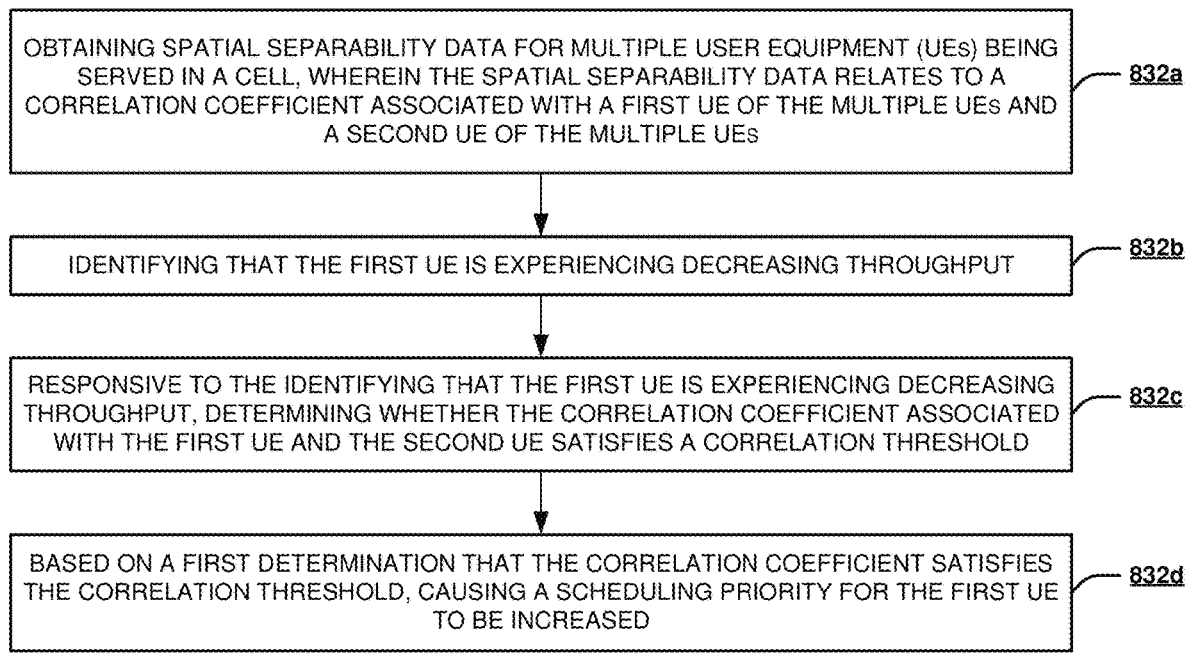

FIG. 8J depicts an illustrative embodiment of a method 832 in accordance with various aspects described herein. In some embodiments, one or more process blocks of FIG. 8J can be performed by a RAN or system, such as the system 162a. In some embodiments, one or more process blocks of FIG. 8J may be performed by another device or a group of devices separate from or including the system 162a, such as the network service management platform 163a, the RIC 164a, the CU 174a, one or more DUs 166a, one or more RUs 168a, and/or the core network 190.

At 832a, the method can include obtaining spatial separability data for multiple user equipment (UEs) being served in a cell, wherein the spatial separability data relates to a correlation coefficient associated with a first UE of the multiple UEs and a second UE of the multiple UEs. For example, the system 162a can, in a manner similar to that described elsewhere herein, perform one or more operations that include obtaining spatial separability data that identifies channel cross correlation for multiple user equipment (UEs) being served in a cell, wherein the channel cross correlation relates to a correlation coefficient associated with a first UE of the multiple UEs and a second UE of the multiple UEs.

At 832b, the method can include identifying that the first UE is experiencing decreasing throughput. For example, the system 162a can, in a manner similar to that described elsewhere herein, perform one or more operations that include identifying that the first UE is experiencing decreasing throughput.

At 832c, the method can include, responsive to the identifying that the first UE is experiencing decreasing throughput, determining whether the correlation coefficient associated with the first UE and the second UE satisfies a correlation threshold. For example, the system 162a can, in a manner similar to that described elsewhere herein, perform one or more operations that include, responsive to the identifying that the first UE is experiencing decreasing throughput, determining whether the correlation coefficient associated with the first UE and the second UE satisfies a correlation threshold.

At 832d, the method can include, based on a first determination that the correlation coefficient satisfies the correlation threshold, causing a scheduling priority for the first UE to be increased. For example, the system 162a can, in a manner similar to that described elsewhere herein, perform one or more operations that include, based on a first determination that the correlation coefficient satisfies the correlation threshold, causing a scheduling priority for the first UE to be increased.

In some implementations of these embodiments, the determining whether the correlation coefficient satisfies the correlation threshold comprises determining whether the correlation coefficient is less than or equal to the correlation threshold.

In some implementations of these embodiments, the system 162a may perform one or more operations that include, based on a second determination that the correlation coefficient does not satisfy the correlation threshold, preventing the scheduling priority for the first UE from being increased.

In some implementations of these embodiments, the system 162a may perform one or more operations that include, based on a second determination that the correlation coefficient does not satisfy the correlation threshold, causing scheduling for the first UE to become de-prioritized.

In some implementations of these embodiments, the first UE is located at or within a threshold distance from an edge of the cell.

In some implementations of these embodiments, the multiple UEs are being served in the cell in multi-user (Mu)-multiple-input-multiple-output (MIMO) mode.

In some implementations of these embodiments, the system 162a may perform one or more operations that include identifying that a throughput demand of the second UE satisfies a throughput threshold, where the determining whether the correlation coefficient satisfies the correlation threshold is further responsive to the identifying that the throughput demand of the second UE satisfies the throughput threshold.

In some implementations of these embodiments, the system 162a may perform one or more operations that include identifying that a signal associated with the second UE satisfies a signal quality threshold, where the determining whether the correlation coefficient satisfies the correlation threshold is further responsive to the identifying that the signal associated with the second UE satisfies the signal quality threshold.

In some implementations of these embodiments, the spatial separability data comprises channel cross correlation that relates to channel estimations for the multiple UEs.

In some implementations of these embodiments, the system 162a may perform one or more operations that include increasing a number of UEs for simultaneous scheduling based on the spatial separability data satisfying a particular threshold.

While for purposes of simplicity of explanation, the respective processes are shown and described as a series of blocks in FIG. 8J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include determining channel cross correlation information relating to a plurality of user equipment (UEs), wherein the channel cross correlation information comprises respective channel estimations for the plurality of UEs, and wherein the channel cross correlation information is normalized with a correlation coefficient associated with a first UE of the plurality of UEs and a second UE of the plurality of UEs. The operations may further include identifying that a throughput of the first UE satisfies a condition. The operations may further include, based on the identifying that the throughput of the first UE satisfies the condition, determining whether the correlation coefficient associated with the first UE and the second UE satisfies a correlation threshold. The operations may further include, responsive to determining that the correlation coefficient does not satisfy the correlation threshold, preventing a scheduling priority for the first UE from being increased or causing scheduling for the first UE to become de-prioritized.

In some implementations of these embodiments, the determining whether the correlation coefficient satisfies the correlation threshold comprises determining whether the correlation coefficient is less than or equal to the correlation threshold.

In some implementations of these embodiments, the plurality of UEs is being served in multi-user (Mu)-multiple-input-multiple-output (MIMO) mode.

In some implementations of these embodiments, each modular antenna panel of the plurality of coherent modular antenna panels comprises a respective group of antenna elements, resulting in a multiple groups of antenna elements, where the plurality of UEs is being served in Mu-MIMO mode via the multiple groups of antenna elements.

In some implementations of these embodiments, the operations may further include monitoring a throughput of the first UE, and wherein the identifying that the throughput of the first UE satisfies the condition is based on the monitoring the throughput of the first UE.

In various embodiments, a method may include receiving, by a processing system including a processor, channel cross correlation data relating to multiple user equipment (UEs) being served in a cell, wherein the channel cross correlation data comprises a correlation coefficient associated with a first UE of the multiple UEs and a second UE of the multiple UEs. The method may further include identifying, by the processing system, that a throughput of the first UE is less than a particular threshold and is located at or within a threshold distance from an edge of the cell. The method may further include, responsive to the identifying that the throughput of the first UE is less than the particular threshold and is located at or within the threshold distance from the edge of the cell, determining, by the processing system, whether the correlation coefficient associated with the first UE and the second UE satisfies a correlation threshold. The method may further include, based on a first determination that the correlation coefficient satisfies the correlation threshold, permitting, by the processing system, a scheduling priority for the first UE to be increased.

In some implementations of these embodiments, the determining whether the correlation coefficient satisfies the correlation threshold comprises determining whether the correlation coefficient is less than or equal to the correlation threshold.

In some implementations of these embodiments, the method may further include, based on a second determination that the correlation coefficient does not satisfy the correlation threshold, preventing the scheduling priority for the first UE from being increased.

In some implementations of these embodiments, the method may further include, based on a second determination that the correlation coefficient does not satisfy the correlation threshold, causing scheduling for the first UE to become de-prioritized.

In some implementations of these embodiments, the multiple UEs are being served in the cell in multi-user (Mu)-multiple-input-multiple-output (MIMO) mode.

Figure 8K:
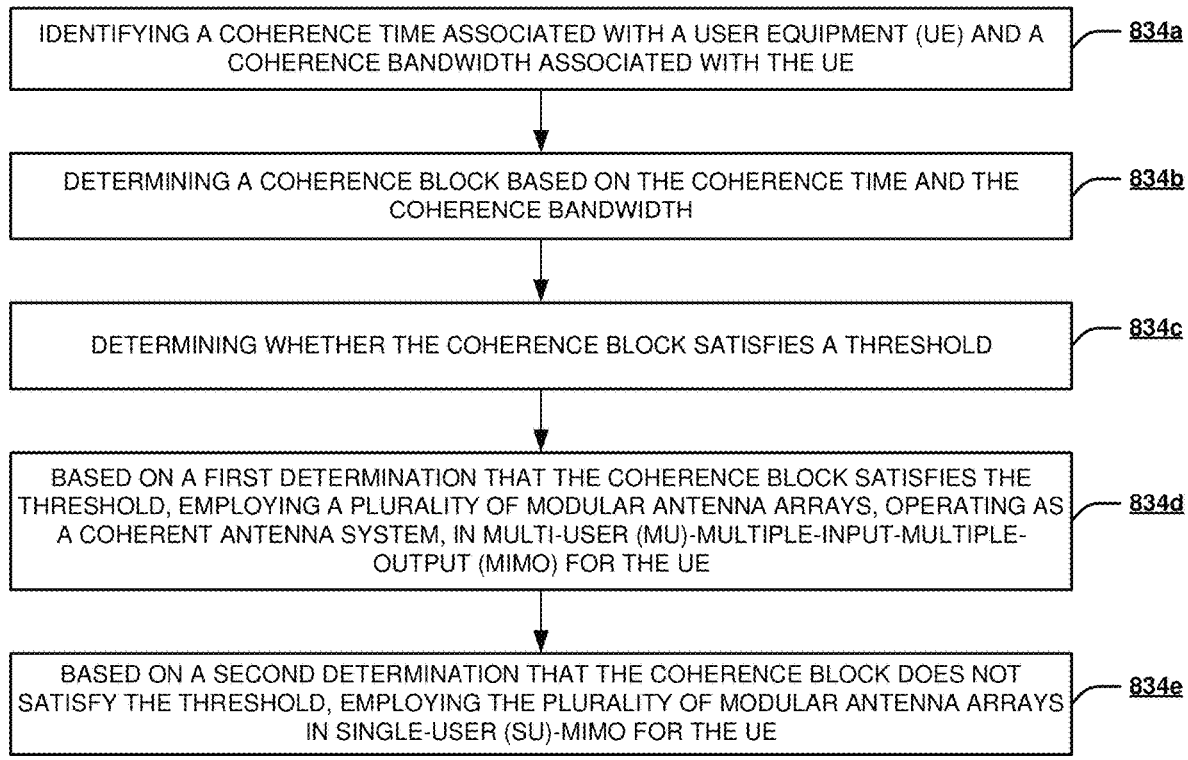

FIG. 8K depicts an illustrative embodiment of a method 834 in accordance with various aspects described herein. In some embodiments, one or more process blocks of FIG. 8K can be performed by a RAN or system, such as the system 162a. In some embodiments, one or more process blocks of FIG. 8K may be performed by another device or a group of devices separate from or including the system 162a, such as the network service management platform 163a, the RIC 164a, the CU 174a, one or more DUs 166a, one or more RUs 168a, and/or the core network 190.

At 834a, the method can include identifying a coherence time associated with a user equipment (UE) and a coherence bandwidth associated with the UE. For example, the system 162a can, in a manner similar to that described elsewhere herein, perform one or more operations that include identifying a coherence time associated with a user equipment (UE) and a coherence bandwidth associated with the UE.

At 834b, the method can include determining a coherence block based on the coherence time and the coherence bandwidth. For example, the system 162a can, in a manner similar to that described elsewhere herein, perform one or more operations that include determining a coherence block based on the coherence time and the coherence bandwidth.

At 834c, the method can include determining whether the coherence block satisfies a threshold. For example, the system 162a can, in a manner similar to that described elsewhere herein, perform one or more operations that include determining whether the coherence block satisfies a threshold.

At 834d, the method can include, based on a first determination that the coherence block satisfies the threshold, employing a plurality of modular antenna arrays, operating as a coherent antenna system, in multi-user (Mu)-multiple-input-multiple-output (MIMO) for the UE. For example, the system 162a can, in a manner similar to that described elsewhere herein, perform one or more operations that include, based on a first determination that the coherence block satisfies the threshold, employing a plurality of modular antenna arrays, operating as a coherent antenna system, in multi-user (Mu)-multiple-input-multiple-output (MIMO) for the UE.

At 834e, the method can include, based on a second determination that the coherence block does not satisfy the threshold, employing the plurality of modular antenna arrays in single-user (Su)-MIMO for the UE. For example, the system 162a can, in a manner similar to that described elsewhere herein, perform one or more operations that include, based on a second determination that the coherence block does not satisfy the threshold, employing the plurality of modular antenna arrays in single-user (Su)-MIMO for the UE.

In some implementations of these embodiments, the determining the coherence block comprises obtaining a product of the coherence time and the coherence bandwidth.

In some implementations of these embodiments, the system 162a may perform one or more operations that include tracking the coherence block after the employing the plurality of modular antenna arrays in Mu-MIMO for the UE, determining, based on the tracking the coherence block, that the coherence block does not satisfy the threshold, and responsive to the determining that the coherence block does not satisfy the threshold, employing the plurality of modular antenna arrays in Su-MIMO for the UE.

In some implementations of these embodiments, the system 162a may perform one or more operations that include tracking the coherence block after the employing the plurality of modular antenna arrays in Su-MIMO for the UE, determining, based on the tracking the coherence block, that the coherence block satisfies the threshold, and responsive to the determining that the coherence block satisfies the threshold, employing the plurality of modular antenna arrays in Mu-MIMO for the UE.

In some implementations of these embodiments, the system 162a may perform one or more operations that include, based on the first determination that the coherence block satisfies the threshold, performing an average of sounding reference signal (SRS) data obtained from the UE to maximize uplink (UL) coverage for the UE.

In some implementations of these embodiments, the threshold comprises a number of sounding reference signal (SRS) symbols.

In some implementations of these embodiments, the employing the plurality of modular antenna arrays in Mu-MIMO for the UE is transparent to other UEs for which Su-MIMO is employed.

In some implementations of these embodiments, the identifying the coherence time and the coherence bandwidth comprises obtaining the coherence time and the coherence bandwidth via an Open Radio Access Network (O-RAN) compliant interface.

In some implementations of these embodiments, the plurality of modular antenna arrays operates in a Mid-band spectrum.

In some implementations of these embodiments, the plurality of modular antenna arrays operates in time division duplex (TDD), frequency division duplex (FDD), or a combination thereof.

While for purposes of simplicity of explanation, the respective processes are shown and described as a series of blocks in FIG. 8K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a non-transitory machine-readable medium may comprise executable instructions that, when executed by a processing system communicatively coupled with a combination of modular antenna panels and including a processor, facilitate performance of operations. The operations may include determining a coherence time and a coherence bandwidth for a user equipment (UE), wherein the UE is located at or within a threshold distance from a cell edge. The operations may further include tracking a coherence block based on the coherence time and the coherence bandwidth. The operations may further include determining whether the coherence block is larger than a predefined coherence block size. The operations may further include, based on a first determination that the coherence block is larger than the predefined coherence block size, employing the combination of modular antenna panels in multi-user (Mu)-multiple-input-multiple-output (MIMO) for the UE. The operations may further include, based on a second determination that the coherence block is not larger than the predefined coherence block size, employing the combination of modular antenna panels in single-user (Su)-MIMO for the UE.

In some implementations of these embodiments, the operations may further include monitoring the coherence block after the employing the combination of modular antenna panels in Mu-MIMO for the UE, determining, based on the monitoring the coherence block, that the coherence block is no longer larger than the predefined coherence block size, and responsive to the determining that the coherence block is no longer larger than the predefined coherence block size, employing the combination of modular antenna panels in Su-MIMO for the UE.

In some implementations of these embodiments, the operations may further include, based on the first determination that the coherence block is larger than the predefined coherence block size, performing an average of sounding reference signal (SRS) data obtained from the UE to maximize uplink (UL) coverage for the UE.

In some implementations of these embodiments, the employing the combination of modular antenna panels in Mu-MIMO for the UE is transparent to other UEs for which Su-MIMO is employed.

In some implementations of these embodiments, the combination of modular antenna panels operates in time division duplex (TDD), frequency division duplex (FDD), or a combination thereof.

In various embodiments, a method may include tracking, by a processing system, a coherence block for a user equipment (UE). The method may further include determining, by the processing system and based on the tracking, whether to serve the UE in multi-user (Mu)-multiple-input-multiple-output (MIMO) mode or single-user (Su)-MIMO mode. The method may further include, based on a first determination to serve the UE in the Mu-MIMO mode, employing, by the processing system, an aggregation of coherent modular antenna arrays to operate in Mu-MIMO for the UE. The method may further include, based on a second determination to serve the UE in the Su-MIMO mode, employing, by the processing system, the aggregation of coherent modular antenna arrays to operate in Su-MIMO for the UE.

In some implementations of these embodiments, the coherence block is based on a coherence time and a coherence bandwidth for the UE.

In some implementations of these embodiments, the method may further include monitoring the coherence block after the employing the aggregation of coherent modular antenna arrays to operate in Mu-MIMO for the UE, determining, based on the monitoring the coherence block, to serve the UE in the Su-MIMO mode, and responsive to the determining to serve the UE in the Su-MIMO mode, employing the aggregation of coherent modular antenna arrays in Su-MIMO for the UE.

In some implementations of these embodiments, the method may further include, based on the first determination, performing an average of sounding reference signal (SRS) data obtained from the UE to maximize uplink (UL) coverage for the UE.

In some implementations of these embodiments, the employing the aggregation of coherent modular antenna arrays to operate in Mu-MIMO for the UE is transparent to other UEs for which Su-MIMO is employed.

Figure 8L:
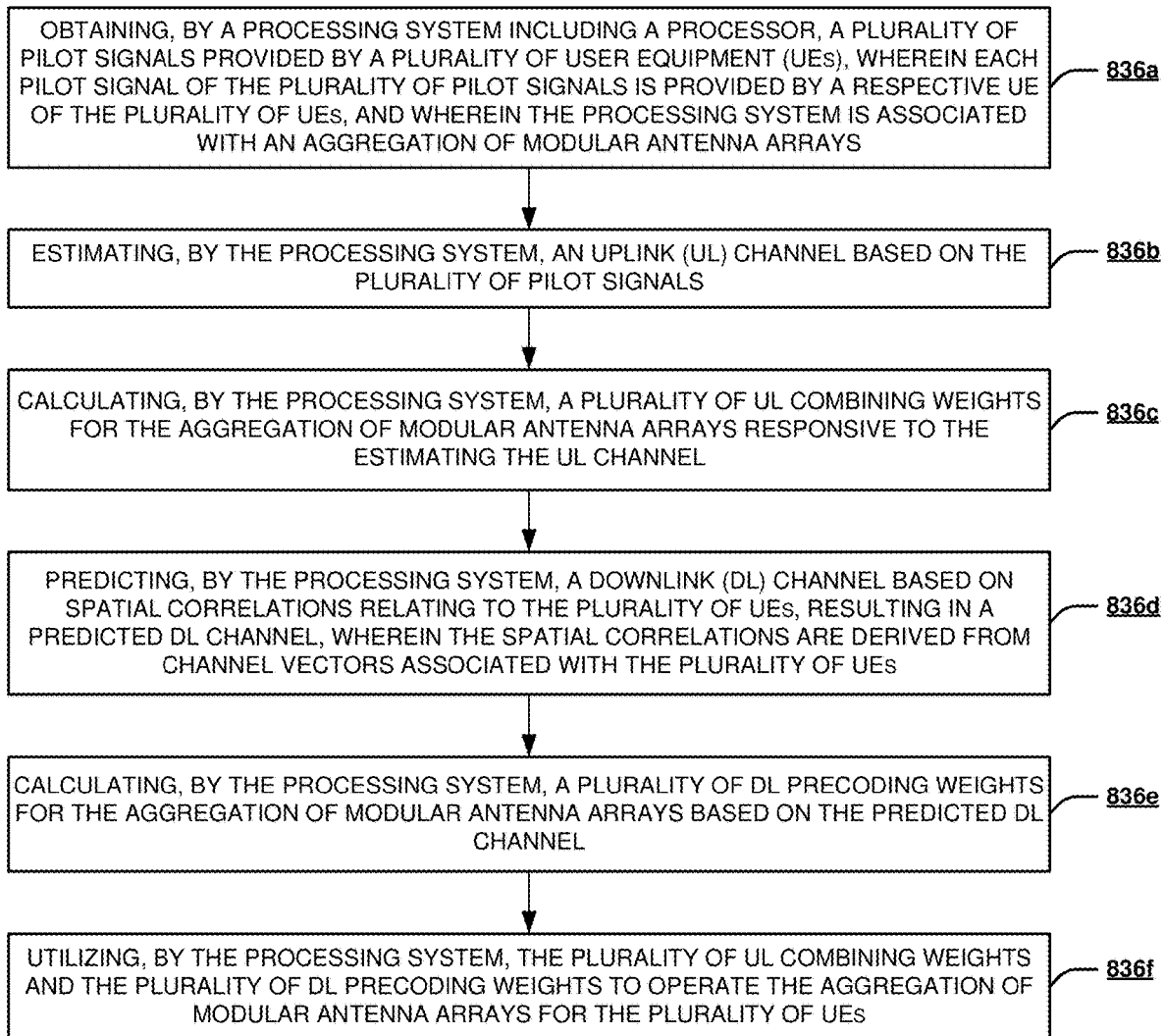

FIG. 8L depicts an illustrative embodiment of a method 836 in accordance with various aspects described herein. In some embodiments, one or more process blocks of FIG. 8L can be performed by a RAN or system, such as the system 162a. In some embodiments, one or more process blocks of FIG. 8L may be performed by another device or a group of devices separate from or including the system 162a, such as the network service management platform 163a, the RIC 164a, the CU 174a, one or more DUs 166a, one or more RUs 168a, and/or the core network 190.

At 836a, the method can include obtaining a plurality of pilot signals provided by a plurality of user equipment (UEs), wherein each pilot signal of the plurality of pilot signals is provided by a respective UE of the plurality of UEs. For example, the system 162a can, in a manner similar to that described elsewhere herein, perform one or more operations that include obtaining a plurality of pilot signals provided by a plurality of user equipment (UEs), wherein each pilot signal of the plurality of pilot signals is provided by a respective UE of the plurality of UEs.

At 836b, the method can include estimating an uplink (UL) channel based on the plurality of pilot signals. For example, the system 162a can, in a manner similar to that described elsewhere herein, perform one or more operations that include estimating an uplink (UL) channel based on the plurality of pilot signals.

At 836c, the method can include calculating a plurality of UL combining weights for the aggregation of modular antenna arrays responsive to the estimating the UL channel. For example, the system 162a can, in a manner similar to that described elsewhere herein, perform one or more operations that include calculating a plurality of UL combining weights for the aggregation of modular antenna arrays responsive to the estimating the UL channel.

At 836d, the method can include predicting a downlink (DL) channel based on spatial correlations relating to the plurality of UEs, resulting in a predicted DL channel, wherein the spatial correlations are derived from channel vectors associated with the plurality of UEs. For example, the system 162a can, in a manner similar to that described elsewhere herein, perform one or more operations that include predicting a downlink (DL) channel based on spatial correlations relating to the plurality of UEs, resulting in a predicted DL channel, wherein the spatial correlations are derived from channel vectors associated with the plurality of UEs.

At 836e, the method can include calculating a plurality of DL precoding weights for the aggregation of modular antenna arrays based on the predicted DL channel. For example, the system 162a can, in a manner similar to that described elsewhere herein, perform one or more operations that include calculating a plurality of DL precoding weights for the aggregation of modular antenna arrays based on the predicted DL channel.

At 836f, the method can include utilizing the plurality of UL combining weights and the plurality of DL precoding weights to operate the aggregation of modular antenna arrays for the plurality of UEs. For example, the system 162a can, in a manner similar to that described elsewhere herein, perform one or more operations that include utilizing the plurality of UL combining weights and the plurality of DL precoding weights to operate the aggregation of modular antenna arrays for the plurality of UEs.

In some implementations of these embodiments, the UL channel and the DL channel are operated in frequency division duplex (FDD).

In some implementations of these embodiments, the utilizing enables multi-user (Mu)-multiple-input-multiple-output (MIMO) to be employed for one or more UEs of the plurality of UEs.

In some implementations of these embodiments, the predicting the DL channel based on the spatial correlations relating to the plurality of UEs comprises performing one or more averages of the spatial correlations.

In some implementations of these embodiments, the plurality of UL combining weights comprises a plurality of amplitudes for the UL, a plurality of phases for the UL, or a combination thereof.

In some implementations of these embodiments, the plurality of DL precoding weights comprises a plurality of amplitudes for the DL, a plurality of phases for the DL, or a combination thereof.

In some implementations of these embodiments, each pilot signal of the plurality of pilot signals comprises a sounding reference signal (SRS), where, for input interference relating to a neighbor cell UE, a fixed UE, or an active external source, the calculating the plurality of UL combining weights and the calculating the plurality of DL precoding weights involves subtracting a summation of known UE channels from an autocovariance determined based on received signals in order to identify or isolate the input interference.

In some implementations of these embodiments, the aggregation of antenna arrays comprises a plurality of antenna panels, where each antenna panel of the plurality of antenna panels comprises a plurality of antenna elements.

In some implementations of these embodiments, each UL combining weight of the plurality of UL combining weights corresponds to a respective antenna element of the plurality of antenna elements.

In some implementations of these embodiments, each DL precoding weight of the plurality of DL precoding weights corresponds to a respective antenna element of the plurality of antenna elements.

While for purposes of simplicity of explanation, the respective processes are shown and described as a series of blocks in FIG. 8L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include receiving a plurality of orthogonal sounding reference signals (SRS) from a plurality of user equipment (UEs), wherein each SRS of the plurality of orthogonal SRS is provided by a respective UE of the plurality of UEs. The operations may further include determining a downlink (DL) channel, in frequency division duplex (FDD), using spatial correlations relating to the plurality of UEs, wherein the spatial correlations are based on the plurality of orthogonal SRS. The operations may further include calculating a plurality of DL precoding weights for the plurality of coherent modular antenna panels responsive to the determining the DL channel. The operations may further include applying the plurality of DL precoding weights to the plurality of coherent modular antenna panels to enable multi-user (Mu)-multiple-input-multiple-output (MIMO) for the plurality of UEs.

In some implementations of these embodiments, the determining the DL channel using the spatial correlations relating to the plurality of UEs comprises determining one or more expectations of the spatial correlations.

In some implementations of these embodiments, each modular antenna panel of the plurality of coherent modular antenna panels comprises a plurality of antenna elements, resulting in multiple pluralities of antenna elements.

In some implementations of these embodiments, each DL precoding weight of the plurality of DL precoding weights corresponds to a respective antenna element of the multiple pluralities of antenna elements.

In some implementations of these embodiments, the plurality of UEs includes fixed wireless customer premises equipment (CPEs) located at or within a threshold distance from a cell edge associated with the processing system.

In various embodiments, a non-transitory machine-readable medium, comprising executable instructions that, when executed by a processing system that is associated with a coherent combination of modular antenna arrays and that includes a processor, facilitate performance of operations. The operations may include estimating a frequency division duplex (FDD) uplink (UL) channel based on pilot signals transmitted by a plurality of user equipment (UEs). The operations may further include, responsive to the estimating the FDD UL channel, determining a plurality of UL weights for the coherent combination of modular antenna arrays. The operations may further include predicting an FDD downlink (DL) channel based on spatial correlations corresponding to the plurality of UEs, resulting in a predicted FDD DL channel, wherein the spatial correlations are based on channel vectors associated with the plurality of UEs. The operations may further include determining a plurality of DL weights for the coherent combination of modular antenna arrays based on the predicted FDD DL channel. The operations may further include causing the plurality of UL weights and the plurality of DL weights to be applied to the coherent combination of modular antenna arrays for the plurality of UEs.

In some implementations of these embodiments, the causing enables multi-user (Mu)-multiple-input-multiple-output (MIMO) to be employed for one or more UEs of the plurality of UEs.

In some implementations of these embodiments, the predicting the FDD DL channel based on the spatial correlations corresponding to the plurality of UEs comprises performing one or more averages of the spatial correlations, where the predicting the FDD DL channel further involves compensating for a difference between an UL frequency and a DL frequency by performing spatial-scaling of UL channel data such that a first phase difference between DL signals emitted by different antenna elements of the coherent combination of modular antenna arrays is the same as a second phase difference in an UL direction.

In some implementations of these embodiments, the pilot signals comprise sounding reference signals (SRS).

In some implementations of these embodiments, each modular antenna array of the coherent combination of modular antenna arrays comprises a group of antenna elements, resulting in multiple groups of antenna elements, where each antenna element of the multiple groups of antenna elements is associated with a respective programmable device.

Figure 8M:
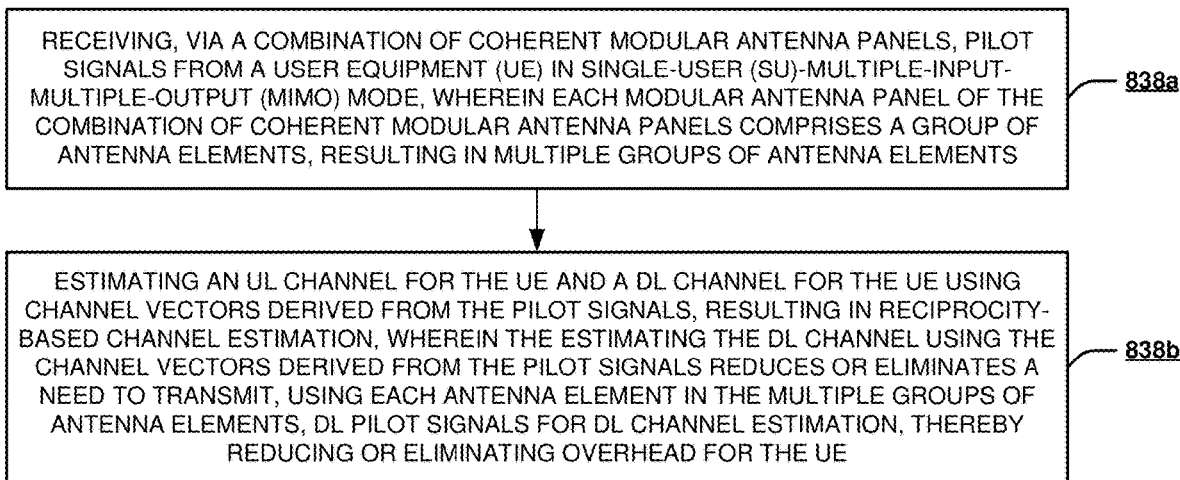

FIG. 8M depicts an illustrative embodiment of a method 838 in accordance with various aspects described herein. In some embodiments, one or more process blocks of FIG. 8M can be performed by a RAN or system, such as the system 162a. In some embodiments, one or more process blocks of FIG. 8M may be performed by another device or a group of devices separate from or including the system 162a, such as the network service management platform 163a, the RIC 164a, the CU 174a, one or more DUs 166a, one or more RUs 168a, and/or the core network 190.

At 838a, the method can include receiving, via a combination of coherent modular antenna panels, pilot signals from a user equipment (UE) in single-user (Su)-multiple-input-multiple-output (MIMO) mode, wherein each modular antenna panel of the combination of coherent modular antenna panels comprises a group of antenna elements, resulting in multiple groups of antenna elements. For example, the system 162a can, in a manner similar to that described elsewhere herein, perform one or more operations that include receiving, via a combination of coherent modular antenna panels, pilot signals from a user equipment (UE) in single-user (Su)-multiple-input-multiple-output (MIMO) mode, wherein each modular antenna panel of the combination of coherent modular antenna panels comprises a group of antenna elements, resulting in multiple groups of antenna elements.

At 838b, the method can include estimating an UL channel for the UE and a DL channel for the UE using channel vectors derived from the pilot signals, resulting in reciprocity-based channel estimation, wherein the estimating the DL channel using the channel vectors derived from the pilot signals reduces or eliminates a need to transmit, using each antenna element in the multiple groups of antenna elements, DL pilot signals for DL channel estimation, thereby reducing or eliminating overhead for the UE. For example, the system 162a can, in a manner similar to that described elsewhere herein, perform one or more operations that include estimating an UL channel for the UE and a DL channel for the UE using channel vectors derived from the pilot signals, resulting in reciprocity-based channel estimation, wherein the estimating the DL channel using the channel vectors derived from the pilot signals reduces or eliminates a need to transmit, using each antenna element in the multiple groups of antenna elements, DL pilot signals for DL channel estimation, thereby reducing or eliminating overhead for the UE.

In some implementations of these embodiments, communications between the combination of coherent modular antenna panels and the UE are in time division duplex (TDD).

In some implementations of these embodiments, the pilot signals comprise sounding reference signals (SRS).

In some implementations of these embodiments, the DL pilot signals comprise channel state information (CSI)-reference signals (RS).

In some implementations of these embodiments, the combination of coherent modular antenna panels transparently serves the UE in Su-MIMO mode and other UEs in multi-user (Mu)-MIMO mode.

In some implementations of these embodiments, a number of antenna elements in the multiple groups of antenna elements is greater than a number of antennas of the UE.

In some implementations of these embodiments, the combination of coherent modular antenna panels serves the UE in Su-MIMO mode based on detecting that a coherence block associated with the UE is smaller than a threshold size.

While for purposes of simplicity of explanation, the respective processes are shown and described as a series of blocks in FIG. 8M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a non-transitory machine-readable medium may comprise executable instructions that, when executed by a processing system communicatively coupled with an aggregation of coherent modular antenna panels and including a processor, facilitate performance of operations. The operations may include receiving, via the aggregation of coherent modular antenna panels, sounding reference signals (SRS) from a user equipment (UE) in single-user (Su)-multiple-input-multiple-output (MIMO) mode in frequency division duplex (FDD), wherein each modular antenna panel of the aggregation of coherent modular antenna panels comprises a set of antenna elements, resulting in multiple sets of antenna elements. The operations may further include estimating a DL channel for the UE using channel vectors derived from the SRS, resulting in reciprocity-based channel estimation, wherein the estimating involves averaging of spatial correlations relating to the channel vectors, and wherein the estimating reduces or eliminates a need to transmit, using each antenna element in the multiple sets of antenna elements, channel state information (CSI)-reference signals (RS) for DL channel estimation, thereby reducing or eliminating overhead for the UE.

In some implementations of these embodiments, the aggregation of coherent modular antenna panels transparently serves the UE in Su-MIMO mode and other UEs in multi-user (Mu)-MIMO mode.

In some implementations of these embodiments, a number of antenna elements in the multiple sets of antenna elements is greater than a number of ports or antennas of the UE.

In some implementations of these embodiments, the aggregation of coherent modular antenna panels serves the UE in Su-MIMO mode based on detecting that a coherence block associated with the UE is smaller than a threshold size.

In some implementations of these embodiments, the processing system is implemented in an Open Radio Access Network (O-RAN) architecture.

In various embodiments, a method may include receiving, by a processing system including a processor, and via a combination of coherent modular antenna arrays, sounding reference signals (SRS) from a user equipment (UE) in single-user (Su)-multiple-input-multiple-output (MIMO) mode in frequency division duplex (FDD), wherein each modular antenna array of the combination of coherent modular antenna arrays comprises a group of antenna elements, resulting in multiple groups of antenna elements. The method may further include estimating, by the processing system, an uplink (UL) channel for the UE using channel vectors derived from the SRS. The method may further include performing, by the processing system, a logical partition of the combination of coherent modular antenna arrays, resulting in a first partition of the combination of coherent modular antenna arrays and a second partition of the combination of coherent modular antenna arrays. The method may further include identifying, by the processing system, a first antenna element from the first partition and a second antenna element from the second partition, wherein the first antenna element comprises a first polarization and a second polarization, and wherein the second antenna element comprises a third polarization and a fourth polarization. The method may further include causing, by the processing system, the first antenna element to transmit a first orthogonal pilot signal at the first polarization and to transmit a second orthogonal pilot signal at the second polarization, and causing the second antenna element to transmit a third orthogonal pilot signal at the third polarization and to transmit a fourth orthogonal pilot signal at the fourth polarization, resulting in four orthogonal pilot signals being transmitted. The method may further include, responsive to the causing, obtaining, by the processing system, feedback from the UE via the combination of coherent modular antenna arrays. The method may further include determining, by the processing system, a DL channel for the UE based on the feedback.

In some implementations of these embodiments, the combination of coherent modular antenna arrays serves other UEs in multi-user (Mu)-MIMO mode, where the performing, the identifying, the causing, the obtaining, and the determining enable the combination of coherent modular antenna arrays to transparently serve the UE in Su-MIMO mode and the other UEs in Mu-MIMO mode.

In some implementations of these embodiments, the first polarization and the third polarization comprise plus (+) 45 degree polarization, where the second polarization and the fourth polarization comprise minus (−) 45 degree polarization.

In some implementations of these embodiments, the first orthogonal pilot signal, the second orthogonal pilot signal, the third orthogonal pilot signal, and the fourth orthogonal pilot signal comprise channel state information (CSI)-reference signals (RS).

In some implementations of these embodiments, the feedback comprises a precoding matrix indicator (PMI).

In some implementations of these embodiments, the performing the logical partition comprises performing a halving partition such that the first partition comprises a left partition of the combination of coherent modular antenna arrays and the second partition comprises a right partition of the combination of coherent modular antenna arrays.

Figure 8N:
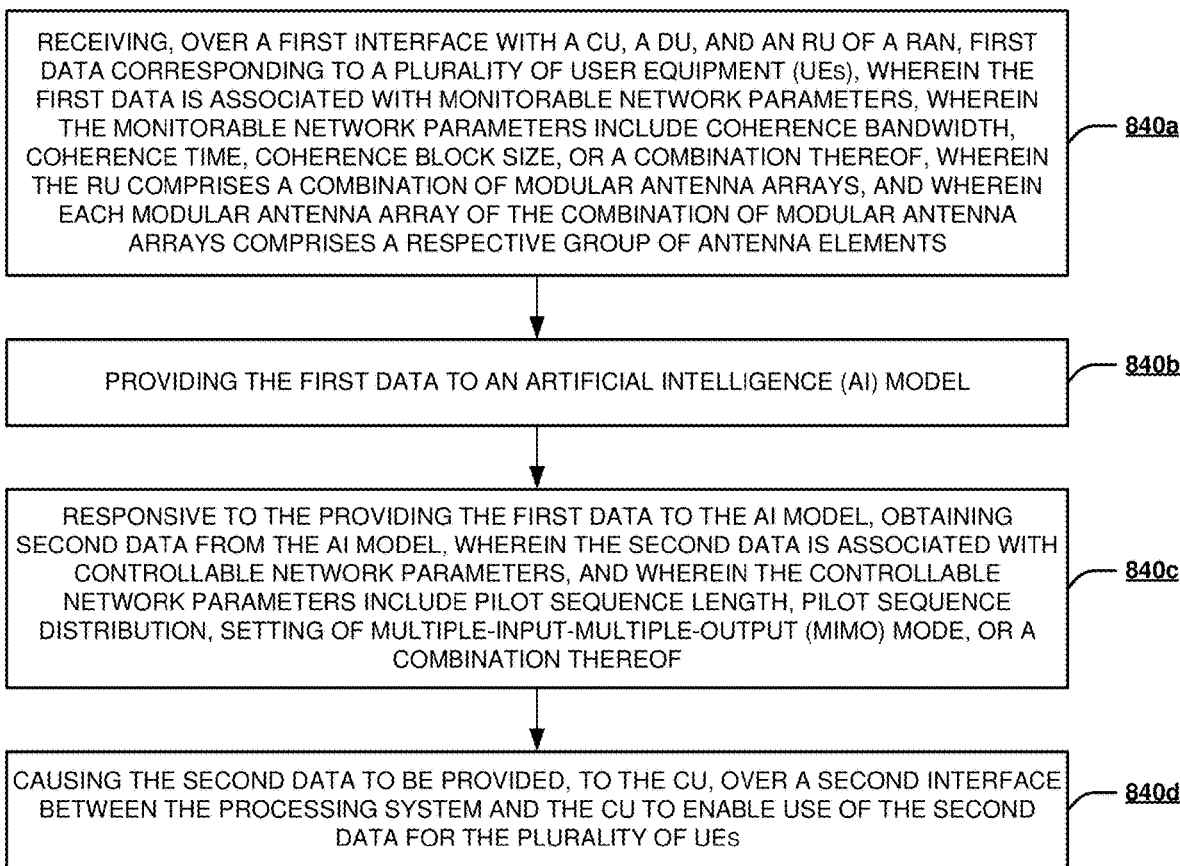

FIG. 8N depicts an illustrative embodiment of a method 840 in accordance with various aspects described herein. In some embodiments, one or more process blocks of FIG. 8N can be performed by a network service management platform, such as the network service management platform 163a. In some embodiments, one or more process blocks of FIG. 8N may be performed by another device or a group of devices separate from or including the network service management platform 163a, such as the RIC 164a, the CU 174a, one or more DUs 166a, one or more RUs 168a, and/or the core network 190.

At 840a, the method can include receiving, over a first interface with a CU, a DU, and an RU of a RAN, first data corresponding to a plurality of user equipment (UEs), wherein the first data is associated with monitorable network parameters, wherein the monitorable network parameters include coherence bandwidth, coherence time, coherence block size, or a combination thereof, wherein the RU comprises a combination of modular antenna arrays, and wherein each modular antenna array of the combination of modular antenna arrays comprises a respective group of antenna elements. For example, the system 162a can, in a manner similar to that described elsewhere herein, perform one or more operations that include receiving, over a first interface with a CU, a DU, and an RU, first data corresponding to a plurality of user equipment (UEs), wherein the first data is associated with monitorable network parameters, and wherein the monitorable network parameters include coherence bandwidth, coherence time, coherence block size, or a combination thereof.

At 840b, the method can include providing the first data to an artificial intelligence (AI) model. For example, the system 162a can, in a manner similar to that described elsewhere herein, perform one or more operations that include providing the first data to an artificial intelligence (AI) model.

At 840c, the method can include, responsive to the providing the first data to the AI model, obtaining second data from the AI model, wherein the second data is associated with controllable network parameters, and wherein the controllable network parameters include pilot sequence length, pilot sequence distribution, setting of multiple-input-multiple-output (MIMO) mode, or a combination thereof. For example, the system 162a can, in a manner similar to that described elsewhere herein, perform one or more operations that include, responsive to the providing the first data to the AI model, obtaining second data from the AI model, wherein the second data is associated with controllable network parameters, and wherein the controllable network parameters include pilot sequence length, pilot sequence distribution, setting of multiple-input-multiple-output (MIMO) mode, or a combination thereof.

At 840d, the method can include causing the second data to be provided, to the CU, over a second interface with the CU to enable use of the second data for the plurality of UEs. For example, the system 162a can, in a manner similar to that described elsewhere herein, perform one or more operations that include causing the second data to be provided, to the CU, over a second interface with the CU to enable use of the second data for the plurality of UEs.

In some implementations of these embodiments, the monitorable network parameters further include scheduled UEs, UE spatial separability, indication of MIMO type, downlink (DL) channel quality index (CQI), uplink (UL) signal-to-interference-plus-noise ratio (SINR), error vector magnitude (EVM), pilot reuse factor, UL covariance, condition number, or a combination thereof.

In some implementations of these embodiments, the controllable network parameters further include uplink (UL) UE transmit power control, downlink (DL) transmit power allocation, parallel scheduling control, quiescent antenna weights, setting of single-user (Su)-MIMO rank, or a combination thereof.

In some implementations of these embodiments, the RAN conforms to Open RAN (O-RAN) standards, and the AI model is implemented in the RIC.

In some implementations of these embodiments, the first interface comprises an O1 interface.

In some implementations of these embodiments, the second interface comprises an A1 interface.

In some implementations of these embodiments, the AI model is implemented in an rAPP, an xAPP, or a combination thereof.

In some implementations of these embodiments, the combination of modular antenna arrays is operated in multi-user (Mu)-MIMO mode, single-user (Su)-MIMO mode, or a combination thereof.

In some implementations of these embodiments, the DU comprises a virtual DU.

While for purposes of simplicity of explanation, the respective processes are shown and described as a series of blocks in FIG. 8N, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a non-transitory machine-readable medium may comprise executable instructions that, when executed by a processing system of a radio access network (RAN) including a processor, facilitate performance of operations. The operations may include obtaining network-related data from a centralized unit (CU), a distributed unit (DU), or a remote unit (RU) of the RAN, wherein the network-related data corresponds to a user equipment (UE), wherein the network-related data is associated with first parameters, and wherein the first parameters are associated with coherence information. The operations may further include transmitting the network-related data to a machine learning (ML) model. The operations may further include, responsive to the transmitting the network-related data to the ML model, receiving control data from the ML model, wherein the control data is associated with second parameters, and wherein the second parameters are associated with pilot sequences, multiple-input-multiple-output (MIMO) modes, or a combination thereof. The operations may further include providing the control data to the CU for controlling the UE.

In some implementations of these embodiments, the first parameters further relate to scheduling of UEs, spatial separation of UEs, MIMO type, downlink (DL) channel quality, uplink (UL) signal quality, or a combination thereof.

In some implementations of these embodiments, the second parameters further relate to uplink (UL) power control, downlink (DL) power allocation, parallel scheduling, antenna weights, single-user (Su)-MIMO ranking, or a combination thereof.

In some implementations of these embodiments, the RAN conforms to Open RAN (O-RAN) standards, and the ML model is implemented in a RAN intelligent controller (RIC) of the RAN.

In some implementations of these embodiments, the processing system comprises a Service Management and Orchestration (SMO) platform.

In various embodiments, a method may include receiving, by a processing system including a processor, and over a first interface of a radio access network (RAN), first data corresponding to a plurality of user equipment (UEs), wherein the first data is associated with first network parameters, and wherein the first network parameters include scheduled UEs, UE spatial separability, or a combination thereof. The method may further include transmitting, by the processing system, the first data to an artificial intelligence (AI) model. The method may further include, responsive to the transmitting the first data to the AI model, obtaining, by the processing system, second data from the AI model, wherein the second data is associated with second network parameters, and wherein the second network parameters include downlink (DL) transmit power allocation. The method may further include causing, by the processing system, the second data to be provided over a second interface to a control unit to enable use of the second data for the plurality of UEs.

In some implementations of these embodiments, the RAN conforms to Open RAN (O-RAN) standards, and the AI model is implemented in a RAN intelligent controller (RIC).

In some implementations of these embodiments, the first interface comprises an O1 interface.

In some implementations of these embodiments, the second interface comprises an A1 interface.

In some implementations of these embodiments, the processing system comprises a Service Management and Orchestration (SMO) platform.

Figure 8P:
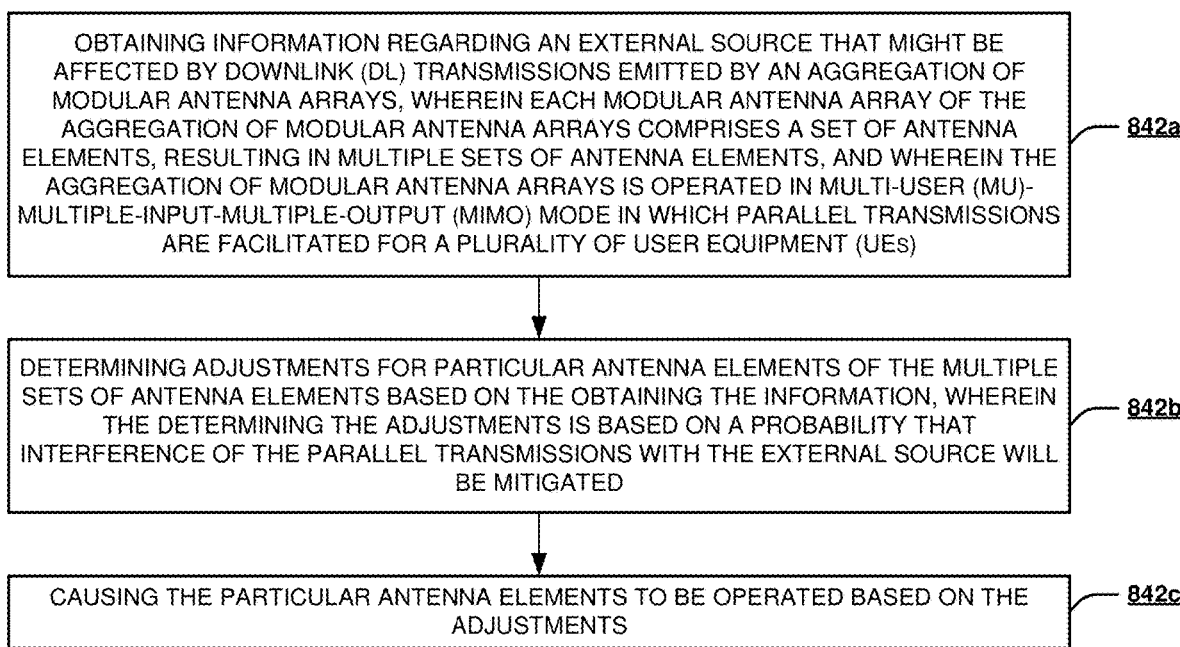

FIG. 8P depicts an illustrative embodiment of a method 842 in accordance with various aspects described herein. In some embodiments, one or more process blocks of FIG. 8P can be performed by a RAN or system, such as the system 162a. In some embodiments, one or more process blocks of FIG. 8P may be performed by another device or a group of devices separate from or including the system 162a, such as the network service management platform 163a, the RIC 164a, the CU 174a, one or more DUs 166a, one or more RUs 168a, and/or the core network 190.

At 842a, the method can include obtaining information regarding an external source that might be affected by downlink (DL) transmissions emitted by an aggregation of modular antenna arrays, wherein each modular antenna array of the aggregation of modular antenna arrays comprises a set of antenna elements, resulting in multiple sets of antenna elements, and wherein the aggregation of modular antenna arrays is operated in multi-user (Mu)-multiple-input-multiple-output (MIMO) mode in which parallel transmissions are facilitated for a plurality of user equipment (UEs). For example, the system 162a can, in a manner similar to that described elsewhere herein, perform one or more operations that include obtaining information regarding an external source that might be affected by downlink (DL) transmissions emitted by an aggregation of modular antenna arrays, wherein each modular antenna array of the aggregation of modular antenna arrays comprises a set of antenna elements, resulting in multiple sets of antenna elements, and wherein the aggregation of modular antenna arrays is operated in multi-user (Mu)-multiple-input-multiple-output (MIMO) mode in which parallel transmissions are facilitated for a plurality of user equipment (UEs).

At 842b, the method can include determining adjustments for particular antenna elements of the multiple sets of antenna elements based on the obtaining the information, wherein the determining the adjustments is based on a probability that interference of the parallel transmissions with the external source will be mitigated. For example, the system 162a can, in a manner similar to that described elsewhere herein, perform one or more operations that include determining adjustments for particular antenna elements of the multiple sets of antenna elements based on the obtaining the information, wherein the determining the adjustments is based on a probability that interference of the parallel transmissions with the external source will be mitigated.

At 842c, the method can include causing the particular antenna elements to be operated based on the adjustments. For example, the system 162a can, in a manner similar to that described elsewhere herein, perform one or more operations that include causing the particular antenna elements to be operated based on the adjustments.

In some implementations of these embodiments, the external source comprises an Earth station or a repeater.

In some implementations of these embodiments, the information comprises geolocation information for the external source.

In some implementations of these embodiments, the information comprises detected uplink (UL) interference associated with the external source.

In some implementations of these embodiments, the information comprises covariance measurements of one or more signals received over an uplink (UL).

In some implementations of these embodiments, the covariance measurements are made after pilot removal from the one or more signals.

In some implementations of these embodiments, the adjustments involve steering of the parallel transmissions away from the external source.

In some implementations of these embodiments, the adjustments include precoding for one or more null patterns to be directed towards the external source.

In some implementations of these embodiments, communications between the aggregation of modular antenna arrays and each UE of the plurality of UEs are in frequency division duplex (FDD).

In some implementations of these embodiments, communications between the aggregation of modular antenna arrays and each UE of the plurality of UEs are in time division duplex (TDD).

While for purposes of simplicity of explanation, the respective processes are shown and described as a series of blocks in FIG. 8P, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels, wherein each modular antenna panel of the plurality of coherent modular antenna panels comprises a group of antenna elements, resulting in multiple groups of antenna elements, and wherein the plurality of coherent modular antenna panels is operated in frequency division duplex (FDD) multi-user (Mu)-multiple-input-multiple-output (MIMO) in which parallel transmissions are facilitated for a plurality of user equipment (UEs). The device may further comprise a memory that stores executable instructions that, when executed by the processing system, facilitate performance of operations. The operations may include detecting an external noise source. The operations may further include identifying precoding for particular antenna elements of the multiple groups of antenna elements based on the detecting the external noise source. The operations may further include operating the particular antenna elements based on the precoding when facilitating the parallel transmissions for the plurality of UEs.

In some implementations of these embodiments, the external noise source comprises an Earth station or a repeater.

In some implementations of these embodiments, the detecting the external noise source is based on covariance measurements of one or more signals received over an uplink (UL).

In some implementations of these embodiments, the precoding enables steering of the parallel transmissions away from the external noise source.

In some implementations of these embodiments, the precoding enables one or more null patterns to be directed towards the external noise source.

In various embodiments, a method may include receiving, by a processing system including a processor, data regarding an external noise source that is affected by out-of-band downlink (DL) emissions radiated by a coherent combination of modular antenna arrays, wherein each modular antenna array of the coherent combination of modular antenna arrays comprises a group of antenna elements, resulting in multiple groups of antenna elements, and wherein the coherent combination of modular antenna arrays is being operated in multi-user (Mu)-multiple-input-multiple-output (MIMO) mode in which parallel transmissions are facilitated for a plurality of user equipment (UEs). The method may further include identifying, by the processing system, adjustments for select antenna elements of the multiple groups of antenna elements based on the receiving the data. The method may further include causing, by the processing system, the select antenna elements to be operated based on the adjustments such that the parallel transmissions facilitated for the plurality of UEs are steered away from the external noise source.

In some implementations of these embodiments, the external noise source comprises an Earth station or a repeater.

In some implementations of these embodiments, the data relates to detected UL interference associated with the external noise source.

In some implementations of these embodiments, the adjustments include precoding for one or more null patterns for the external noise source.

In some implementations of these embodiments, communications between the coherent combination of modular antenna arrays and each UE of the plurality of UEs are in frequency division duplex (FDD).

Figure 8Q:
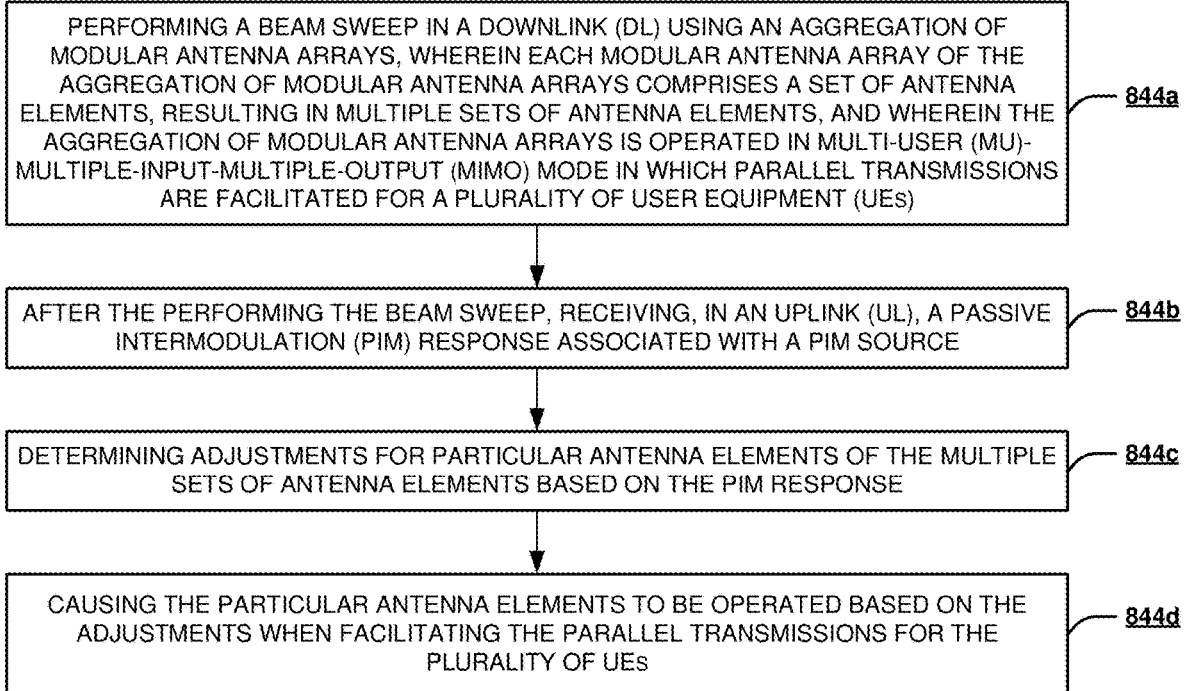

FIG. 8Q depicts an illustrative embodiment of a method 844 in accordance with various aspects described herein. In some embodiments, one or more process blocks of FIG. 8Q can be performed by a RAN or system, such as the system 162*a*. In some embodiments, one or more process blocks of FIG. 8Q may be performed by another device or a group of devices separate from or including the system 162*a*, such as the network service management platform 163*a*, the RIC 164*a*, the CU 174*a*, one or more DUs 166*a*, one or more RUs 168*a*, and/or the core network 190.

At 844*a*, the method can include performing a beam sweep in a downlink (DL) using an aggregation of modular antenna arrays, wherein each modular antenna array of the aggregation of modular antenna arrays comprises a set of antenna elements, resulting in multiple sets of antenna elements, and wherein the aggregation of modular antenna arrays is operated in multi-user (Mu)-multiple-input-multiple-output (MIMO) mode in which parallel transmissions are facilitated for a plurality of user equipment (UEs). For example, the system 162*a* can, in a manner similar to that described elsewhere herein, perform one or more operations that include performing a beam sweep in a downlink (DL) using an aggregation of modular antenna arrays, wherein each modular antenna array of the aggregation of modular antenna arrays comprises a set of antenna elements, resulting in multiple sets of antenna elements, and wherein the aggregation of modular antenna arrays is operated in multi-user (Mu)-multiple-input-multiple-output (MIMO) mode in which parallel transmissions are facilitated for a plurality of user equipment (UEs).

At 844*b*, the method can include, after the performing the beam sweep, receiving, in an uplink (UL), a passive intermodulation (PIM) response associated with a PIM source. For example, the system 162*a* can, in a manner similar to that described elsewhere herein, perform one or more operations that include, after the performing the beam sweep, receiving, in an uplink (UL), a passive intermodulation (PIM) response associated with a PIM source.

At 844*c*, the method can include determining adjustments for particular antenna elements of the multiple sets of antenna elements based on the PIM response. For example, the system 162*a* can, in a manner similar to that described elsewhere herein, perform one or more operations that include determining adjustments for particular antenna elements of the multiple sets of antenna elements based on the PIM response.

At 844*d*, the method can include causing the particular antenna elements to be operated based on the adjustments when facilitating the parallel transmissions for the plurality of UEs. For example, the system 162*a* can, in a manner similar to that described elsewhere herein, perform one or more operations that include causing the particular antenna elements to be operated based on the adjustments when facilitating the parallel transmissions for the plurality of UEs.

In some implementations of these embodiments, the performing the beam sweep comprises performing the beam sweep in orthogonal beam directions.

In some implementations of these embodiments, the determining the adjustments comprises identifying a direction or location of the PIM source based on the PIM response.

In some implementations of these embodiments, the causing the particular antenna elements to be operated based on the adjustments enables the parallel transmissions to avoid the PIM source, thereby reducing or eliminating undesired reflections of the parallel transmissions from the PIM source.

In some implementations of these embodiments, the adjustments include calculations for one or more null patterns towards the PIM source, thereby increasing uplink (UL) coverage.

In some implementations of these embodiments, the one or more null patterns comprises one or more quiescent beam patterns that are concatenated with adaptive beams associated with the parallel transmissions.

In some implementations of these embodiments, the system 162*a* may perform one or more operations that include obtaining measurements relating to the PIM response, where the determining the adjustments is based on the measurements relating to the PIM response.

In some implementations of these embodiments, communications between the aggregation of modular antenna arrays and each UE of the plurality of UEs are in frequency division duplex (FDD).

In some implementations of these embodiments, the aggregation of modular antenna arrays is further operated in single-user (Su)-MIMO mode.

While for purposes of simplicity of explanation, the respective processes are shown and described as a series of blocks in FIG. 8Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels, wherein each modular antenna panel of the plurality of coherent modular antenna panels comprises a group of antenna elements, resulting in multiple groups of antenna elements, and wherein the plurality of coherent modular antenna panels is operated in frequency division duplex (FDD) multi-user (Mu)-multiple-input-multiple-output (MIMO) in which parallel transmissions are facilitated for a plurality of user equipment (UEs). The device may further comprise a memory that stores executable instructions that, when executed by the processing system, facilitate performance of operations. The operations may include causing the plurality of coherent modular antenna panels to conduct, in a downlink (DL), a beam sweep in orthogonal directions. The operations may further include detecting, in an uplink (UL), a passive intermodulation (PIM) response corresponding to a PIM source. The operations may further include determining measurement data based on the PIM response. The operations may further include operating particular antenna elements of the multiple groups of antenna elements based on the measurement data when facilitating the parallel transmissions for the plurality of UEs.

In some implementations of these embodiments, the determining the measurement data comprises identifying a direction or location of the PIM source based on the PIM response.

In some implementations of these embodiments, the operating the particular antenna elements based on the measurement data enables the parallel transmissions to avoid the PIM source, thereby reducing or eliminating undesired reflections of the parallel transmissions from the PIM source.

In some implementations of these embodiments, the operating the particular antenna elements comprises applying one or more null patterns towards the PIM source, thereby increasing uplink (UL) coverage.

In some implementations of these embodiments, the one or more null patterns comprises one or more quiescent beam patterns that are concatenated with adaptive beams associated with the parallel transmissions.

In various embodiments, a method may include performing, by a processing system including a processor, a beam sweep in a downlink (DL) using a combination of coherent modular antenna arrays, wherein each modular antenna array of the combination of coherent modular antenna arrays comprises a set of antenna elements, resulting in multiple sets of antenna elements, and wherein the combination of coherent modular antenna arrays is operated in multi-user (Mu)-multiple-input-multiple-output (MIMO) mode in which parallel transmissions are facilitated for a plurality of user equipment (UEs). The method may further include obtaining, by the processing system via the multiple sets of antenna elements, a signal in an uplink (UL) responsive to the performing the beam sweep, wherein the signal includes components associated with a passive intermodulation (PIM) source. The method may further include identifying, by the processing system, adjustments for select antenna elements of the multiple sets of antenna elements based on the signal. The method may further include causing, by the processing system, the select antenna elements to be operated based on the adjustments when facilitating the parallel transmissions for the plurality of UEs, wherein the causing enables at least a portion of the parallel transmissions to avoid the PIM source, thereby reducing or eliminating undesired reflections of the parallel transmissions from the PIM source.

In some implementations of these embodiments, the performing the beam sweep comprises performing the beam sweep in orthogonal beam directions.

In some implementations of these embodiments, the identifying the adjustments comprises identifying a direction or location of the PIM source based on the signal.

In some implementations of these embodiments, the adjustments include calculations for one or more null patterns towards the PIM source, thereby increasing uplink (UL) coverage.

In some implementations of these embodiments, communications between the combination of coherent modular antenna arrays and each UE of the plurality of UEs are in frequency division duplex (FDD).

Figure 8R:
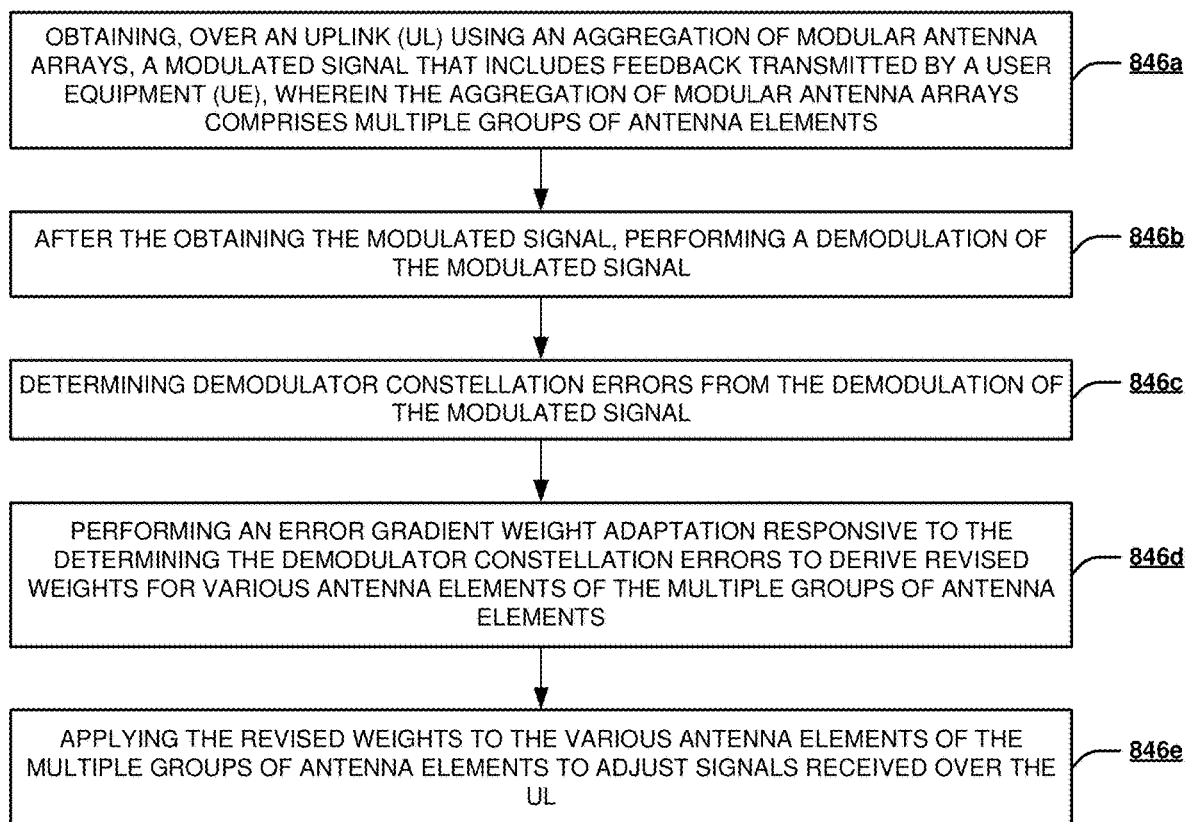

FIG. 8R depicts an illustrative embodiment of a method 846 in accordance with various aspects described herein. In some embodiments, one or more process blocks of FIG. 8R can be performed by a RAN or system, such as the system 162a. In some embodiments, one or more process blocks of FIG. 8R may be performed by another device or a group of devices separate from or including the system 162a, such as the network service management platform 163a, the RIC 164a, the CU 174a, one or more DUs 166a, one or more RUs 168a, and/or the core network 190.

At 846a, the method can include obtaining, over an uplink (UL) using an aggregation of modular antenna arrays, a modulated signal that includes feedback transmitted by a user equipment (UE), wherein the aggregation of modular antenna arrays comprises multiple groups of antenna elements. For example, the system 162a can, in a manner similar to that described elsewhere herein, perform one or more operations that include obtaining, over an uplink (UL) using an aggregation of modular antenna arrays, a modulated signal that includes feedback transmitted by a user equipment (UE), wherein the aggregation of modular antenna arrays comprises multiple groups of antenna elements.

At 846b, the method can include, after the obtaining the modulated signal, performing a demodulation of the modulated signal. For example, the system 162a can, in a manner similar to that described elsewhere herein, perform one or more operations that include, after the obtaining the modulated signal, performing a demodulation of the modulated signal.

At 846c, the method can include determining demodulator constellation errors from the demodulation of the modulated signal. For example, the system 162a can, in a manner similar to that described elsewhere herein, perform one or more operations that include determining demodulator constellation errors from the demodulation of the modulated signal.

At 846d, the method can include performing an error gradient weight adaptation responsive to the determining the demodulator constellation errors to derive revised weights for various antenna elements of the multiple groups of antenna elements. For example, the system 162a can, in a manner similar to that described elsewhere herein, perform one or more operations that include performing an error gradient weight adaptation responsive to the determining the demodulator constellation errors to derive revised weights for various antenna elements of the multiple groups of antenna elements.

At 846e, the method can include applying the revised weights to the various antenna elements of the multiple groups of antenna elements to adjust signals received over the UL. For example, the system 162a can, in a manner similar to that described elsewhere herein, perform one or more operations that include applying the revised weights to the various antenna elements of the multiple groups of antenna elements to adjust signals received over the UL.

In some implementations of these embodiments, the determining the demodulator constellation errors comprises measuring an error vector magnitude (EVM) based on the demodulation of the modulated signal.

In some implementations of these embodiments, the system 162a may perform one or more operations that include requesting the UE to provide the feedback, where the obtaining the modulated signal is responsive to the requesting.

In some implementations of these embodiments, the modulated signal comprises an orthogonal frequency division multiplexing (OFDM) signal.

In some implementations of these embodiments, the applying the revised weights compensates for channel estimation errors in the UL.

In some implementations of these embodiments, the system 162a may perform one or more operations that include determining a coherence block for the UE.

In some implementations of these embodiments, the system 162a may perform one or more operations that include identifying that the coherence block for the UE is smaller than a threshold, where the determining the demodulator constellation errors, the performing the error gradient weight adaptation, and the applying the revised weights are based on the identifying that the coherence block for the UE is smaller than the threshold.

In some implementations of these embodiments, the aggregation of modular antenna arrays operates as a coherent antenna system.

In some implementations of these embodiments, communications between the aggregation of modular antenna arrays and the UE are in frequency division duplex (FDD).

In some implementations of these embodiments, communications between the aggregation of modular antenna arrays and the UE are in time division duplex (TDD).

While for purposes of simplicity of explanation, the respective processes are shown and described as a series of blocks in FIG. 8R, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a device may comprise a processing system including a processor, wherein the processing system is communicatively coupled with a plurality of coherent modular antenna panels. The device may further comprise a memory that stores executable instructions that, when executed by the processing system, facilitate performance of operations. The operations may include receiving, via the plurality of coherent modular antenna panels, feedback provided by a user equipment (UE), wherein each modular antenna panel of the plurality of coherent modular antenna panels comprises a set of antenna elements, resulting in multiple sets of antenna elements. The operations may further include determining constellation errors relating to a demodulator by calculating a root mean square (RMS) of error vectors resulting from demodulation of the feedback. The operations may further include calculating adjusted weights for select antenna elements of the multiple sets of antenna elements based on the constellation errors. The operations may further include causing the select antenna elements of the multiple sets of antenna elements to operate in accordance with the adjusted weights.

In some implementations of these embodiments, the calculating the adjusted weights comprises performing an error gradient weight adaptation.

In some implementations of these embodiments, the operations may further include requesting the UE to provide the feedback, and wherein the receiving the feedback is responsive to the requesting.

In some implementations of these embodiments, the operations may further include determining a coherence block for the UE.

In some implementations of these embodiments, the operations may further include identifying that the coherence block for the UE is smaller than a threshold, where the determining the constellation errors, the calculating the adjusted weights, and the causing the select antenna elements of the multiple sets of antenna elements to operate in accordance with the adjusted weights are based on the identifying that the coherence block for the UE is smaller than the threshold.

In various embodiments, a method may include obtaining, by a processing system using a combination of coherent modular antenna arrays, a modulated signal transmitted by a user equipment (UE), wherein the combination of coherent modular antenna arrays comprises multiple groups of antenna elements. The method may further include, responsive to the obtaining the modulated signal, demodulating, by the processing system, the modulated signal. The method may further include measuring, by the processing system, an error vector magnitude (EVM) based on the demodulating the modulated signal. The method may further include performing, by the processing system, an error gradient weight adaptation responsive to the measuring the EVM to generate adjusted weights for various antenna elements of the multiple groups of antenna elements. The method may further include causing, by the processing system, the adjusted weights to be applied to the various antenna elements of the multiple groups of antenna elements to calibrate the various antenna elements.

In some implementations of these embodiments, the modulated signal comprises an orthogonal frequency division multiplexing (OFDM) signal.

In some implementations of these embodiments, the modulated signal is transmitted by the UE while the UE is located at or within a threshold distance from a boresight of the combination of coherent modular antenna arrays.

In some implementations of these embodiments, the method may further include storing the adjusted weights for the various antenna elements.

In some implementations of these embodiments, the method may further include obtaining, by the processing system using the combination of coherent modular antenna arrays, a second modulated signal transmitted by a second UE. In some implementations of these embodiments, the method may further include, responsive to the obtaining the second modulated signal, demodulating, by the processing system, the second modulated signal. In some implementations of these embodiments, the method may further include measuring, by the processing system, a second EVM based on the demodulating the second modulated signal. In some implementations of these embodiments, the method may further include performing, by the processing system, a second error gradient weight adaptation responsive to the measuring the second EVM to generate additional adjusted weights for the various antenna elements of the multiple groups of antenna elements. In some implementations of these embodiments, the method may further include comparing, by the processing system, the adjusted weights and the additional adjusted weights with respect to one or more thresholds. In some implementations of these embodiments, the method may further include determining, by the processing system, to apply the adjusted weights, the additional adjusted weights, or one or more averages thereof to the various antenna elements of the multiple groups of antenna elements based on a result of the comparing.

Referring now to FIG. 9, a block diagram 900 is shown illustrating an example, non-limiting embodiment of a virtualized communications network in accordance with various aspects described herein. In particular, a virtualized communications network is presented that can be used to implement some or all of the subsystems and functions of various systems, devices, units, etc. described above. For example, virtualized communications network 900 can, in whole or in part, facilitate optimization or improvement of service quality and/or capacity in a MIMO network supported by aggregations of modular antenna arrays and/or facilitate maximizing of coverage based on coherence blocks.

In particular, a cloud networking architecture is shown that leverages cloud technologies and supports rapid innovation and scalability via a transport layer 950, a virtualized network function cloud 925 and/or one or more cloud computing environments 975. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 930, 932, 934, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 930 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 950 includes fiber, cable, wired and/or wireless transport elements, network elements and interfaces to provide broadband access 110, wireless access 120, voice access 130, media access 140 and/or access to content sources 159 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 930, 932 or 934. These network elements can be included in transport layer 950.

The virtualized network function cloud 925 interfaces with the transport layer 950 to provide the VNEs 930, 932, 934, etc. to provide specific NFVs. In particular, the virtualized network function cloud 925 leverages cloud operations, applications, and architectures to support networking workloads. The virtualized network elements 930, 932 and 934 can employ network function software that provides either a one-for-one mapping of traditional network element function or alternately some combination of network functions designed for cloud computing. For example, VNEs 930, 932 and 934 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 930, 932, 934, etc. can be instantiated and managed using an orchestration approach similar to those used in cloud compute services.

The cloud computing environments 975 can interface with the virtualized network function cloud 925 via APIs that expose functional capabilities of the VNEs 930, 932, 934, etc. to provide the flexible and expanded capabilities to the virtualized network function cloud 925. In particular, network workloads may have applications distributed across the virtualized network function cloud 925 and cloud computing environment 975 and in the commercial cloud, or might simply orchestrate workloads supported entirely in NFV infrastructure from these third party locations.

Figure 10:
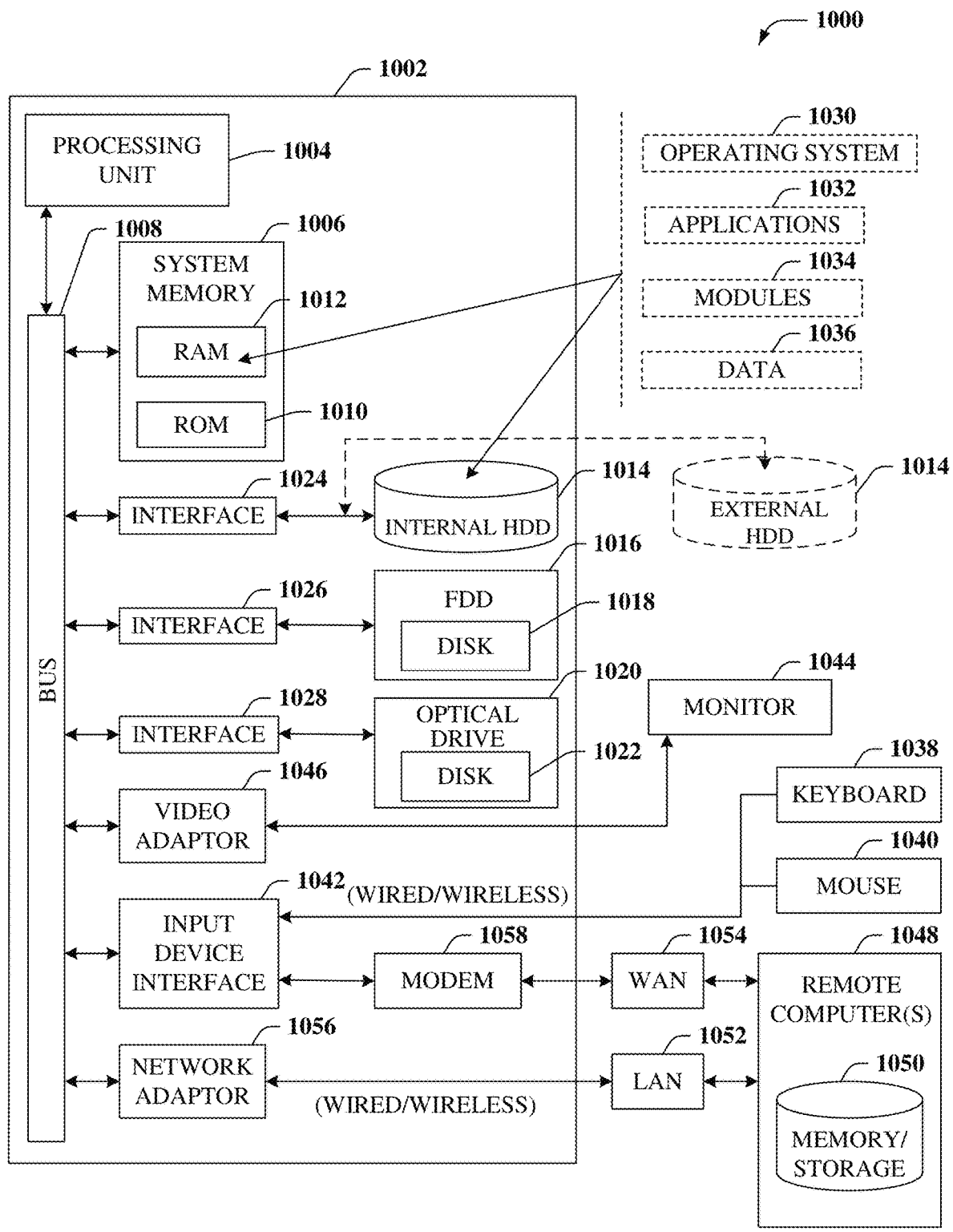
FIG. 10 is a block diagram of an example, non-limiting embodiment of a computing environment in accordance with various aspects described herein.

Turning now to FIG. 10, there is illustrated a block diagram of a computing environment in accordance with various aspects described herein. In order to provide additional context for various embodiments of the embodiments described herein, FIG. 10 and the following discussion are intended to provide a brief, general description of a suitable computing environment 1000 in which the various embodiments of the subject disclosure can be implemented. In particular, computing environment 1000 can be used in the implementation of network elements 150, 152, 154, 156, access terminal 112, base station or access point 122, switching device 132, media terminal 142, and/or VNEs 930, 932, 934, etc. Each of these devices can be implemented via computer-executable instructions that can run on one or more computers, and/or in combination with other program modules and/or as a combination of hardware and software. For example, computing environment 1000 can, in whole or in part, facilitate optimization or improvement of service quality and/or capacity in a MIMO network supported by aggregations of modular antenna arrays and/or facilitate maximizing of coverage based on coherence blocks.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment can comprise a computer 1002, the computer 1002 comprising a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014 (e.g., EIDE, SATA), which internal HDD 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The HDD 1014, magnetic FDD 1016 and optical disk drive 1020 can be connected to the system bus 1008 by a hard disk drive interface 1024, a magnetic disk drive interface 1026 and an optical drive interface 1028, respectively. The hard disk drive interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. It will also be appreciated that in alternative embodiments, a monitor 1044 can also be any display device (e.g., another computer having a display, a smart phone, a tablet computer, etc.) for receiving display information associated with computer 1002 via any communication means, including via the Internet and cloud-based networks. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a remote memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the LAN 1052 through a wired and/or wireless communications network interface or adapter 1056. The adapter 1056 can facilitate wired or wireless communication to the LAN 1052, which can also comprise a wireless AP disposed thereon for communicating with the adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 11:
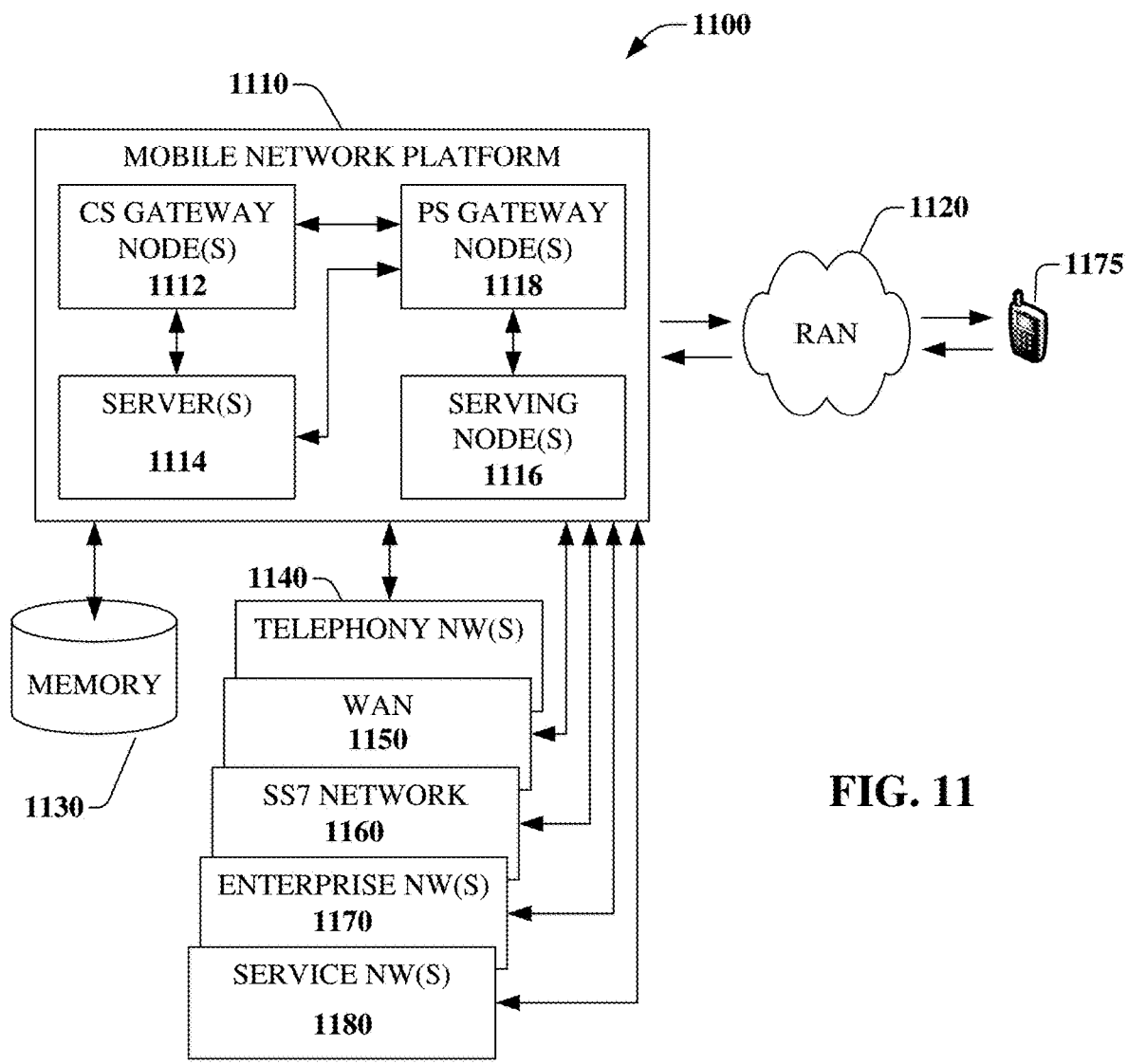
FIG. 11 is a block diagram of an example, non-limiting embodiment of a mobile network platform in accordance with various aspects described herein.

Turning now to FIG. 11, an embodiment 1100 of a mobile network platform 1110 is shown that is an example of network elements 150, 152, 154, 156, and/or VNEs 930, 932, 934, etc. For example, platform 1110 can, in whole or in part, facilitate optimization or improvement of service quality and/or capacity in a MIMO network supported by aggregations of modular antenna arrays and/or facilitate maximizing of coverage based on coherence blocks. In one or more embodiments, the mobile network platform 1110 can generate and receive signals transmitted and received by base stations or access points such as base station or access point 122. Generally, mobile network platform 1110 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 1110 can be included in telecommunications carrier networks, and can be considered carrier-side components as discussed elsewhere herein. Mobile network platform 1110 comprises CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1160. CS gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication over a radio access network 1120 with other devices, such as a radiotelephone 1175.

In addition to receiving and processing CS-switched traffic and signaling, PS gateway node(s) 1118 can authorize and authenticate PS-based data sessions with served mobile devices. Data sessions can comprise traffic, or content(s), exchanged with networks external to the mobile network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) or radio access network 1120, PS gateway node(s) 1118 can generate packet data protocol contexts when a data session is established; other data structures that facilitate routing of packetized data also can be generated. To that end, in an aspect, PS gateway node(s) 1118 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, mobile network platform 1110 also comprises serving node(s) 1116 that, based upon available radio technology layer(s) within technology resource(s) in the radio access network 1120, convey the various packetized flows of data streams received through PS gateway node(s) 1118. It is to be noted that for technology resource(s) that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in mobile network platform 1110 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to mobile network platform 1110 (e.g., deployed and operated by the same service provider), such as distributed antenna networks that enhance wireless service coverage by providing more network coverage.

It is to be noted that server(s) 1114 can comprise one or more processors configured to confer at least in part the functionality of mobile network platform 1110. To that end, the one or more processor can execute code instructions stored in memory 1130, for example. It should be appreciated that server(s) 1114 can comprise a content manager, which operates in substantially the same manner as described hereinbefore.

In example embodiment 1100, memory 1130 can store information related to operation of mobile network platform 1110. Other operational information can comprise provisioning information of mobile devices served through mobile network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, SS7 network 1160, or enterprise network(s) 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 12:
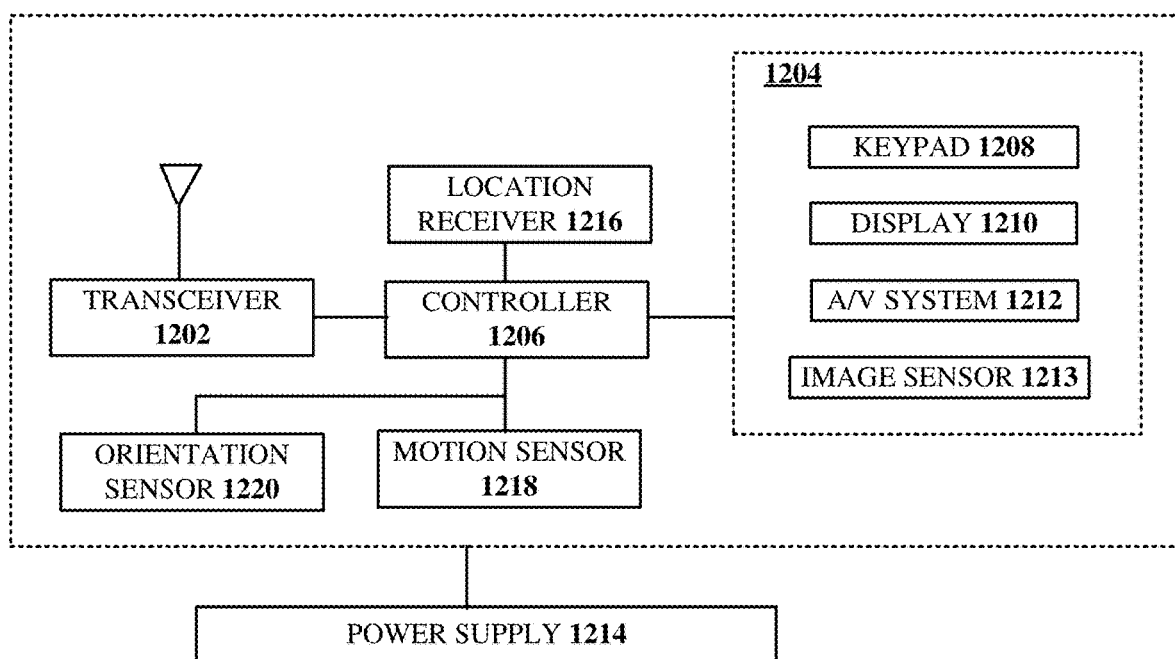
FIG. 12 is a block diagram of an example, non-limiting embodiment of a communication device in accordance with various aspects described herein.

Turning now to FIG. 12, an illustrative embodiment of a communication device 1200 is shown. The communication device 1200 can serve as an illustrative embodiment of devices such as data terminals 114, mobile devices 124, vehicle 126, display devices 144 or other client devices for communication via either communications network 125. For example, computing device 1200 can, in whole or in part, facilitate optimization or improvement of service quality and/or capacity in a MIMO network supported by aggregations of modular antenna arrays and/or facilitate maximizing of coverage based on coherence blocks.

The communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface having graphical user interface (GUI) elements that can be selected by a user with a touch of a finger. The display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable communications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a coherence time for a user equipment (UE), wherein the processing system is associated with a radio access network (RAN) that includes multiple adaptive antenna arrays that operate as a coherent antenna system;
identifying a coherence bandwidth for the UE;
determining a coherence block based on the coherence time and the coherence bandwidth; and
based on a first determination that the coherence block satisfies a threshold, permitting the UE to transmit sounding reference signal (SRS) data over a smaller SRS bandwidth that is smaller than a default SRS bandwidth and at a lower periodicity that is lower than a default periodicity, thereby conserving power resources of the UE.

2. The device of claim 1, wherein the UE is located at or within a threshold distance from a cell edge, and wherein the operations further comprise, based on the first determination that the coherence block satisfies the threshold, exploiting the coherence block by determining an average across the coherence block to obtain an uplink (UL) channel estimate for the UE, thereby maintaining UL coverage for the UE.

3. The device of claim 1, wherein the permitting comprises instructing the UE to transmit the SRS data over the smaller SRS bandwidth and at the lower periodicity.

4. The device of claim 1, wherein the operations further comprise, based on the first determination that the coherence block satisfies the threshold, determining that the UE is eligible for multi-user (Mu)-multiple-input-multiple-output (MIMO).

5. The device of claim 4, wherein the operations further comprise employing Mu-MIMO for the UE based on the determining that the UE is eligible for Mu-MIMO.

6. The device of claim 5, wherein the employing Mu-MIMO for the UE is performed transparently to other UEs for which single-user (Su)-MIMO is employed.

7. The device of claim 1, wherein the operations further comprise, based on a second determination that the coherence block does not satisfy the threshold, determining that the UE is not eligible for multi-user (Mu)-multiple-input-multiple-output (MIMO).

8. The device of claim 1, wherein the threshold comprises a number of SRS symbols.

9. The device of claim 1, wherein the multiple adaptive antenna arrays operate in time division duplex (TDD), frequency division duplex (FDD), or a combination thereof.

10. The device of claim 1, wherein the identifying the coherence time and the coherence bandwidth comprises obtaining information regarding the coherence time and the coherence bandwidth via an Open RAN (O-RAN) compliant interface.

11. A non-transitory machine-readable medium, comprising executable instructions that, when executed by a processing system communicatively coupled with a combination of modular antenna panels and including a processor, facilitate performance of operations, the operations comprising:
    tracking a coherence block for a user equipment (UE) based on information obtained from a RAN interface;
    identifying, based on the tracking, that the coherence block does not satisfy a threshold; and
    based on the identifying that the coherence block does not satisfy the threshold, instructing the UE to transmit sounding reference signals (SRS) over a larger SRS bandwidth that is larger than a default SRS bandwidth and at a higher periodicity that is higher than a default periodicity, and determining that the UE is not eligible for multi-user (Mu)-multiple-input-multiple-output (MIMO).

12. The non-transitory machine-readable medium of claim 11, wherein each modular antenna panel of the combination of modular antenna panels comprises a respective group of antenna elements, resulting in multiple respective groups of antenna elements, and wherein the antenna elements of the multiple respective groups of antenna elements are coherent with one another.

13. The non-transitory machine-readable medium of claim 11, wherein the combination of modular antenna panels operates in time division duplex (TDD), frequency division duplex (FDD), or a combination thereof.

14. The non-transitory machine-readable medium of claim 11, wherein the threshold comprises a number of SRS symbols.

15. The non-transitory machine-readable medium of claim 11, wherein the coherence block does not satisfy the threshold based on a mobility of the UE exceeding a second threshold.

16. The non-transitory machine-readable medium of claim 11, wherein the coherence block does not satisfy the threshold based on antenna ports of the UE being non-line of sight (NLOS) relative to the modular antenna panels.

17. A method, comprising:
    identifying, by a processing system including a processor, a coherence time and a coherence bandwidth for a user equipment (UE), wherein the UE is located at or within a threshold distance from a cell edge;
    determining, by the processing system, a coherence block based on the coherence time and the coherence bandwidth;
    based on a determination that the coherence block satisfies a threshold, exploiting, by the processing system, the coherence block by determining an average across the coherence block to obtain an uplink (UL) channel estimate for the UE, thereby maintaining UL coverage for the UE and enabling multi-user (Mu)-multiple-input-multiple-output (MIMO); and
    based on the determination that the coherence block satisfies the threshold, permitting the UE to transmit sounding reference signal (SRS) data over a smaller SRS bandwidth by reducing the SRS bandwidth allocated to the UE, thereby conserving power resources of the UE.

18. The method of claim 17, further comprising, based on the determination that the coherence block satisfies the threshold, permitting the UE to transmit the SRS data at a lower periodicity relative to a default periodicity, thereby further conserving the power resources of the UE.

19. The method of claim 18, wherein the permitting comprises instructing the UE to transmit the SRS data over the smaller SRS bandwidth and at the lower periodicity.

20. The method of claim 17, wherein the processing system is communicatively coupled with an aggregation of modular antenna arrays that operate in time division duplex (TDD), frequency division duplex (FDD), or a combination thereof.

* * * * *